United States Patent
Tsai et al.

(10) Patent No.: US 12,097,959 B2
(45) Date of Patent: Sep. 24, 2024

(54) UNDERWING-MOUNTED TRAILING EDGE FLAPS FOR WINGS OF AIRCRAFT

(71) Applicant: The Boeing Company, Arlington, VA (US)

(72) Inventors: Kevin Raylin Tsai, Redmond, WA (US); Ryan Joseph Cazin, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 41 days.

(21) Appl. No.: 18/152,687

(22) Filed: Jan. 10, 2023

(65) Prior Publication Data

US 2024/0228015 A1    Jul. 11, 2024

(51) Int. Cl.
*B64C 9/02* (2006.01)
*B64C 9/18* (2006.01)
*B64C 9/34* (2006.01)

(52) U.S. Cl.
CPC .............. *B64C 9/02* (2013.01); *B64C 9/18* (2013.01); *B64C 9/34* (2013.01)

(58) Field of Classification Search
CPC .... B64C 9/00; B64C 9/02; B64C 9/06; B64C 9/18; B64C 9/34; B64C 2009/143
See application file for complete search history.

(56) References Cited

U.S. PATENT DOCUMENTS

| 2,156,403 A | | 5/1939 | Riviere |
| 2,635,837 A | * | 4/1953 | Grant ..................... B64C 9/323 |
| | | | 244/90 A |
| 2,772,058 A | * | 11/1956 | Grant ..................... B64C 21/02 |
| | | | 244/216 |
| 3,371,888 A | | 3/1968 | Alavarez-Calderon |

(Continued)

FOREIGN PATENT DOCUMENTS

| DE | 662729 | 7/1938 |
| DE | 693082 | 7/1940 |

(Continued)

OTHER PUBLICATIONS

United States Patent and Trademark Office, "Non-Final Office Action," issued in connection with U.S. Appl. No. 18/152,679, Jun. 4, 2024, 8 pages.

*Primary Examiner* — Philip J Bonzell
*Assistant Examiner* — Anna L. Gordon
(74) *Attorney, Agent, or Firm* — HANLEY, FLIGHT & ZIMMERMAN, LLC

(57) ABSTRACT

Underwing-mounted trailing edge flaps for wings of aircraft are disclosed. A flap pivotally coupled to the wing is movable between a stowed position located along a lower surface of the wing and a deployed position located rearward of a trailing edge of the wing. The flap includes a first edge, a second edge located opposite the first edge, a first surface extending between the first edge and the second edge, and a second surface located opposite the first surface and extend- (Continued)

ing between the first edge and the second edge. The first edge is located rearward of the second edge when the flap is in the stowed position, and forward of the second edge when the flap is in the deployed position. A bullnose pivotally coupled to the flap at a location along the first edge pivots relative to the flap as the flap moves between the stowed and deployed positions.

25 Claims, 28 Drawing Sheets

(56) References Cited

U.S. PATENT DOCUMENTS

| | | | |
|---|---|---|---|
| 3,698,664 | A | 10/1972 | Bonney |
| 3,934,533 | A | 1/1976 | Wainwright |
| 4,131,253 | A | 12/1978 | Zapel |
| 4,427,168 | A | 1/1984 | McKinney et al. |
| 4,444,368 | A | 4/1984 | Andrews |
| 7,270,305 | B2 * | 9/2007 | Rampton .................. B64C 9/22 244/214 |
| 8,925,869 | B2 | 1/2015 | Friedel et al. |
| 9,016,637 | B2 | 4/2015 | Sakurai et al. |
| 9,090,340 | B2 | 7/2015 | Gölling |
| 2009/0146016 | A1 | 6/2009 | Kordel et al. |
| 2013/0214092 | A1 | 8/2013 | Friedel |
| 2019/0092454 | A1 | 3/2019 | Mortland |
| 2022/0024557 | A1 | 1/2022 | Ji et al. |

FOREIGN PATENT DOCUMENTS

| | | |
|---|---|---|
| DE | 1813407 | 7/1970 |
| EP | 103038 | 3/1984 |
| EP | 1338506 | 8/2006 |
| FR | 2347256 | 11/1977 |
| KR | 10-0535703 | 12/2005 |
| WO | 2015183347 | 12/2015 |

* cited by examiner

UNDERWING-MOUNTED TRAILING EDGE FLAPS FOR WINGS OF AIRCRAFT

FIELD OF THE DISCLOSURE

This disclosure relates generally to flaps for wings of aircraft and, more specifically, to underwing-mounted trailing edge flaps for wings of aircraft.

BACKGROUND

Aircraft wings are commonly equipped with high-lift devices located along and/or otherwise associated with the trailing edge of each wing. For example, an aircraft wing may include one or more trailing edge flap(s) that is/are movable between a stowed position (e.g., a retracted position) and a deployed position (e.g., an extended position) relative to a fixed portion of the wing. Movement of the trailing edge flap(s) from the stowed position into the deployed position typically increases the camber of the wing, which accordingly increases the extent, the amount, and/or the degree of lift (e.g., an increase in maximum lift coefficient) that the wing is capable of generating during flight of the aircraft. Increasing the camber and/or the maximum lift coefficient of a wing generally improves the aerodynamic performance of an aircraft, particularly with regard to takeoff and landing operations performed during flight of the aircraft.

In some known implementations, movement of a trailing edge flap from the stowed position into the deployed position occurs by sliding, translating, and/or otherwise extending the flap (e.g., a Fowler flap) rearward along and/or from one or more guide track(s) disposed on one or more structure (s) (e.g., one or more rib(s)) of the wing. In such known implementations, the upper and lower surfaces of the flap generally maintain their respective upward-facing and downward-facing orientations as the flap moves from the stowed position into the deployed position. The implementation of such a flap commonly requires the incorporation of a linkage assembly located along the underside of the wing below the lower surface of the wing. A fairing covering the linkage assembly is also typically incorporated along the underside of the wing below the lower surface of the wing. The fairing produces significant parasitic drag that negatively impacts the aerodynamic performance of the aircraft during flight, particularly during execution of a cruise operation by the aircraft.

SUMMARY

Underwing-mounted trailing edge flaps for wings of aircraft are disclosed herein. In some examples, a wing of an aircraft is disclosed. In some disclosed examples, the wing includes an upper surface, a lower surface located opposite the upper surface, and a trailing edge located between the upper surface and the lower surface. In some disclosed examples, the wing further includes a flap pivotally coupled to the wing. The flap is movable between a stowed position located along the lower surface and a deployed position located rearward of the trailing edge. The flap includes a first edge, a second edge located opposite the first edge, a first surface extending between the first edge and the second edge, and a second surface located opposite the first surface and extending between the first edge and the second edge. The first edge is located rearward of the second edge when the flap is in the stowed position. The first edge is located forward of the second edge when the flap is in the deployed position. In some disclosed examples, the wing further includes a bullnose pivotally coupled to the flap. The bullnose is located along the first edge and is configured to pivot relative to the flap as the flap moves between the stowed position and the deployed position.

In some examples, a method is disclosed. In some disclosed examples, the method includes moving a flap pivotally coupled to a wing of an aircraft. The wing includes an upper surface, a lower surface located opposite the upper surface, a trailing edge located between the upper surface and the lower surface, and a bullnose pivotally coupled to the flap. The flap is movable between a stowed position located along the lower surface and a deployed position located rearward of the trailing edge. The flap includes a first edge, a second edge located opposite the first edge, a first surface extending between the first edge and the second edge, and a second surface located opposite the first surface and extending between the first edge and the second edge. The first edge is located rearward of the second edge when the flap is in the stowed position. The first edge is located forward of the second edge when the flap is in the deployed position. The bullnose is located along the first edge. The bullnose pivots relative to the flap as the flap moves between the stowed position and the deployed position.

Figure 1:
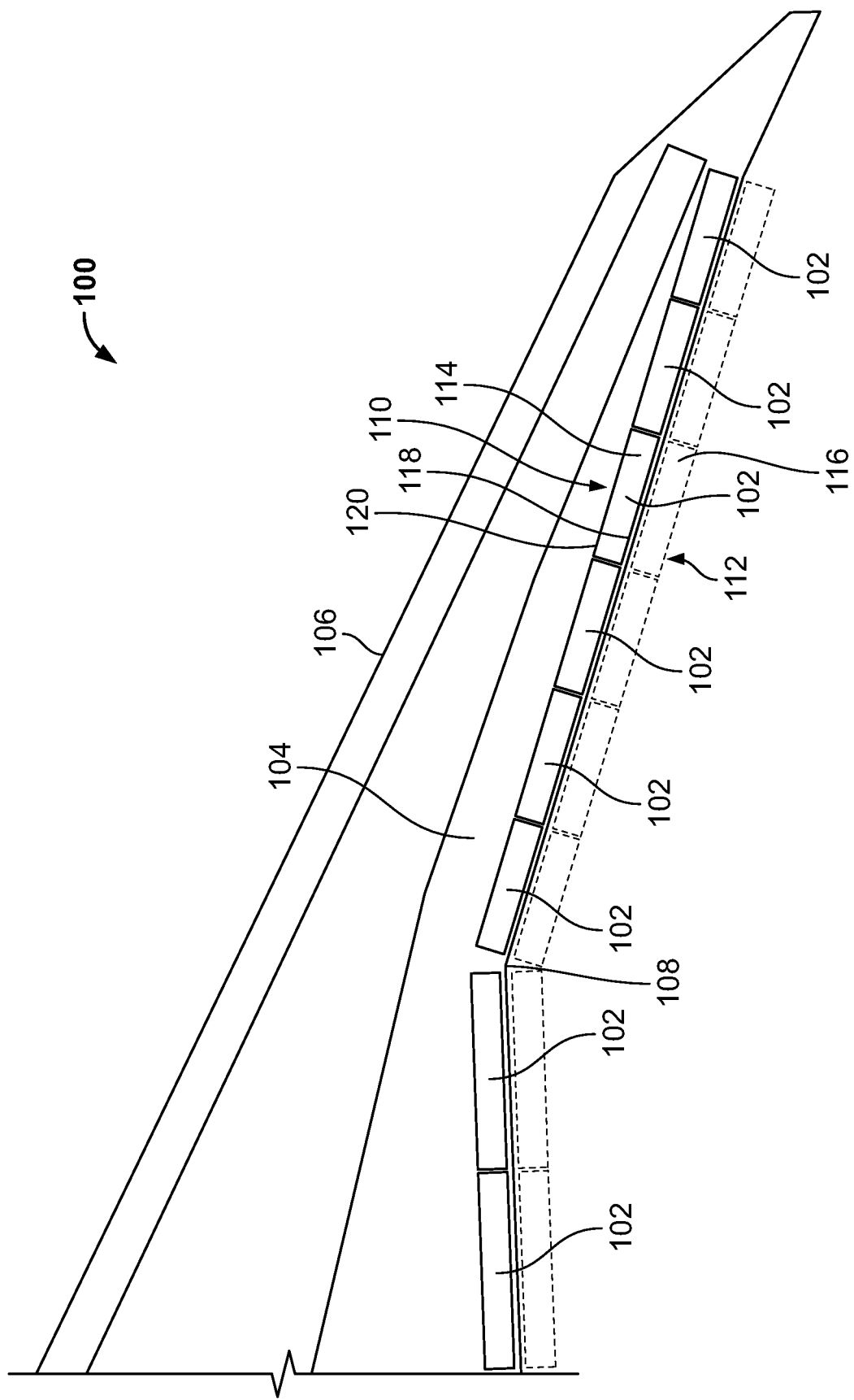
FIG. 1 is a bottom view of an example aircraft wing including an example underwing-mounted trailing edge flap constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Underwing-mounted trailing edge flaps for wings of aircraft as disclosed herein. In some disclosed examples, a wing of an aircraft includes an upper surface, a lower surface located opposite the upper surface, and a trailing edge located between the upper surface and the lower surface. The wing further includes a flap pivotally coupled to the wing. The flap is movable between a stowed position located along the lower surface and a deployed position located rearward of the trailing edge. Movement of the flap is facilitated via a linkage assembly, the entirety of which can be stowed within an internal compartment of the wing when the flap is in the stowed position. The aforementioned configuration of the linkage assembly advantageously eliminates the need for any fairing located along the underside of the wing (e.g., as may occur with track or linkage-deployed Fowler flaps), thereby reducing the significant parasitic drag that is attributable to such fairings. The reduction in drag provides for a corresponding increase in fuel efficiency associated with operating the aircraft. Movement of the flap from the stowed position into the deployed position also advantageously increases both the effective area and the camber of the wing. Lower approach speeds are attainable due to the increased wing area and the increased camber, thereby providing for a safer aircraft that is capable of landing at airfields having relatively short runways or landing strips.

In some disclosed examples, the wing advantageously includes a bullnose pivotally coupled to the flap. The bullnose is located along an edge of the flap, and is configured to pivot relative to the flap as the flap moves between the stowed position and the deployed position. The flap, the bullnose, and the linkage assembly are configured such that the bullnose is located entirely within an internal compartment of the wing when the flap is in the stowed position, and such that the bullnose is located below the trailing edge of the wing when the flap is in the deployed position. The bullnose includes a contoured surface that advantageously provides for an aerodynamically-tuned passage of an airflow through a gap located between the contoured surface of the bullnose and the trailing edge of the wing when the flap is in the deployed position.

In some disclosed examples, the flap is advantageously movable to a first stationary deployment position associated with a takeoff operation of the aircraft, and separately to a second stationary deployment position associated with a landing operation of the aircraft. When the flap is in the first stationary deployment position, the wing has a first camber, the flap is located at a first deployment angle, and the bullnose is separated from the trailing edge by a first gap.

The first camber of the wing, the first deployment angle of the flap, and the first gap associated with the bullnose when the flap is in the first stationary deployment position collectively provide a high-lift, low-drag configuration for the wing that is ideal for executing a takeoff operation of the aircraft. Significant improvements in takeoff field length, climb, and noise reduction are attributable to the high-lift, low-drag configuration associated with the first stationary deployment position. When the flap is in the second stationary deployment position, the wing has a second camber (e.g., greater than the first camber), the flap is located at a second deployment angle (e.g., greater than the first deployment angle), and the bullnose is separated from the trailing edge by a second gap (e.g., greater than the first gap). The second camber of the wing, the second deployment angle of the flap, and the second gap associated with the bullnose when the flap is in the second stationary deployment position collectively provide a high-lift, high-drag configuration for the wing that is ideal for executing a landing operation of the aircraft. Significant improvements in approach speed are attributable to the high-lift, high-drag configuration associated with the second stationary deployment position.

The underwing-mounted trailing edge flaps disclosed herein can advantageously be implemented on different types of aircraft having wings with different types of trailing edge structures. In some examples, an underwing-mounted trailing edge flap disclosed herein is implemented on an aircraft including a wing having a fixed trailing edge, wherein the flap is movable between a stowed position and a deployed position relative to the fixed trailing edge. In other examples, an underwing-mounted trailing edge flap disclosed herein is implemented on an aircraft including a wing having an aileron that is movable relative to a fixed portion of the wing, wherein the aileron forms and/or defines the trailing edge of the wing, and wherein the flap is movable between a stowed position and a deployed position relative to the trailing edge defined by the aileron. In still other examples, an underwing-mounted trailing edge flap disclosed herein is implemented on an aircraft including a wing having a variable camber portion that is movable relative to a fixed portion of the wing, wherein the variable camber portion forms and/or defines the trailing edge of the wing, and wherein the flap is movable between a stowed position and a deployed position relative to the trailing edge defined by the variable camber portion.

The above-identified features as well as other advantageous features of example underwing-mounted trailing edge flaps for wings of aircraft as disclosed herein are further described below in connection with the figures of the application.

As used herein in a mechanical context, the term "configured" means sized, shaped, arranged, structured, oriented, positioned, and/or located. For example, in the context of a first object configured to fit within a second object, the first object is sized, shaped, arranged, structured, oriented, positioned, and/or located to fit within the second object. As used herein in an electrical and/or computing context, the term "configured" means arranged, structured, and/or programmed. For example, in the context of a controller configured to perform a specified operation, the controller is arranged, structured, and/or programmed (e.g., based on machine-readable instructions) to perform the specified operation.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the phrase "in electrical communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 1 is a bottom view of an example aircraft wing 100 including an example underwing-mounted trailing edge flap 102 constructed in accordance with the teachings of this disclosure. The wing 100 and the flap 102 of FIG. 1 can be implemented on any type of aircraft including, for example, commercial aircraft, military aircraft, manned aircraft, unmanned aircraft, etc. In the illustrated example of FIG. 1, the wing 100 is configured as a rearward-swept wing. In other examples, the wing 100 can instead be configured with a different wing shape and/or wing profile, including, for example, a forward-swept wing, an un-swept (e.g., straight) wing, a delta wing, etc. In the illustrated example of FIG. 1, the wing 100 includes eight (8) separate instances of the flap 102. In other examples, the wing 100 can instead include a different number (e.g., 1, 2, 4, 6, 10, etc.) of instances of the flap 102.

The wing 100 of FIG. 1 includes an upper surface, an example lower surface 104, an example leading edge 106, and an example trailing edge 108. The lower surface 104 of the wing 100 is located opposite the upper surface of the wing 100. The leading edge 106 of the wing 100 is located between (e.g., extends between) the upper surface and the lower surface 104 of the wing 100. The trailing edge 108 of the wing 100 is located between (e.g., extends between) the upper surface and the lower surface 104 of the wing 100, opposite the leading edge 106 of the wing 100. In the illustrated example of FIG. 1, the trailing edge 108 of the wing 100 is a fixed trailing edge that does not itself move, but to which the flap 102 of the wing 100 is movable relative thereto. In other examples, the trailing edge 108 of the wing 100 can instead be implemented as and/or defined by a movable wing structure including, for example, an aileron of the wing 100, a variable camber portion of the wing 100, etc., that the flap 102 of the wing 100 moves relative to.

The flap 102 of FIG. 1 is pivotally coupled to the wing 100. FIG. 1 illustrates the flap 102 in an example stowed position 110 (e.g., shown in solid-line format) as well as an example deployed position 112 (e.g., shown in broken-line format) relative to the trailing edge 108 of the wing 100. The flap 102 of FIG. 1 is movable (e.g., pivotable) between the stowed position 110 and the deployed position 112 via an actuation mechanism and/or or a linkage assembly disposed along and/or mounted to an underside of the wing 100. The flap 102 is located along the lower surface 104 of the wing 100 when the flap 102 is in the stowed position 110. At least a portion of the flap 102 (e.g., the majority of the flap 102) is located rearward of the trailing edge 108 of the wing 100 when the flap 102 is in the deployed position 112.

The flap 102 of FIG. 1 includes an example first surface 114, an example second surface 116, an example first edge 118, and an example second edge 120. The second surface 116 of the flap 102 is located opposite the first surface 114 of the flap 102. The first edge 118 of the flap 102 is located between (e.g., extends between) the first surface 114 and the second surface 116 of the flap 102. The second edge 120 of the flap 102 is located between (e.g., extends between) the first surface 114 and the second surface 116 of the flap 102, opposite the first edge 118 of the flap 102.

In the illustrated example of FIG. 1, the flap 102 inverts and/or reverses its orientation as the flap 102 moves from the stowed position 110 into the deployed position 112. When the flap 102 of FIG. 1 is in the stowed position 110, the first surface 114 of the flap 102 faces and/or is generally oriented downward, the second surface 116 of the flap 102 faces and/or is generally oriented upward, the first edge 118 of the flap 102 faces and/or is generally oriented rearward, and the second edge 120 of the flap 102 faces and/or is generally oriented forward. Conversely, when the flap 102 of FIG. 1 is in the deployed position 112, the first surface 114 of the flap 102 faces and/or is generally oriented upward, the second surface 116 of the flap 102 faces and/or is generally oriented downward, the first edge 118 of the flap 102 faces and/or is generally oriented forward, and the second edge 120 of the flap 102 faces and/or is generally oriented rearward. As shown in FIG. 1, the first edge 118 of the flap 102 is located rearward of the second edge 120 of the flap 102 when the flap 102 is in the stowed position 110, and the first edge 118 of the flap 102 is located forward of the second edge 120 of the flap 102 when the flap 102 is in the deployed position 112.

Figure 2:
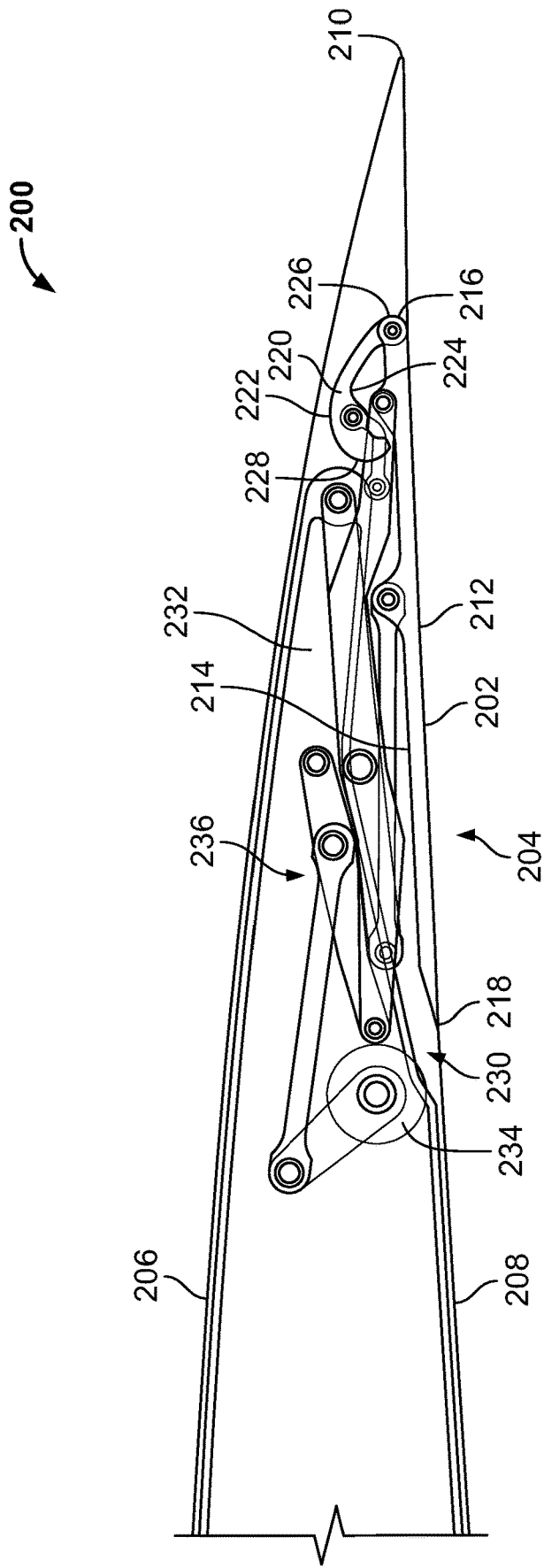
FIG. 2 is a cross-sectional view of an example aircraft wing including an example flap illustrated in an example stowed position.
Figure 3:
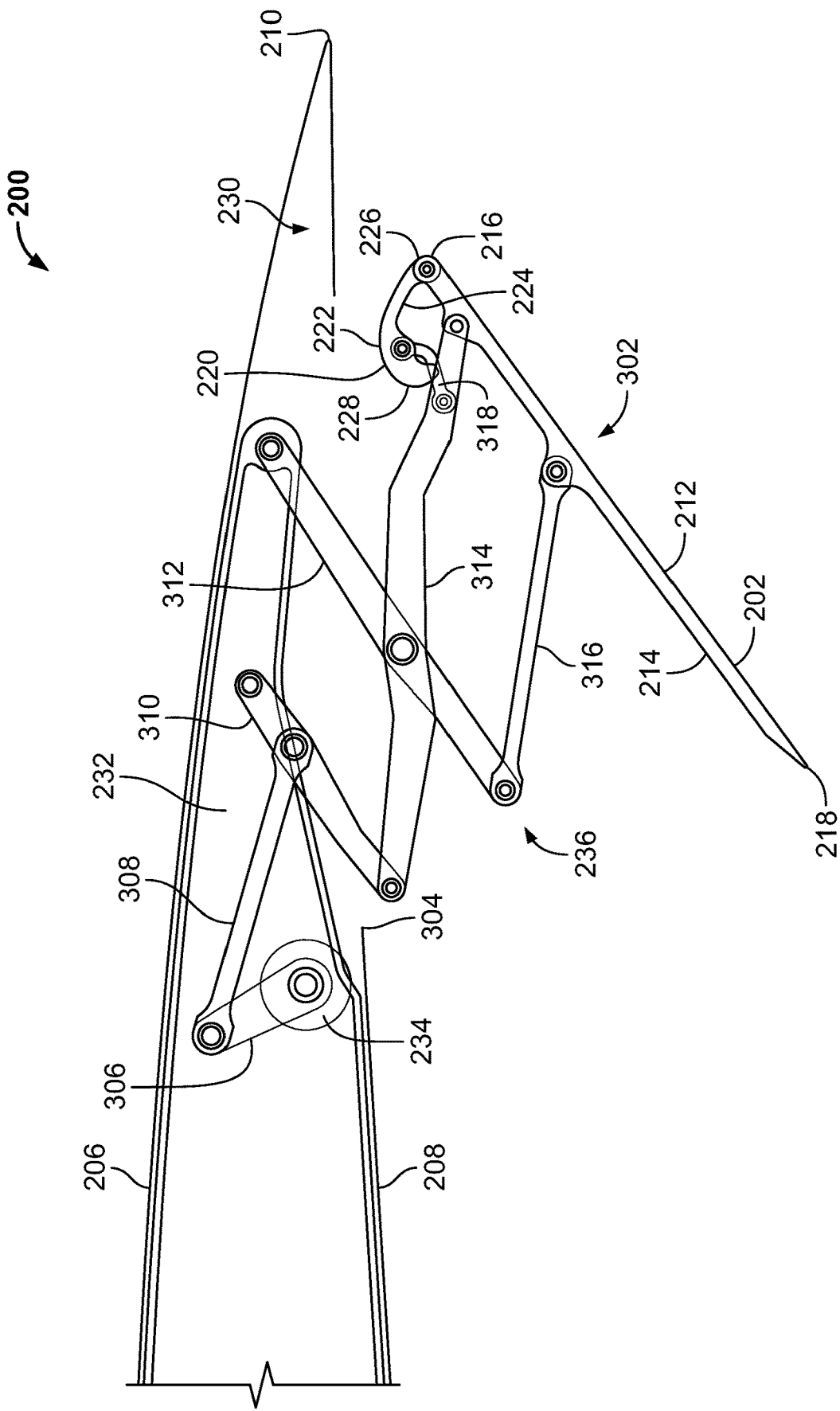
FIG. 3 is a cross-sectional view of the wing of FIG. 2, illustrating the flap of FIG. 2 in a first example intermediary position.
Figure 4:
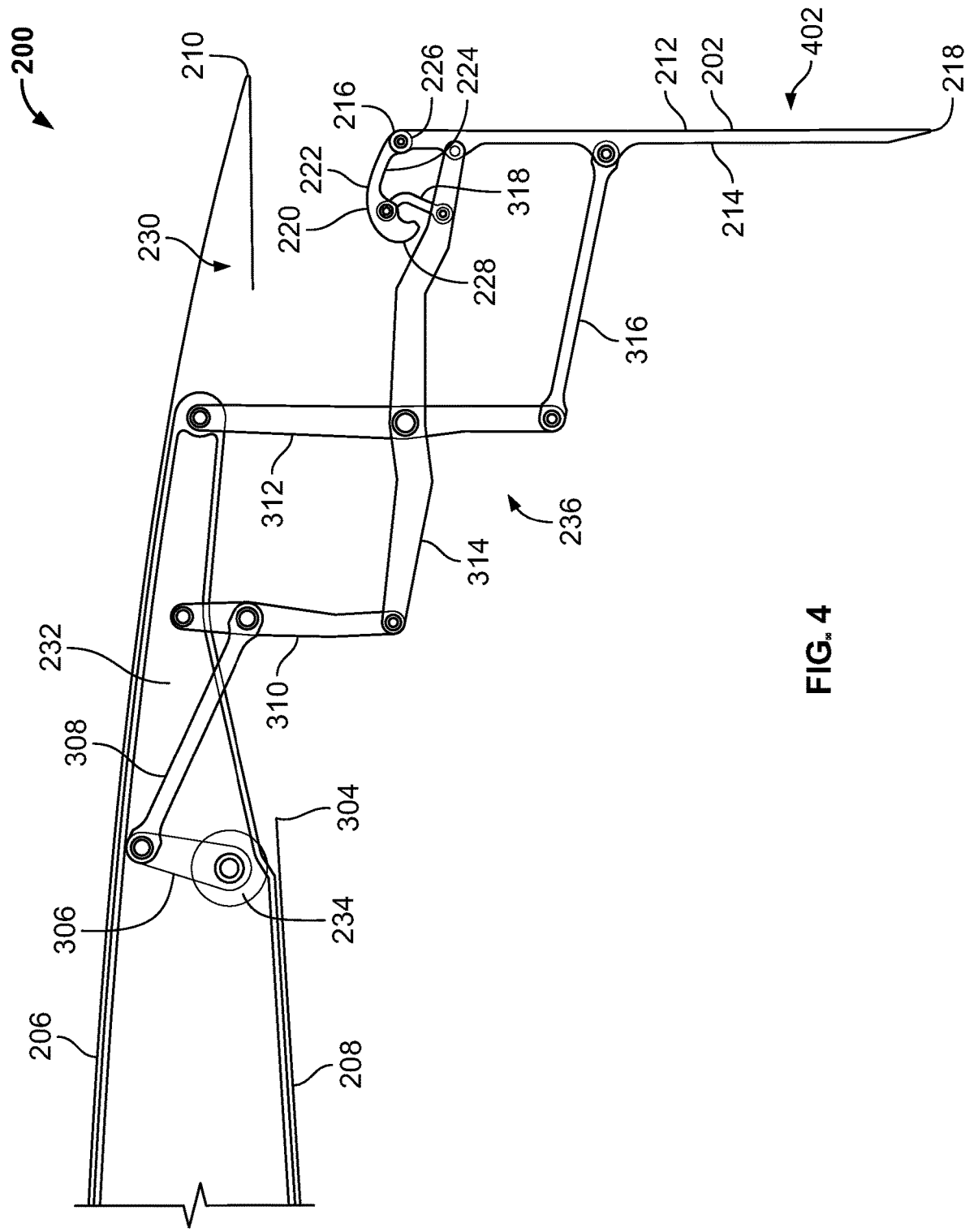
FIG. 4 is a cross-sectional view of the wing of FIGS. 2 and 3, illustrating the flap of FIGS. 2 and 3 in a second example intermediary position.
Figure 5:
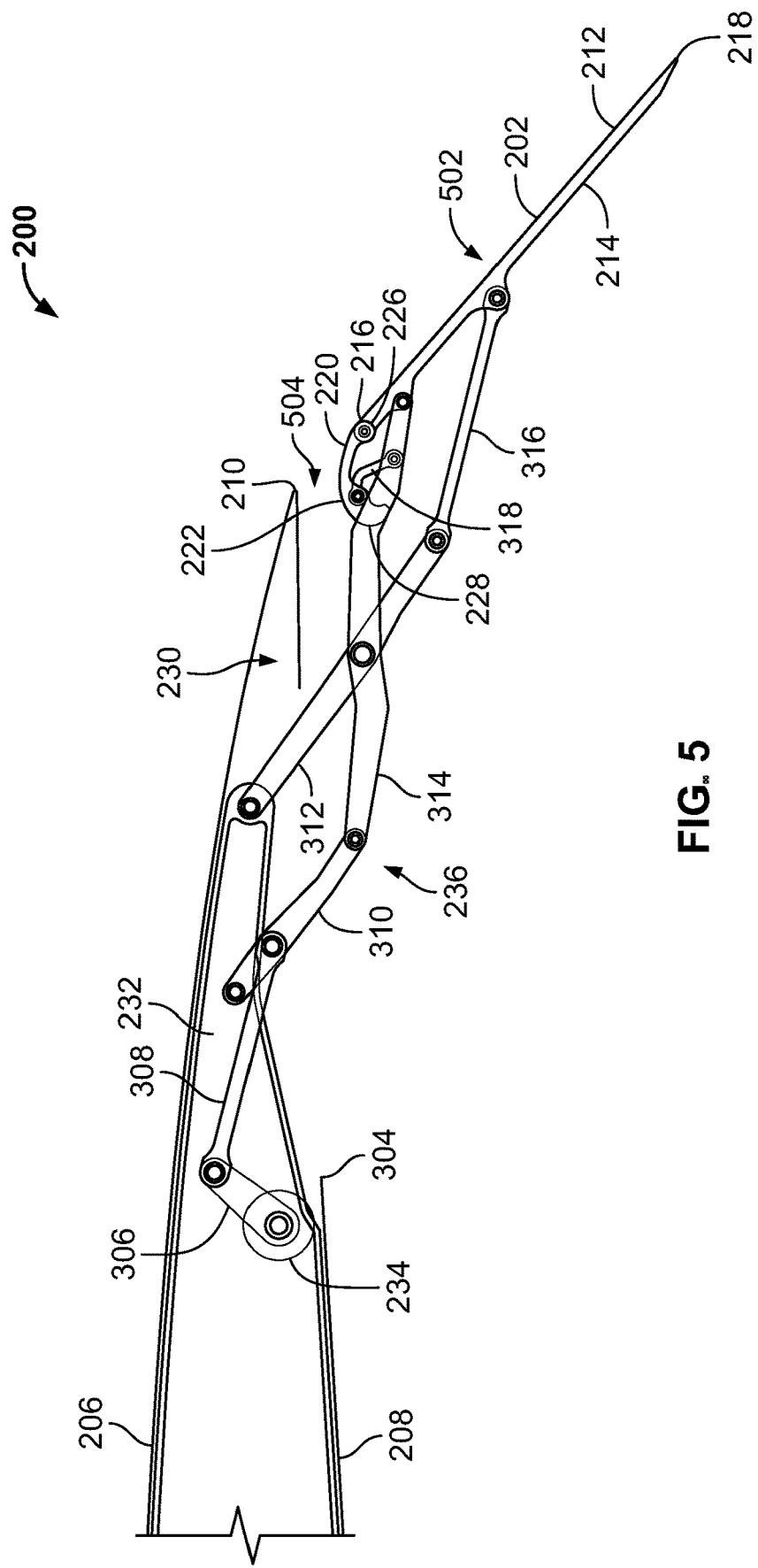
FIG. 5 is a cross-sectional view of the wing of FIGS. 2-4, illustrating the flap of FIGS. 2-4 in an example deployed position.

FIG. 2 is a cross-sectional view of an example aircraft wing 200 including an example flap 202 illustrated in an example stowed position 204. FIG. 3 is a cross-sectional view of the wing 200 of FIG. 2, illustrating the flap 202 of FIG. 2 in a first example intermediary position 302. FIG. 4 is a cross-sectional view of the wing 200 of FIGS. 2 and 3, illustrating the flap 202 of FIGS. 2 and 3 in a second example intermediary position 402. FIG. 5 is a cross-sectional view of the wing 200 of FIGS. 2-4, illustrating the flap 202 of FIGS. 2-4 in an example deployed position 502. The wing 200 and the flap 202 of FIGS. 2-5 are example implementations of the wing 100 and the flap 102 of FIG. 1 described above.

The wing 200 of FIGS. 2-5 includes an example upper surface 206, an example lower surface 208, and an example trailing edge 210. The lower surface 208 of the wing 200 is located opposite the upper surface 206 of the wing 200. The trailing edge 210 of the wing 200 is located between (e.g., extends between) the upper surface 206 and the lower surface 208 of the wing 200, opposite a leading edge of the wing 200. In the illustrated example of FIGS. 2-5, the trailing edge 210 of the wing 200 is a fixed trailing edge that does not itself move, but to which the flap 202 of the wing 200 is moveable relative thereto.

The flap 202 of FIGS. 2-5 is pivotally coupled to the wing 200. In this regard, the flap 202 is movable (e.g., pivotable) relative to the trailing edge 210 of the wing 200 between the stowed position 204 shown in FIG. 2 and the deployed position 502 shown in FIG. 5. The flap 202 passes through one or more intermediary positions (e.g., the first intermediary position 302 shown in FIG. 3, the second intermediary position 402 shown in FIG. 4, etc.) as the flap 202 moves from the stowed position 204 of FIG. 2 into the deployed position 502 of FIG. 5. In some examples, one or more of such intermediary positions constitute stationary deployment positions at which the flap 202 can be fixed, held, and/or otherwise maintained (e.g., during a flight of an aircraft) when the flap 202 is not in the stowed position 204 of FIG. 2. In other examples, the flap 202 can instead be configured such that the deployed position 502 of FIG. 5 constitutes the only stationary deployment position at which the flap 202 can be fixed, held, and/or otherwise maintained (e.g., during a flight of an aircraft) when the flap 202 is not in the stowed position 204 of FIG. 2.

The flap 202 of FIGS. 2-5 is located along the lower surface 208 of the wing 200 when the flap 202 is in the stowed position 204 shown in FIG. 2. In the illustrated example of FIGS. 2-5, the wing 200 further includes an example opening 304 formed in the lower surface 208 of the wing 200. In some examples, the flap 202 and the opening 304 of the wing 200 are respectively configured such that at least a portion of the flap 202 is located within, bounded by, and/or positioned adjacent to the opening 304 when the flap 202 is in the stowed position 204 of FIG. 2. The flap 202 of the wing 200 of FIGS. 2-5 is deployable from and/or through the opening 304 in connection with the flap 202 moving away from the stowed position 204 of FIG. 2 toward the deployed position 502 of FIG. 5. At least a portion of the flap 202 (e.g., the majority of the flap 202) is located rearward of the trailing edge 210 of the wing 200 when the flap 202 is in the deployed position 502 of FIG. 5.

In the illustrated example of FIGS. 2-5, the flap 202 includes an example first surface 212, an example second surface 214, an example first edge 216, and an example second edge 218. The second surface 214 of the flap 202 is located opposite the first surface 212 of the flap 202. The first edge 216 of the flap 202 is located between (e.g., extends between) the first surface 212 and the second surface 214 of the flap 202. The second edge 218 of the flap 202 is located between (e.g., extends between) the first surface 212 and the second surface 214 of the flap 202, opposite the first edge 216 of the flap 202. As shown in FIGS. 2-5, the first surface 212 of the flap 202 extends between the first edge 216 and the second edge 218 of the flap 202. The second surface 214 of the flap 202 similarly extends between the first edge 216 and the second edge 218 of the flap 202. In the illustrated example of FIGS. 2-5, the first surface 212 and the second surface 214 of the flap 202 respectively have a generally planar profile (e.g., a generally flat profile). In other examples, the first surface 212 and/or the second surface 214 of the flap 202 can instead have a non-planar profile (e.g., a curved or contoured profile).

As shown by the sequence of movements of the flap 202 illustrated in FIGS. 2-5, the flap 202 inverts and/or reverses its orientation as the flap 202 moves from the stowed position 204 of FIG. 2 into the deployed position 502 of FIG. 5. When the flap 202 of FIGS. 2-5 is in the stowed position 204 of FIG. 2, the first surface 212 of the flap 202 faces and/or is generally oriented downward, the second surface 214 of the flap 202 faces and/or is generally oriented upward, the first edge 216 of the flap 202 faces and/or is generally oriented rearward, and the second edge 218 of the flap 202 faces and/or is generally oriented forward. Conversely, when the flap 202 of FIGS. 2-5 is in the deployed position 502 of FIG. 5, the first surface 212 of the flap 202 faces and/or is generally oriented upward, the second surface 214 of the flap 202 faces and/or is generally oriented downward, the first edge 216 of the flap 202 faces and/or is generally oriented forward, and the second edge 218 of the flap 202 faces and/or is generally oriented rearward. The first edge 216 of the flap 202 is located rearward of the second edge 218 of the flap 202 when the flap 202 is in the stowed position 204 of FIG. 2. Conversely, the first edge 216 of the flap 202 is located forward of the second edge 218 of the flap 202 when the flap 202 is in the deployed position 502 of FIG. 5.

In some examples, the first surface 212 of the flap 202 is flush with the lower surface 208 of the wing 200 adjacent the opening 304 when the flap 202 is fully retracted into the stowed position 204 of FIG. 2. Positioning the first surface 212 of the flap 202 of the wing 200 in this manner relative to the lower surface 208 of the wing 200 adjacent the opening 304 advantageously reduces (e.g., minimizes) the possibility of aerodynamic drag that may be attributed to the presence of the flap 202 when the flap 202 is in the stowed position 204. Such a reduction in aerodynamic drag is beneficial to the operation of the aircraft during flight, particularly when the aircraft is performing a cruise operation while the flap 202 is in the stowed position 204 of FIG. 2.

In the illustrated example of FIGS. 2-5, the wing 200 further includes an example bullnose 220 pivotally coupled to the flap 202. The bullnose 220 of FIGS. 2-5 includes an example first surface 222, an example second surface 224, an example first end 226, and an example second end 228. The second surface 224 of the bullnose 220 is located opposite the first surface 222 of the bullnose 220. The first end 226 of the bullnose 220 is located between (e.g., extends between) the first surface 222 and the second surface 224 of the bullnose 220. The second end 228 of the bullnose 220 is located between (extends between) the first surface 222 and the second surface 224 of the bullnose 220, opposite the first end 226 of the bullnose 220. As shown in FIGS. 2-5, the first surface 222 of the bullnose 220 extends between the first end 226 and the second end 228 of the bullnose 220. The second surface 224 of the bullnose 220 similarly extends between the first end 226 and the second end 228 of the bullnose 220. The first surface 222 and the second end 228 of the bullnose 220 respectively have a curved or contoured profile.

In the illustrated example of FIGS. 2-5, the first end 226 of the bullnose 220 is pivotally coupled to the flap 202 along the first edge 216 of the flap 202. By contrast, the second end 228 of the bullnose 220 is a free end that is generally not connected to any structural component of the flap 202 and/or, more generally, is not connected to any structural component of the wing 200. In other examples, the second end 228 of the bullnose 220 can be connected to a structural component of the wing 200, such as to a component of a linkage assembly of the wing 200 that facilitates movement of the flap 202 between the stowed position 204 of FIG. 2 and the deployed position 502 of FIG. 5.

The bullnose 220 of FIGS. 2-5 is configured to pivot relative to the flap 202 as the flap 202 moves between the stowed position 204 of FIG. 2 and the deployed position 502 of FIG. 5. When the flap 202 is in the stowed position 204 of FIG. 2, the bullnose 220 is located within an example internal compartment 230 of the wing 200 spatially and/or physically bounded by the upper surface 206, the lower surface 208, and the trailing edge 210 of the wing 200. When so positioned, the bullnose 220 is effectively folded onto the flap 202 such that the first surface 222 of the bullnose 220 and the first surface 212 of the flap 202 face and/or are generally oriented away from one another, and such that the second surface 224 of the bullnose 220 and the second surface 214 of the flap 202 face and/or are generally oriented toward one another.

When the flap 202 is in the deployed position 502 of FIG. 5, the bullnose 220 is located below the trailing edge 210 of the wing 200. When so positioned, the bullnose 220 is unfolded from and/or relative to the flap 202 such that the first surface 222 of the bullnose 220 and the first surface 212 of the flap 202 face and/or are generally oriented in a same or similar direction (e.g., upwards), and such that the second surface 224 of the bullnose 220 and the second surface 214 of the flap 202 face and/or are generally oriented in another same or similar direction (e.g., downwards). As shown in FIGS. 2-5, regardless of whether the flap 202 is in the stowed position 204 of FIG. 2 or the deployed position 502 of FIG. 5, the first surface 222 of the bullnose 220 faces and/or is generally oriented upward, the second surface 224 of the bullnose 220 faces and/or is generally oriented downward, the first end 226 of the bullnose 220 faces and/or is generally oriented rearward, and the second end 228 of the bullnose 220 faces and/or is generally oriented forward. Thus, unlike the flap 202, which inverts and/or reverses its orientation as the flap 202 moves from the stowed position 204 of FIG. 2 into the deployed position 502 of FIG. 5, the bullnose 220, which pivots relative to the flap 202, generally maintains its orientation as the flap 202 moves from the stowed position 204 of FIG. 2 into the deployed position 502 of FIG. 5.

As shown in FIG. 5, the first surface 222 of the bullnose 220 of the wing 200 is separated from the lower surface 208 of the wing 200 and/or from the trailing edge 210 of the wing 200 by an example gap 504 when the flap 202 is in the deployed position 502 of FIG. 5. The presence of the gap 504 advantageously facilitates the aerodynamic passage of an airflow between the bullnose 220 of the wing 200 and the lower surface 208 and/or the trailing edge 210 of the wing 200. In this regard, the bullnose 220, the lower surface 208, and/or the trailing edge 210 of the wing 200 are respectively configured such that an airflow passes upward and/or rearward over the contoured second end 228 of the bullnose 220 of the wing 200, and then subsequently rearward through the gap 504 formed between the contoured first surface 222 of the bullnose 220 of the wing 200 on the one hand and the lower surface 208 and/or the trailing edge 210 of the wing 200 on the other hand. The contoured surface(s) of the bullnose 220 advantageously provide for an aerodynamically-tuned passage of the airflow through the gap 504 when the flap 202 is in the deployed position 502 of FIG. 5.

In the illustrated example of FIGS. 2-5, the bullnose 220 has a length extending from the first end 226 to the second end 228 of the bullnose 220, and the flap 202 has a length extending from the first edge 216 to the second edge 218 of the flap 202. In some examples, the length of the bullnose 220 is significantly less than the length of the flap 202. For example, as shown in FIGS. 2-5, the length of the bullnose 220 is approximately one-fifth (e.g., twenty percent) of the length of the flap 202. In other examples, the extent to which the length of the bullnose 220 is less than the length of the flap 202 can differ (e.g., five percent less, ten percent less, fifty percent less, seventy-five percent less, ninety percent less, etc.). In still other examples, the length of the bullnose 220 can instead be greater than or approximately equal to the length of the flap 202.

The wing 200 of FIGS. 2-5 further includes an example structural rib 232, an example actuator 234, and an example linkage assembly 236. The structural rib 232 is positioned at a fixed location within the internal compartment 230 of the wing 200, with the structural rib 232 being spatially and/or physically bounded by the upper surface 206, the lower surface 208, and the trailing edge 210 of the wing 200. In the illustrated example of FIGS. 2-5, a portion (e.g., a fixed portion) of the actuator 234 is coupled to the structural rib 232. In other examples, the portion (e.g., the fixed portion) of the actuator 234 is instead coupled to another structural component of the wing 200. In the illustrated example of FIGS. 2-5, the actuator 234 is implemented as a rotary actuator configured to move (e.g., rotate or pivot) one or more component(s) of the linkage assembly 236 to effect movement of the flap 202 of FIGS. 2-5 between the stowed position 204 of FIG. 2 and the deployed position 502 of FIG. 5. In other examples, the actuator 234 is instead implemented as a translational actuator configured to move (e.g., slide or extend) one or more component(s) of the linkage assembly 236 to effect movement of the flap 202 of FIGS. 2-5 between the stowed position 204 of FIG. 2 and the deployed position 502 of FIG. 5.

The actuator 234 of FIGS. 2-5 is actuated, controlled, and/or operated by one or more control system(s) of the wing 200 and/or, more generally, of the aircraft that implements the wing 200. Such control system(s) can include an electrical control system operatively coupled to the actuator 234, a mechanical control system operatively coupled to the actuator 234, a hydraulic control system operatively coupled to the actuator 234, a pneumatic control system operatively coupled to the actuator 234, and/or any combination thereof.

In the illustrated example of FIGS. 2-5, the linkage assembly 236 is coupled to one or more portion(s) of the structural rib 232, to the actuator 234, to the flap 202, and to the bullnose 220 of the wing 200. The linkage assembly 236 is configured to move the flap 202 between the stowed position 204 of FIG. 2 and the deployed position 502 of FIG. 5 in response to actuation of the actuator 234. As best shown in FIGS. 3-5, the linkage assembly 236 of FIGS. 2-5 includes an example drive arm 306, an example drive coupler 308, an example crank 310, an example rocker 312, an example crank coupler 314, an example panel coupler 316, and an example bullnose coupler 318. In other examples, the linkage assembly 236 of the wing 200 can include a different number and/or a different arrangement of components relative to the components of the linkage assembly 236 of FIGS. 2-5 referenced above and further described herein.

In the illustrated example of FIGS. 2-5, a first end of the drive arm 306 is operatively coupled to the actuator 234, and a second end of the drive arm 306 is pivotally coupled to the drive coupler 308. A first end of the drive coupler 308 is pivotally coupled to the drive arm 306, and a second end of the drive coupler 308 is pivotally coupled to the crank 310. A first end of the crank 310 is pivotally coupled to the structural rib 232, and a second end of the crank 310 is pivotally coupled to the crank coupler 314. The crank 310 is also pivotally coupled to the drive coupler 308 at a location between the first and second ends of the crank 310. A first end of the rocker 312 is pivotally coupled to the structural rib 232, and a second end of the rocker 312 is pivotally coupled to the panel coupler 316. The rocker 312 is also pivotally coupled to the crank coupler 314 at a location between the first and second ends of the rocker 312. A first end of the crank coupler 314 is pivotally coupled to the crank 310, and a second end of the crank coupler 314 is pivotally coupled to the flap 202. The crank coupler 314 is also pivotally coupled to the rocker 312 and to the bullnose coupler 318 at separate locations between the first and second ends of the crank coupler 314. A first end of the panel coupler 316 is pivotally coupled to the rocker 312, and a second end of the panel coupler 316 is pivotally coupled to the flap 202. A first end of the bullnose coupler 318 is pivotally coupled to the crank coupler 314, and a second end of the bullnose coupler 318 is pivotally coupled to the bullnose 220.

The flap 202 of the wing 200 is pivotally coupled to the crank coupler 314 and to the panel coupler 316 of the linkage assembly 236 of the wing 200 at separate locations along the second surface 214 of the flap 202. The first end 226 of the bullnose 220 of the wing 200 is pivotally coupled to the flap 202 of the wing 200 at and/or along the first edge 216 of the flap 202. The bullnose 220 of the wing 200 is also pivotally coupled to the bullnose coupler 318 of the linkage assembly 236 of the wing 200 at a location between the first end 226 and the second end 228 of the bullnose 220 at and/or along the second surface 224 of the bullnose 220. In the illustrated example of FIGS. 2-5, the bullnose coupler 318 of the linkage assembly 236 is configured to cause the bullnose 220 to pivot relative to the flap 202 as the flap 202 moves between the stowed position 204 of FIG. 2 and the deployed position 502 of FIG. 5.

When the flap 202 of FIGS. 2-5 is in the stowed position 204 of FIG. 2, the drive arm 306, the drive coupler 308, the crank 310, the rocker 312, the crank coupler 314, the panel coupler 316, and the bullnose coupler 318 of the linkage assembly 236 are respectively located within the internal compartment 230 of the wing 200, with each of the drive arm 306, the drive coupler 308, the crank 310, the rocker 312, the crank coupler 314, the panel coupler 316, and the bullnose coupler 318 being spatially and/or physically bounded by the upper surface 206, the lower surface 208, and the trailing edge 210 of the wing 200. As the flap 202 of FIGS. 2-5 moves from the stowed position 204 of FIG. 2 into the deployed position 502 of FIG. 5, one or more portion(s) of the drive coupler 308, the crank 310, the rocker 312, the crank coupler 314, the panel coupler 316, and the bullnose coupler 318 of the linkage assembly 236 exit and/or deploy from the internal compartment 230 of the wing 200 via the opening 304 formed in the lower surface 208 of the wing 200, thereby positioning at least a portion (e.g., the majority) of the flap 202 rearward of the trailing edge 210 of the wing 200, and positioning the bullnose 220 below the lower surface 208 and/or below the trailing edge 210 of the wing 200.

Figure 6:
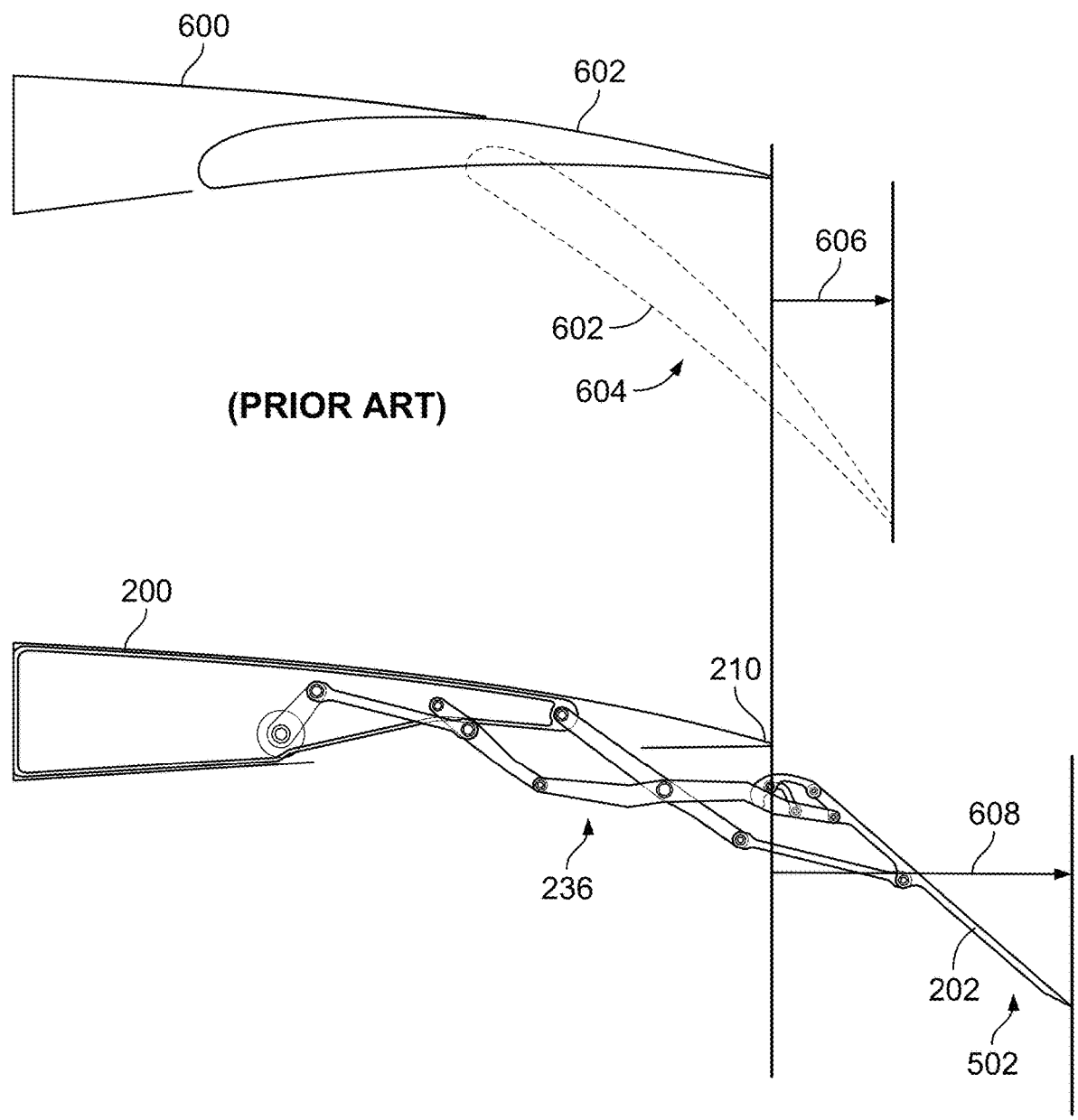
FIG. 6 is a cross-sectional view of the wing of FIGS. 2-5, illustrating the flap of FIGS. 2-5 in the deployed position, and comparing the wing of FIGS. 2-5 to a known wing including a known flap illustrated in a known deployed position.

FIG. 6 is a cross-sectional view of the wing 200 of FIGS. 2-5, illustrating the flap 202 of FIGS. 2-5 in the deployed position 502 of FIG. 5, and comparing the wing 200 of FIGS. 2-5 to a known wing 600 including a known flap 602 illustrated in a known deployed position 604. As shown in FIG. 6, deployment of the known flap 602 relative to a fixed portion of the known wing 600 increases the length and/or the chord of the known wing 600 by a first distance 606. By comparison, deployment of the flap 202 relative to a fixed portion (e.g., the trailing edge 210) of the wing 200 advantageously increases the length and/or the chord of the wing 200 by a second distance 608 that is greater than (e.g., significantly greater than) the first distance 606. For example, as shown in FIG. 6, the second distance 608 is more than double the first distance 606.

The aforementioned improvement in the increased length and/or chord of the wing 200 resulting from deployment of the flap 202 (e.g., as shown by the second distance 608 of FIG. 6) relative to the increased length and/or chord of the known wing 600 resulting from deployment of the known flap 602 (e.g., as shown by the first distance 606 of FIG. 6) provides for a corresponding improvement with regard to an increase in the area of the wing 200 resulting from deployment of the flap 202 relative to an increase in the area of the known wing 600 resulting from deployment of the known flap 602. This improvement in the increased area of the wing 200 resulting from deployment of the flap 202 relative to the increase area of the known wing 600 resulting from deployment of the known flap 602 provides for enhanced aerodynamics of the wing 200 relative to the known wing 600, particularly during takeoff and/or landing operations of an aircraft including the wing 200.

In some examples, the flap 202, the bullnose 220, the structural rib 232, the actuator 234, and/or one or more component(s) of the linkage assembly 236 of the wing 200 of FIGS. 2-5, and/or their connection points or relative positions, etc., can be specifically configured to facilitate movement of the flap 202 of the wing 200 of FIGS. 2-5 to a plurality of stationary deployment positions at which the flap 202 can be fixed, held and/or otherwise maintained (e.g., during a flight of an aircraft) when the flap 202 is not in the stowed position 204 of FIG. 2. In some such examples, the flap 202 is deployable to a first stationary deployment position associated with a takeoff operation of an aircraft implementing the wing 200, and to a second stationary deployment position (e.g., different from the first stationary deployment position) associated with a landing operation of an aircraft implementing the wing 200.

Figure 7:
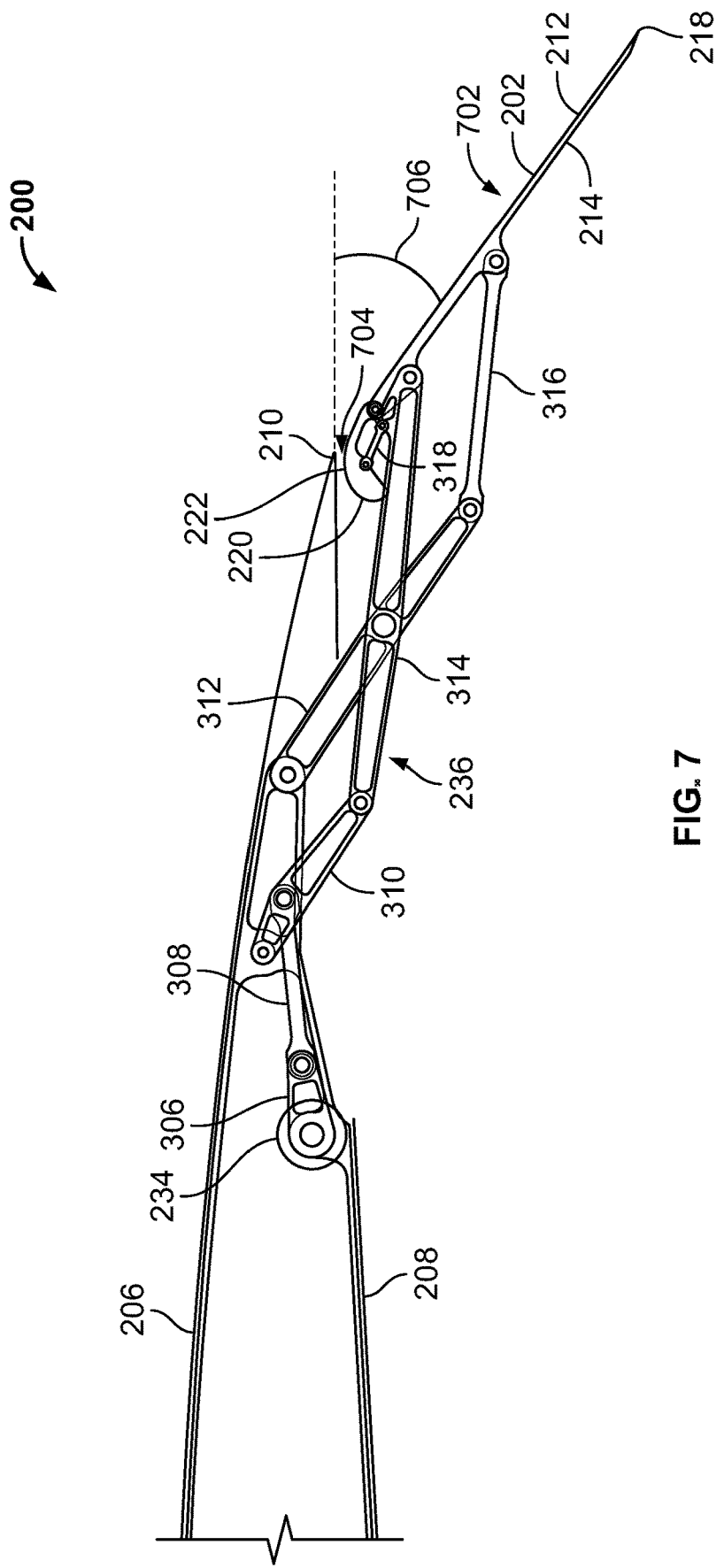
FIG. 7 is a cross-sectional view of the wing of FIGS. 2-6, illustrating the flap of FIGS. 2-6 in a first example stationary deployment position associated with a takeoff operation of an aircraft implementing the wing.
Figure 8:
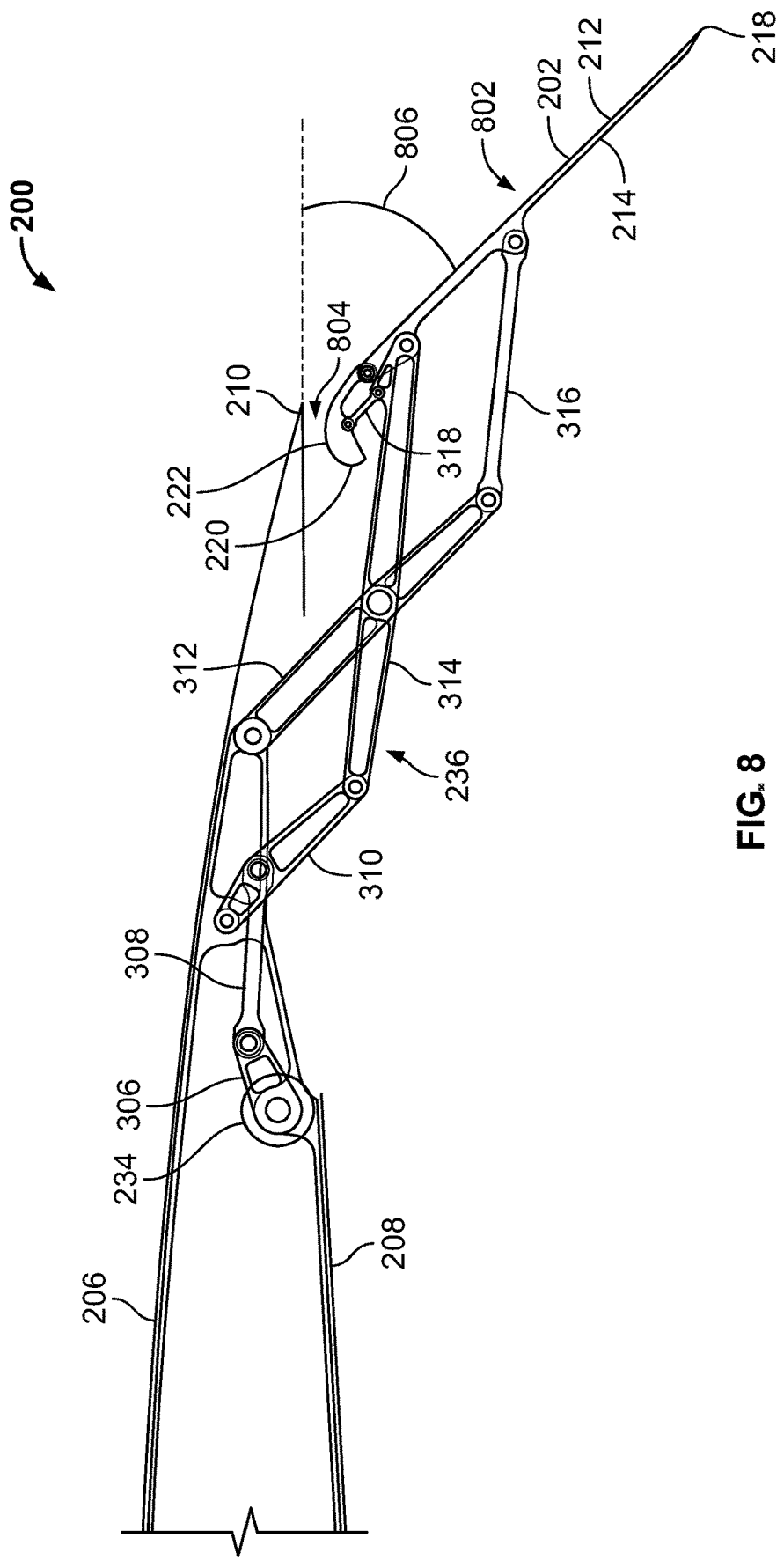
FIG. 8 is a cross-sectional view of the wing of FIGS. 2-7, illustrating the flap of FIGS. 2-7 in a second example stationary deployment position associated with a landing operation of an aircraft implementing the wing.
Figure 9:
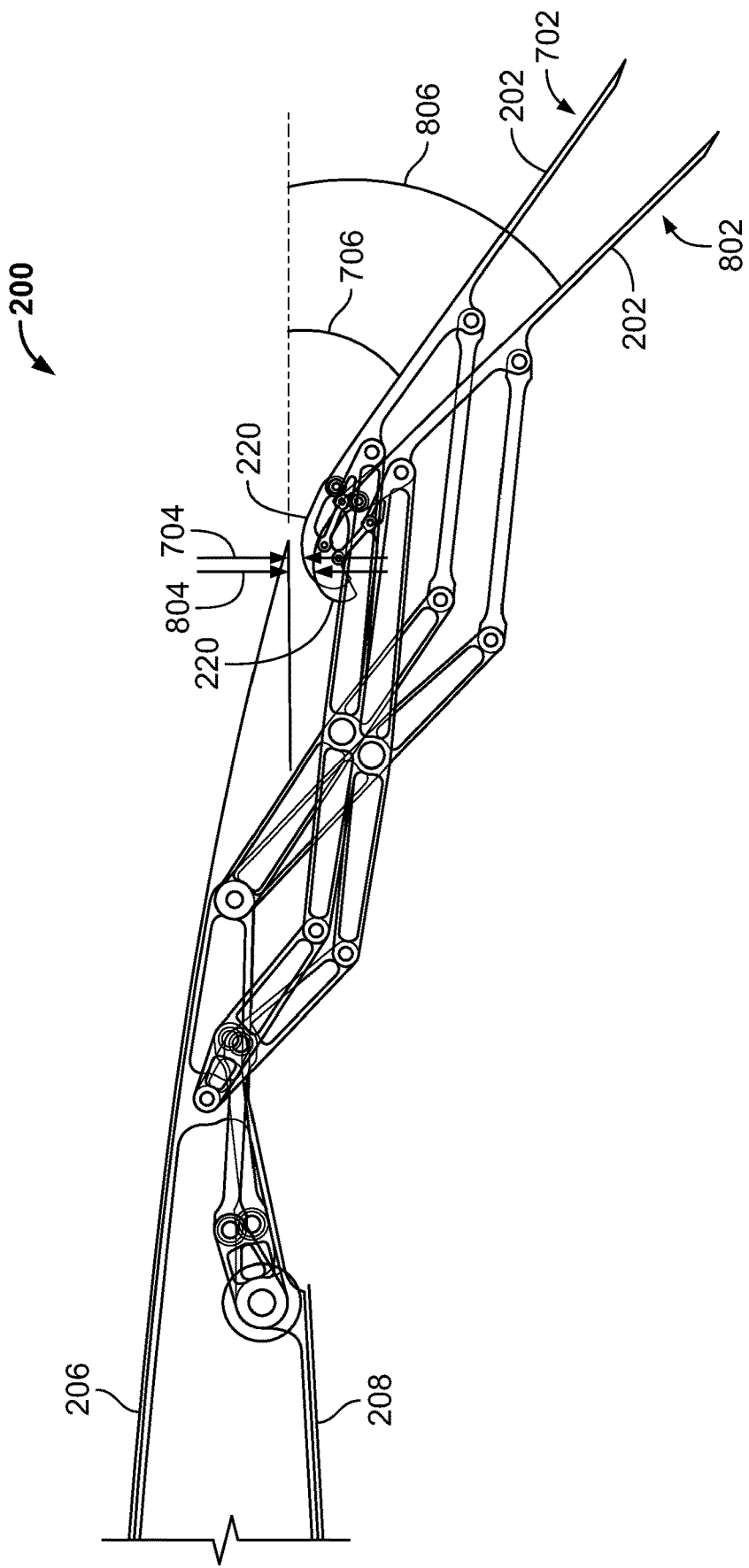
FIG. 9 is a reproduction of FIG. 7 overlaid by FIG. 8, illustrating differences between the first stationary deployment position of the flap as shown in FIG. 7 and the second stationary deployment position of the flap as shown in FIG. 8.

FIG. 7 is a cross-sectional view of the wing 200 of FIGS. 2-6, illustrating the flap 202 of FIGS. 2-6 in a first example stationary deployment position 702 associated with a takeoff operation of an aircraft implementing the wing 200. FIG. 8 is a cross-sectional view of the wing 200 of FIGS. 2-7, illustrating the flap 202 of FIGS. 2-7 in a second example stationary deployment position 802 associated with a landing operation of an aircraft implementing the wing 200. FIG. 9 is a reproduction of FIG. 7 overlaid by FIG. 8, illustrating differences between the first stationary deployment position 702 of the flap 202 as shown in FIG. 7 and the second stationary deployment position 802 of the flap 202 as shown in FIG. 8. In the illustrated example of FIGS. 7-9, the flap 202, the bullnose 220, the structural rib 232, the actuator 234, and/or one or more component(s) of the linkage assembly 236 of the wing 200 are specifically configured (e.g., modified relative to the flap 202, the bullnose 220, the structural rib 232, the actuator 234, and/or the components of the linkage assembly 236 shown in FIGS. 2-5) to facilitate movement of the flap 202 of the wing 200 to the first stationary deployment position 702 and the second stationary deployment position 802.

As shown in FIGS. 7 and 9, the bullnose 220 of the wing 200 is separated from the trailing edge 210 of the wing 200 by a first example gap 704 when the flap 202 of the wing 200 is in the first stationary deployment position 702. As shown in FIGS. 8 and 9, the bullnose 220 of the wing 200 is separated from the trailing edge 210 of the wing 200 by a second example gap 804 when the flap 202 of the wing 200 is in the second stationary deployment position 802. In the illustrated example of FIGS. 7-9, the second gap 804 associated with the second stationary deployment position 802 of the flap 202 is greater than the first gap 704 associated with the first stationary deployment position 702 of the flap 202. In other examples, the second gap 804 associated with the second stationary deployment position 802 of the flap 202 can instead be less than or equal to the first gap 704 associated with the first stationary deployment position 702 of the flap 202.

As shown in FIGS. 7 and 9, the wing 200 has a first camber defined in part by a first example deployment angle 706 of the flap 202 of the wing 200 when the flap 202 is in the first stationary deployment position 702. As shown in FIGS. 8 and 9, the wing 200 has a second camber defined in part by a second example deployment angle 806 of the flap 202 of the wing 200 when the flap 202 is in the second stationary deployment position 802. In the illustrated example of FIGS. 7-9, the second deployment angle 806 associated with the second stationary deployment position 802 of the flap 202 is greater than the first deployment angle 706 associated with the first stationary deployment position 702 of the flap 202, and the second camber associated with the second stationary deployment position 802 of the flap 202 is accordingly greater than the first camber associated with the first stationary deployment position 702 of the flap 202. In other examples, the second deployment angle 806 associated with the second stationary deployment position 802 of the flap 202 can instead be less than or equal to the first deployment angle 706 associated with the first stationary deployment position 702 of the flap 202, and the second camber associated with the second stationary deployment position 802 of the flap 202 can instead accordingly be less than or equal to the first camber associated with the first stationary deployment position 702 of the flap 202.

Figure 10:
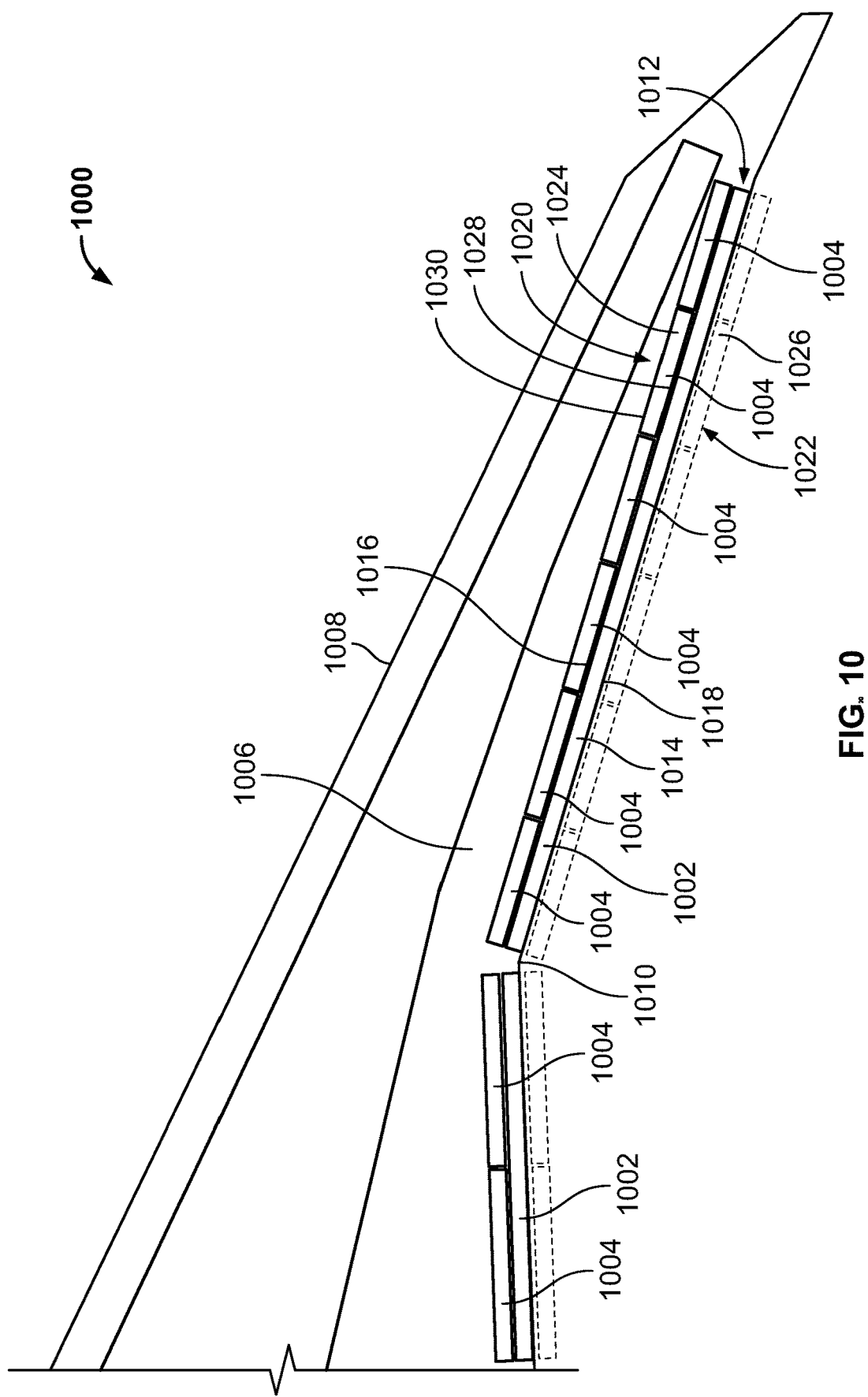
FIG. 10 is a bottom view of an example aircraft wing including an example aileron and an example underwing-mounted trailing edge flap constructed in accordance with the teachings of this disclosure.

FIG. 10 is a bottom view of an example aircraft wing 1000 including an example aileron 1002 and an example under-wing-mounted trailing edge flap 1004 constructed in accordance with the teachings of this disclosure. The wing 1000, the aileron 1002, and the flap 1004 of FIG. 10 can be implemented on any type of aircraft including, for example, commercial aircraft, military aircraft, manned aircraft, unmanned aircraft, etc. In the illustrated example of FIG. 10, the wing 1000 is configured as a rearward-swept wing. In other examples, the wing 1000 can instead be configured with a different wing shape and/or wing profile, including, for example, a forward-swept wing, an un-swept (e.g., straight) wing, a delta wing, etc.

In the illustrated example of FIG. 10, the wing 1000 includes two (2) separate instances of the aileron 1002 and eight (8) separate instances of the flap 1004. In other examples, the wing 1000 can instead include a different number (e.g., 1, 3, 4, 8, etc.) of instances of the aileron 1002, and/or a different number (e.g., 1, 2, 4, 6, 10, etc.) of instances of the flap 1004. The number of instances of the aileron 1002 and the number of instances of the flap 1004 included by the wing 1000 can vary independently of one another. For example, the number of instances of the aileron 1002 can be less than the number of instances of the flap 1004, as generally shown in FIG. 10. As another example, the number of instances of the aileron 1002 can be equal to the number of instances of the flap 1004. As yet another example, the number of instances of the aileron 1002 can be greater than the number of instances of the flap 1004.

The wing 1000 of FIG. 10 includes an upper surface, an example lower surface 1006, an example leading edge 1008, and an example fixed trailing edge 1010. The lower surface 1006 of the wing 1000 is located opposite the upper surface of the wing 1000. The leading edge 1008 of the wing 1000 is located between (e.g., extends between) the upper surface and the lower surface 1006 of the wing 1000. The fixed trailing edge 1010 of the wing 1000 is located between (e.g., extends between) the upper surface and the lower surface 1006 of the wing 1000, opposite the leading edge 1008 of the wing 1000.

The aileron 1002 of FIG. 10 is pivotally coupled to the wing 1000. FIG. 10 illustrates the aileron 1002 in an example neutral position 1012 relative to the fixed trailing edge 1010 of the wing 1000. The aileron 1002 of FIG. 10 is movable (e.g., pivotable) from the neutral position 1012 to and/or between a raised position and a lowered position via an actuation mechanism and/or or a linkage assembly disposed along and/or mounted to the wing 1000. The aileron 1002 of FIG. 10 accordingly defines a trailing edge of the wing 1000 that is movable (e.g., pivotable) relative to a fixed portion of the wing 1000 (e.g., the fixed trailing edge 1010 of the wing 1000).

In the illustrated example of FIG. 10, the aileron 1002 includes an upper surface, an example lower surface 1014, an example leading edge 1016, and an example trailing edge 1018. The lower surface 1014 of the aileron 1002 is located opposite the upper surface of the aileron 1002. The leading edge 1016 of the aileron 1002 is located between (e.g., extends between) the upper surface and the lower surface 1014 of the aileron 1002. The trailing edge 1018 of the aileron 1002 is located between (e.g., extends between) the upper surface and the lower surface 1014 of the aileron 1002, opposite the leading edge 1016 of the aileron 1002. When the aileron 1002 of FIG. 10 is in the neutral position 1012, the trailing edge 1018 of the aileron 1002 is generally aligned with the fixed trailing edge 1010 of the wing 1000. When the aileron 1002 is in the raised position, the aileron 1002 is pivoted upward relative to the neutral position 1012 such that the trailing edge 1018 of the aileron 1002 is located above the fixed trailing edge 1010 of the wing 1000. Conversely, when the aileron 1002 is in the lowered position, the aileron 1002 is pivoted downward relative to the neutral position 1012 such that the trailing edge 1018 of the aileron 1002 is located below the fixed trailing edge 1010 of the wing 1000.

The flap 1004 of FIG. 10 is pivotally coupled to the wing 1000. FIG. 10 illustrates the flap 1004 in an example stowed position 1020 (e.g., shown in solid-line format) as well as an example deployed position 1022 (e.g., shown in broken-line format) relative to the fixed trailing edge 1010 of the wing 1000, and/or relative to the trailing edge 1018 of the aileron 1002. The flap 1004 of FIG. 10 is movable (e.g., pivotable) between the stowed position 1020 and the deployed position 1022 via an actuation mechanism and/or or a linkage assembly disposed along and/or mounted to an underside of the wing 1000. The flap 1004 is located along the lower surface 1006 of the wing 1000 when the flap 1004 is in the stowed position 1020. At least a portion of the flap 1004 (e.g., the majority of the flap 1004) is located rearward of the fixed trailing edge 1010 of the wing 1000 and/or rearward of the trailing edge 1018 of the aileron 1002 when the flap 1004 is in the deployed position 1022.

The flap 1004 of FIG. 10 includes an example first surface 1024, an example second surface 1026, an example first edge 1028, and an example second edge 1030. The second surface 1026 of the flap 1004 is located opposite the first surface 1024 of the flap 1004. The first edge 1028 of the flap 1004 is located between (e.g., extends between) the first surface 1024 and the second surface 1026 of the flap 1004. The second edge 1030 of the flap 1004 is located between (e.g., extends between) the first surface 1024 and the second surface 1026 of the flap 1004, opposite the first edge 1028 of the flap 1004.

In the illustrated example of FIG. 10, the flap 1004 inverts and/or reverses its orientation as the flap 1004 moves from the stowed position 1020 into the deployed position 1022. When the flap 1004 of FIG. 10 is in the stowed position 1020, the first surface 1024 of the flap 1004 faces and/or is generally oriented downward, the second surface 1026 of the flap 1004 faces and/or is generally oriented upward, the first edge 1028 of the flap 1004 faces and/or is generally oriented rearward, and the second edge 1030 of the flap 1004 faces and/or is generally oriented forward. Conversely, when the flap 1004 of FIG. 10 is in the deployed position 1022, the first surface 1024 of the flap 1004 faces and/or is generally oriented upward, the second surface 1026 of the flap 1004 faces and/or is generally oriented downward, the first edge 1028 of the flap 1004 faces and/or is generally oriented forward, and the second edge 1030 of the flap 1004 faces and/or is generally oriented rearward. As shown in FIG. 10, the first edge 1028 of the flap 1004 is located rearward of the second edge 1030 of the flap 1004 when the flap 1004 is in the stowed position 1020, and the first edge 1028 of the flap 1004 is located forward of the second edge 1030 of the flap 1004 when the flap 1004 is in the deployed position 1022.

Figure 11:
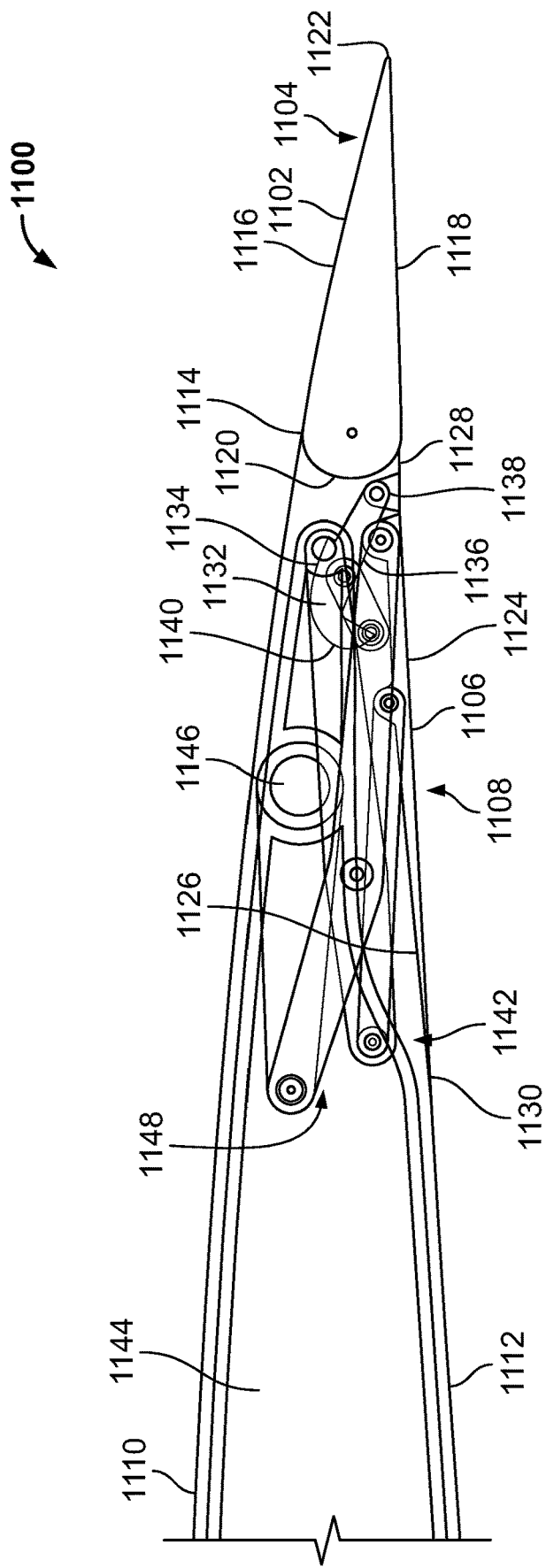
FIG. 11 is a cross-sectional view of an example aircraft wing including an example aileron illustrated in an example neutral position, and an example flap illustrated in an example stowed position.
Figure 12:
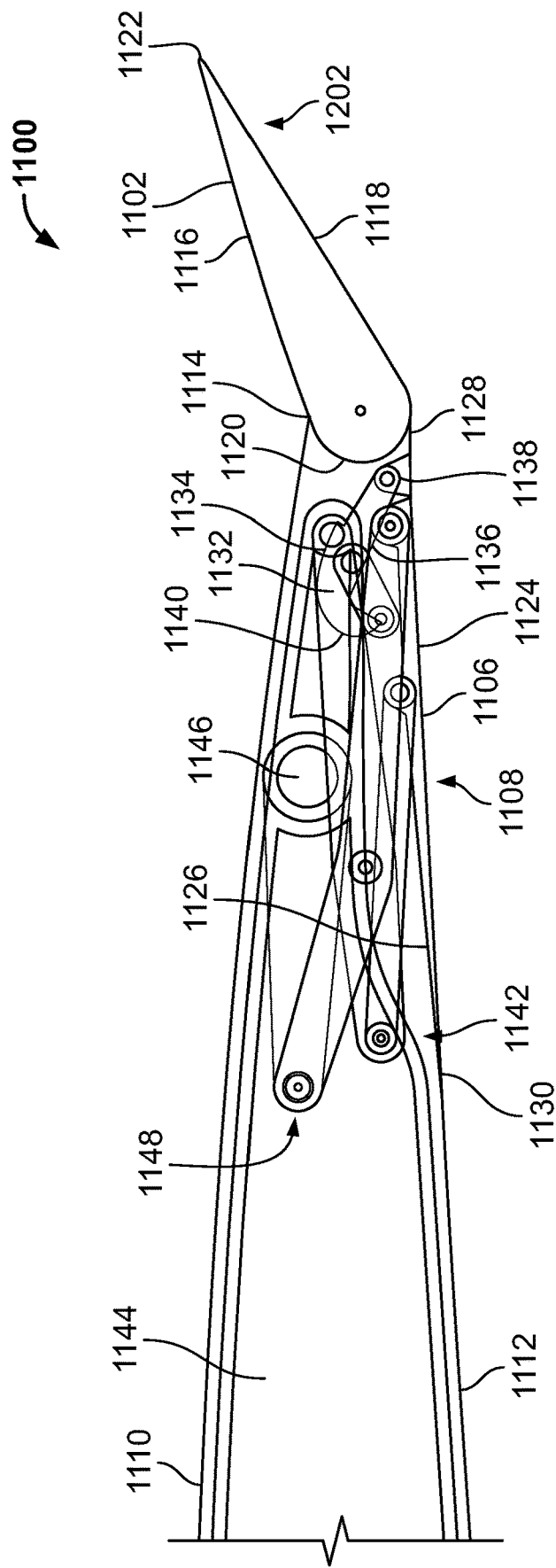
FIG. 12 is a cross-sectional view of the wing of FIG. 11, illustrating the aileron of FIG. 11 in an example raised position.
Figure 13:
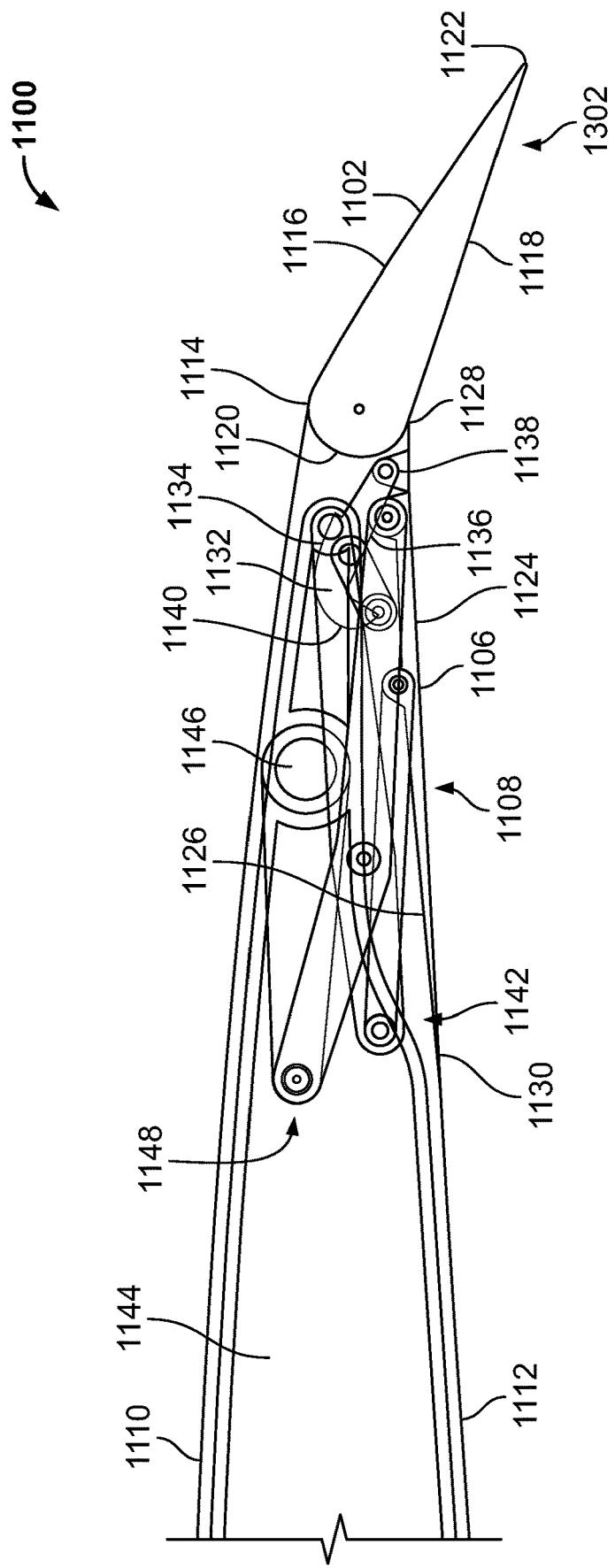
FIG. 13 is a cross-sectional view of the wing of FIGS. 11 and 12, illustrating the aileron of FIGS. 11 and 12 in an example lowered position.
Figure 14:
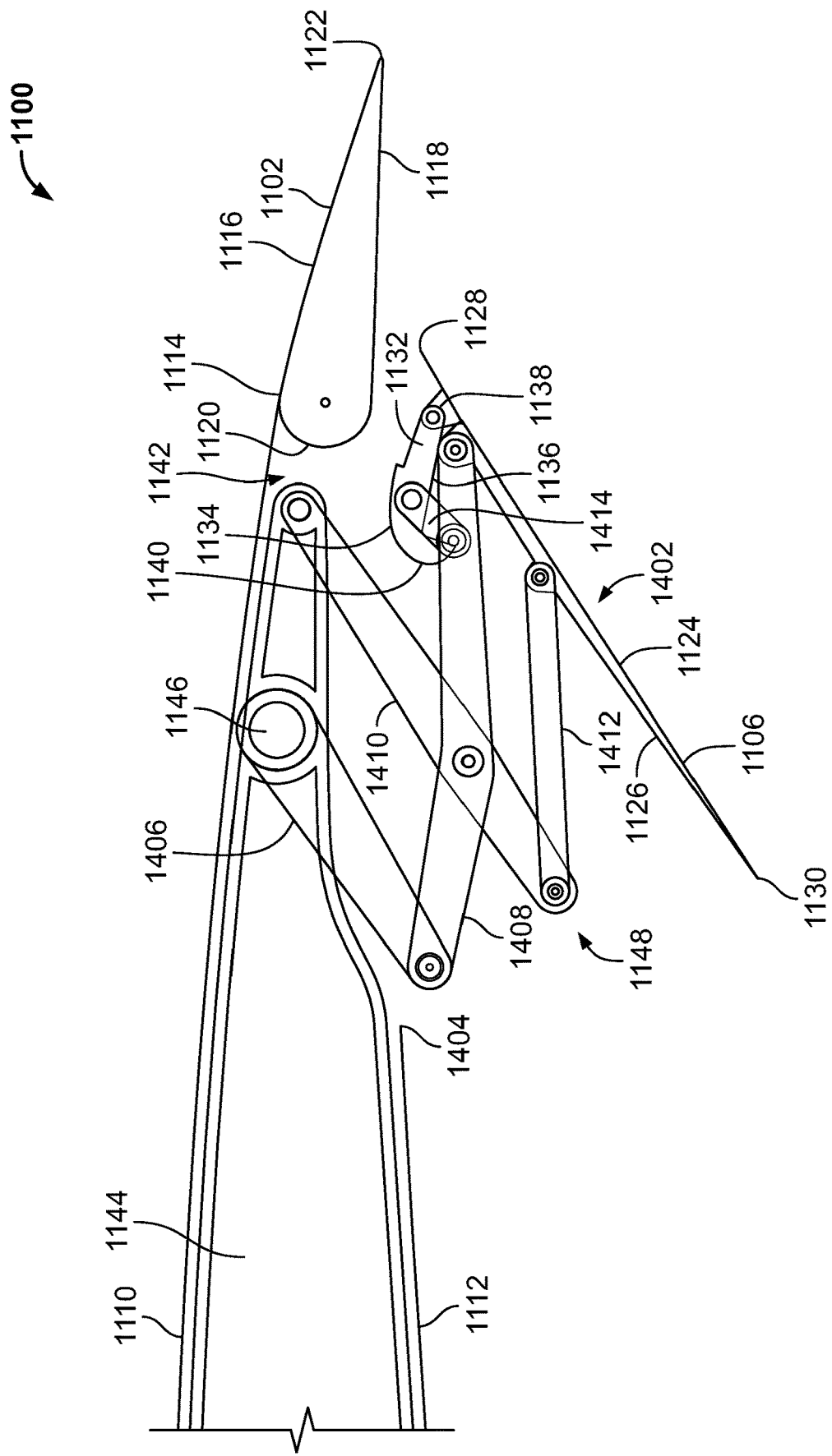
FIG. 14 is a cross-sectional view of the wing of FIGS. 11-13, illustrating the flap of FIGS. 11-13 in a first example intermediary position.
Figure 15:
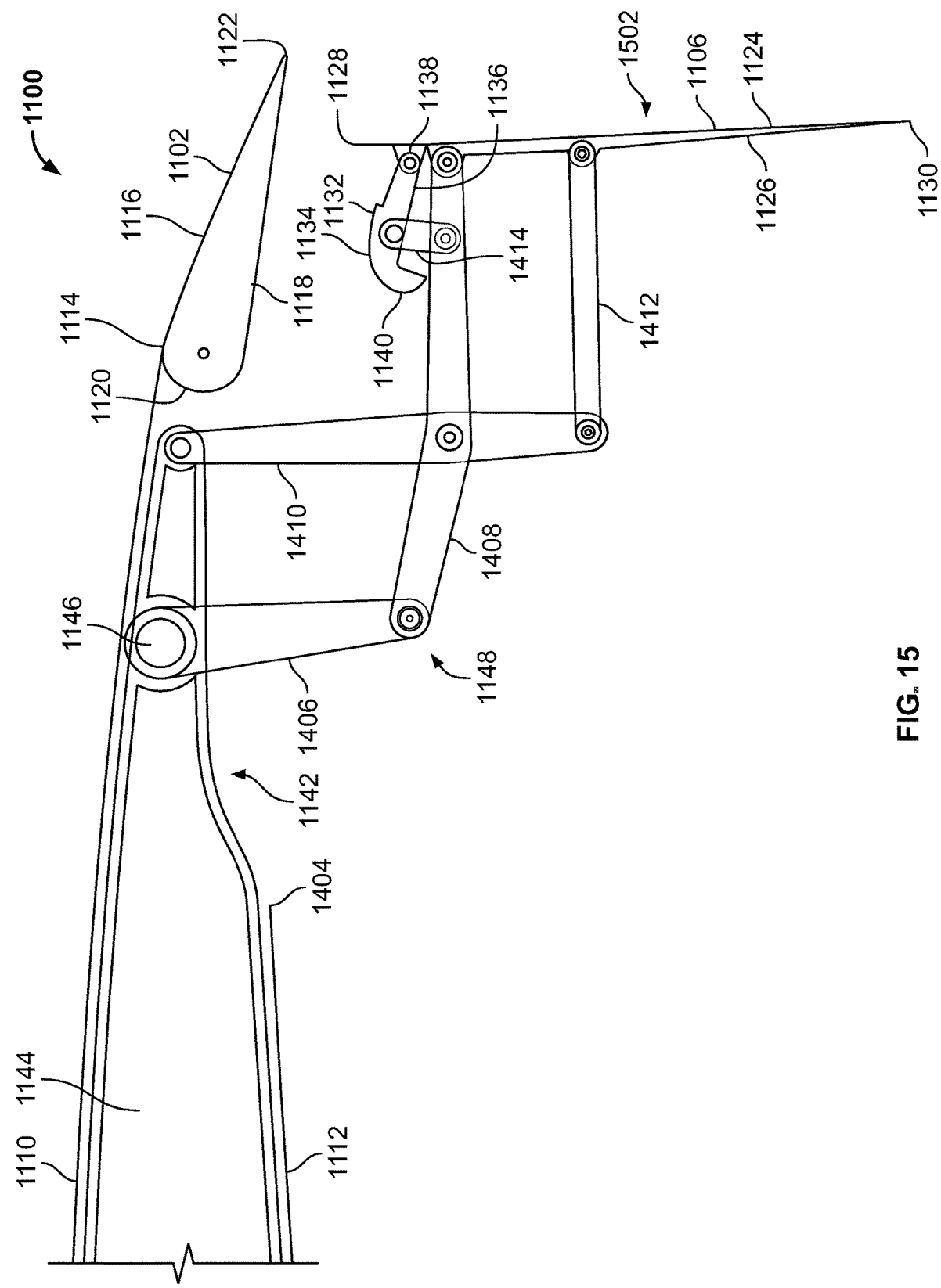
FIG. 15 is a cross-sectional view of the wing of FIGS. 11-14, illustrating the flap of FIGS. 11-14 in a second example intermediary position.
Figure 16:
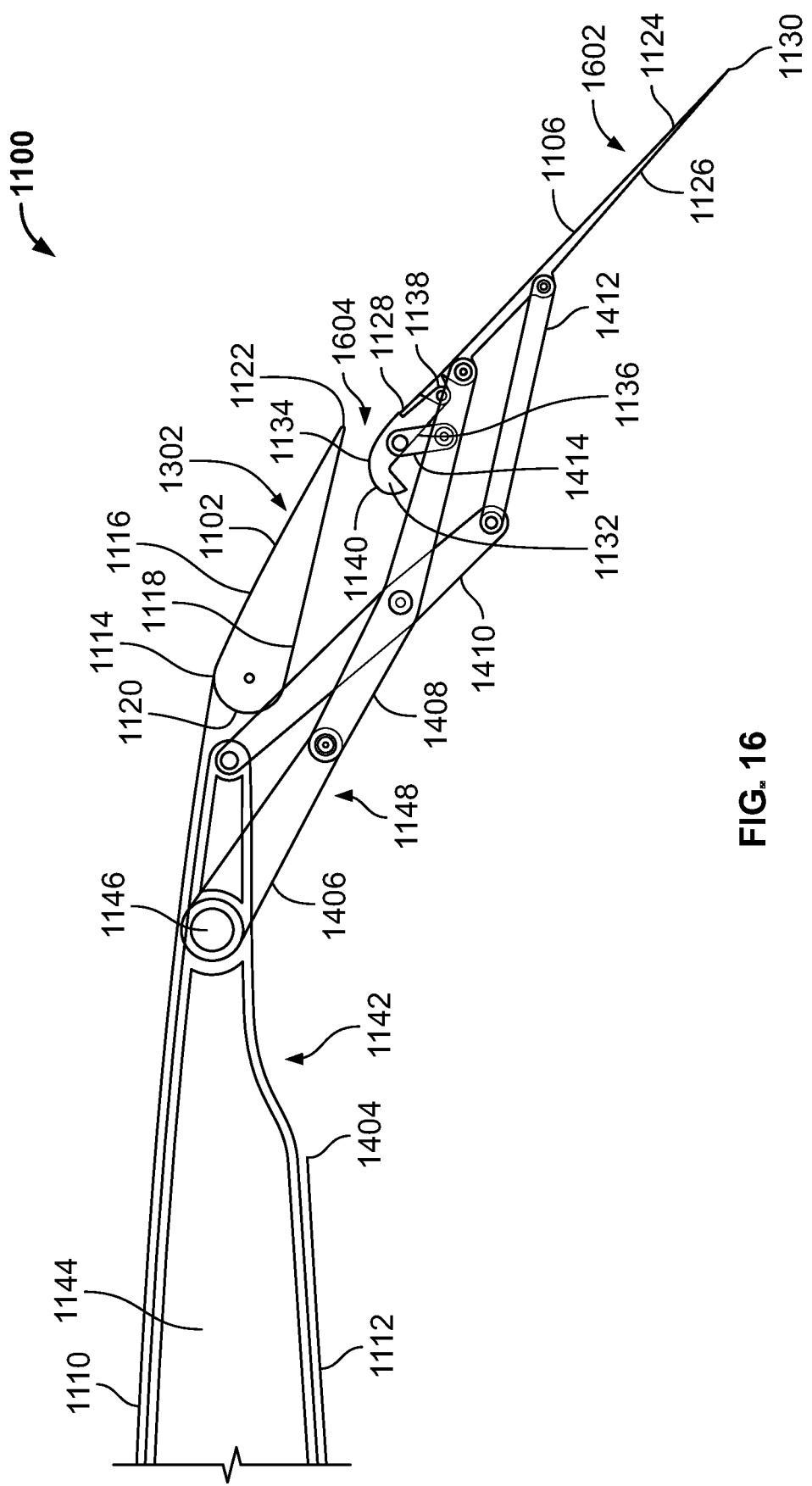
FIG. 16 is a cross-sectional view of the wing of FIGS. 11-16, illustrating the flap of FIGS. 11-16 in an example deployed position.

FIG. 11 is a cross-sectional view of an example aircraft wing 1100 including an example aileron 1102 illustrated in an example neutral position 1104, and an example flap 1106 illustrated in an example stowed position 1108. FIG. 12 is a cross-sectional view of the wing 1100 of FIG. 11, illustrating the aileron 1102 of FIG. 11 in an example raised position 1202. FIG. 13 is a cross-sectional view of the wing 1100 of FIGS. 11 and 12, illustrating the aileron 1102 of FIGS. 11 and 12 in an example lowered position 1302. FIG. 14 is a cross-sectional view of the wing 1100 of FIGS. 11-13, illustrating the flap 1106 of FIGS. 11-13 in a first example intermediary position 1402. FIG. 15 is a cross-sectional view of the wing 1100 of FIGS. 11-14, illustrating the flap 1106 of FIGS. 11-14 in a second example intermediary position 1502. FIG. 16 is a cross-sectional view of the wing 1100 of FIGS. 11-16, illustrating the flap 1106 of FIGS. 11-16 in an example deployed position 1602. The wing 1100, the aileron 1102, and the flap 1106 of FIGS. 11-16 are example implementations of the wing 1000, the aileron 1002, and the flap 1004 of FIG. 10 described above.

The wing 1100 of FIGS. 11-16 includes an example upper surface 1110, an example lower surface 1112, and an example fixed trailing edge 1114. The lower surface 1112 of the wing 1100 is located opposite the upper surface 1110 of the wing 1100. The fixed trailing edge 1114 of the wing 1100 is located between (e.g., extends between) the upper surface 1110 and the lower surface 1112 of the wing 1100, opposite a leading edge of the wing 1100.

The aileron 1102 of FIGS. 11-16 is pivotally coupled to the wing 1100. The aileron 1102 of FIGS. 11-16 is movable (e.g., pivotable) from the neutral position 1104 shown in FIG. 11 to and/or between the raised position 1202 shown in FIG. 12 and the lowered position 1302 shown in FIG. 13 via an actuation mechanism and/or or a linkage assembly disposed along and/or mounted to the wing 1100. The aileron 1102 of FIGS. 11-16 accordingly defines a trailing edge of the wing 1100 that is movable (e.g., pivotable) relative to a fixed portion of the wing 1100 (e.g., the fixed trailing edge 1114 of the wing 1100).

In the illustrated example of FIGS. 11-16, the aileron 1102 includes an example upper surface 1116, an example lower surface 1118, an example leading edge 1120, and an example trailing edge 1122. The lower surface 1118 of the aileron 1102 is located opposite the upper surface 1116 of the aileron 1102. The leading edge 1120 of the aileron 1102 is located between (e.g., extends between) the upper surface 1116 and the lower surface 1118 of the aileron 1102. The trailing edge 1122 of the aileron 1102 is located between (e.g., extends between) the upper surface 1116 and the lower surface 1118 of the aileron 1102, opposite the leading edge 1120 of the aileron 1102. When the aileron 1102 of FIGS. 11-16 is in the neutral position 1104 of FIG. 11, the trailing edge 1122 of the aileron 1102 is generally aligned with the fixed trailing edge 1114 of the wing 1100. When the aileron 1102 is in the raised position 1202 of FIGS. 12, the aileron 1102 is pivoted upward relative to the neutral position 1104 such that the trailing edge 1122 of the aileron 1102 is located above the fixed trailing edge 1114 of the wing 1100. Conversely, when the aileron 1102 is in the lowered position 1302 of FIG. 13, the aileron 1102 is pivoted downward relative to the neutral position 1104 such that the trailing edge 1122 of the aileron 1102 is located below the fixed trailing edge 1114 of the wing 1100.

The flap 1106 of FIGS. 11-16 is pivotally coupled to the wing 1100. In this regard, the flap 1106 is movable (e.g., pivotable) relative to the fixed trailing edge 1114 of the wing 1100 and/or relative to the trailing edge 1122 of the aileron 1102 between the stowed position 1108 shown in FIG. 11 and the deployed position 1602 shown in FIG. 16. The flap 1106 passes through one or more intermediary positions (e.g., the first intermediary position 1402 shown in FIG. 14, the second intermediary position 1502 shown in FIG. 15, etc.) as the flap 1106 moves from the stowed position 1108 of FIG. 11 into the deployed position 1602 of FIG. 16. In some examples, one or more of such intermediary positions constitute stationary deployment positions at which the flap 1106 can be fixed, held, and/or otherwise maintained (e.g., during a flight of an aircraft) when the flap 1106 is not in the stowed position 1108 of FIG. 11. In other examples, the flap 1106 can instead be configured such that the deployed position 1602 of FIG. 16 constitutes the only stationary deployment position at which the flap 1106 can be fixed, held, and/or otherwise maintained (e.g., during a flight of an aircraft) when the flap 1106 is not in the stowed position 1108 of FIG. 11.

The flap 1106 of FIGS. 11-16 is located along the lower surface 1112 of the wing 1100 when the flap 1106 is in the stowed position 1108 shown in FIG. 11. In the illustrated example of FIGS. 11-16, the wing 1100 further includes an example opening 1404 formed in the lower surface 1112 of the wing 1100. In some examples, the flap 1106 and the opening 1404 of the wing 1100 are respectively configured such that at least a portion of the flap 1106 is located within, bounded by, and/or positioned adjacent to the opening 1404 when the flap 1106 is in the stowed position 1108 of FIG. 11. The flap 1106 of the wing 1100 of FIGS. 11-16 is deployable from and/or through the opening 1404 in connection with the flap 1106 moving away from the stowed position 1108 of FIG. 11 toward the deployed position 1602 of FIG. 16. At least a portion of the flap 1106 (e.g., the majority of the flap 1106) is located rearward of the fixed trailing edge 1114 of the wing 1100 and/or rearward of the trailing edge 1122 of the aileron 1102 when the flap 1106 is in the deployed position 1602 of FIG. 16.

In the illustrated example of FIGS. 11-16, the flap 1106 includes an example first surface 1124, an example second surface 1126, an example first edge 1128, and an example second edge 1130. The second surface 1126 of the flap 1106 is located opposite the first surface 1124 of the flap 1106. The first edge 1128 of the flap 1106 is located between (e.g., extends between) the first surface 1124 and the second surface 1126 of the flap 1106. The second edge 1130 of the flap 1106 is located between (e.g., extends between) the first surface 1124 and the second surface 1126 of the flap 1106, opposite the first edge 1128 of the flap 1106. As shown in FIGS. 11-16, the first surface 1124 of the flap 1106 extends between the first edge 1128 and the second edge 1130 of the flap 1106. The second surface 1126 of the flap 1106 similarly extends between the first edge 1128 and the second edge 1130 of the flap 1106. In the illustrated example of FIGS. 11-16, the first surface 1124 and the second surface 1126 of the flap 1106 respectively have a generally planar profile (e.g., a generally flat profile). In other examples, the first surface 1124 and/or the second surface 1126 of the flap 1106 can instead have a non-planar profile (e.g., a curved or contoured profile).

As shown by the sequence of movements of the flap 1106 illustrated in FIGS. 11-16, the flap 1106 inverts and/or reverses its orientation as the flap 1106 moves from the stowed position 1108 of FIG. 11 into the deployed position 1602 of FIG. 16. When the flap 1106 of FIGS. 11-16 is in the stowed position 1108 of FIG. 11, the first surface 1124 of the flap 1106 faces and/or is generally oriented downward, the second surface 1126 of the flap 1106 faces and/or is generally oriented upward, the first edge 1128 of the flap 1106 faces and/or is generally oriented rearward, and the second edge 1130 of the flap 1106 faces and/or is generally oriented forward. Conversely, when the flap 1106 of FIGS. 11-16 is in the deployed position 1602 of FIG. 16, the first surface 1124 of the flap 1106 faces and/or is generally oriented upward, the second surface 1126 of the flap 1106 faces and/or is generally oriented downward, the first edge 1128 of the flap 1106 faces and/or is generally oriented forward, and the second edge 1130 of the flap 1106 faces and/or is generally oriented rearward. The first edge 1128 of the flap 1106 is located rearward of the second edge 1130 of the flap 1106 when the flap 1106 is in the stowed position 1108 of FIG. 11. Conversely, the first edge 1128 of the flap 1106 is located forward of the second edge 1130 of the flap 1106 when the flap 1106 is in the deployed position 1602 of FIG. 16.

In some examples, the first surface 1124 of the flap 1106 is flush with the lower surface 1112 of the wing 1100 adjacent the opening 1404 when the flap 1106 is fully retracted into the stowed position 1108 of FIG. 11. Positioning the first surface 1124 of the flap 1106 of the wing 1100 in this manner relative to the lower surface 1112 of the wing 1100 adjacent the opening 1404 advantageously reduces (e.g., minimizes) the possibility of aerodynamic drag that may be attributed to the presence of the flap 1106 when the flap 1106 is in the stowed position 1108. Such a reduction in aerodynamic drag is beneficial to the operation of the aircraft during flight, particularly when the aircraft is performing a cruise operation while the flap 1106 is in the stowed position 1108 of FIG. 11.

In the illustrated example of FIGS. 11-16, the aileron 1102 of the wing 1100 is in the neutral position 1104 of FIG. 11 when the flap 1106 of the wing 1100 is in the stowed position 1108 of FIG. 11. In other examples, the aileron 1102 of the wing 1100 can instead be in the raised position 1202 of FIG. 12, in the lowered position 1302 of FIG. 13, or in an intermediary position between the raised position 1202 of FIG. 12 and the lowered position 1302 of FIG. 13 when the flap 1106 of the wing 1100 is in the stowed position 1108 of FIG. 11. In the illustrated example of FIGS. 11-16, the aileron 1102 of the wing 1100 is in the lowered position 1302 of FIG. 13 when the flap 1106 of the wing 1100 is in the deployed position 1602 of FIG. 16. In other examples, the aileron 1102 of the wing 1100 can instead be in the neutral position 1104 of FIG. 11, in the raised position 1202 of FIG. 12, or in an intermediary position between the raised position 1202 of FIG. 12 and the lowered position 1302 of FIG. 13 when the flap 1106 of the wing 1100 is in the deployed position 1602 of FIG. 16.

In the illustrated example of FIGS. 11-16 movement and/or actuation of the aileron 1102 of the wing 1100 between the raised position 1202 of FIG. 12 and the lowered position 1302 of FIG. 13 occurs via a first actuator and/or a first linkage assembly that is operated independently from the operation of a second actuator and/or a second linkage assembly that moves and/or actuates the flap 1106 of the wing 1100 between the stowed position 1108 of FIG. 11 and the deployed position 1602 of FIG. 16. In other examples, movement and/or actuation of the aileron 1102 of the wing 1100 between the raised position 1202 of FIG. 12 and the lowered position 1302 of FIG. 13 can instead occur via a first actuator and/or a first linkage assembly that is operated in a dependent manner on and/or from the operation of a second actuator and/or a second linkage assembly that moves and/or actuates the flap 1106 of the wing 1100 between the stowed position 1108 of FIG. 11 and the deployed position 1602 of FIG. 16. In still other examples, movement and/or actuation of the aileron 1102 of the wing 1100 between the raised position 1202 of FIG. 12 and the lowered position 1302 of FIG. 13, and movement and/or actuation of the flap 1106 of the wing 1100 between the stowed position 1108 of FIG. 11 and the deployed position 1602 of FIG. 16, can occur in either a concurrent or sequential manner via a common actuator and/or a common linkage assembly that is operatively coupled to both the aileron 1102 and the flap 1106.

In the illustrated example of FIGS. 11-16, the wing 1100 further includes an example bullnose 1132 pivotally coupled to the flap 1106. The bullnose 1132 of FIGS. 11-16 includes an example first surface 1134, an example second surface 1136, an example first end 1138, and an example second end 1140. The second surface 1136 of the bullnose 1132 is located opposite the first surface 1134 of the bullnose 1132. The first end 1138 of the bullnose 1132 is located between (e.g., extends between) the first surface 1134 and the second surface 1136 of the bullnose 1132. The second end 1140 of the bullnose 1132 is located between (extends between) the first surface 1134 and the second surface 1136 of the bullnose 1132, opposite the first end 1138 of the bullnose 1132. As shown in FIGS. 11-16, the first surface 1134 of the bullnose 1132 extends between the first end 1138 and the second end 1140 of the bullnose 1132. The second surface 1136 of the bullnose 1132 similarly extends between the first end 1138 and the second end 1140 of the bullnose 1132. The first surface 1134 and the second end 1140 of the bullnose 1132 respectively have a curved or contoured profile.

In the illustrated example of FIGS. 11-16, the first end 1138 of the bullnose 1132 is pivotally coupled to the flap 1106 along the first edge 1128 of the flap 1106. By contrast, the second end 1140 of the bullnose 1132 is a free end that is generally not connected to any structural component of the flap 1106 and/or, more generally, is not connected to any structural component of the wing 1100. In other examples, the second end 1140 of the bullnose 1132 can be connected to a structural component of the wing 1100, such as to a component of a linkage assembly of the wing 1100 that facilitates movement of the flap 1106 between the stowed position 1108 of FIG. 11 and the deployed position 1602 of FIG. 16.

The bullnose 1132 of FIGS. 11-16 is configured to pivot relative to the flap 1106 as the flap 1106 moves between the stowed position 1108 of FIG. 11 and the deployed position 1602 of FIG. 16. When the flap 1106 is in the stowed position 1108 of FIG. 11, the bullnose 1132 is located within an example internal compartment 1142 of the wing 1100 spatially and/or physically bounded by the upper surface 1110, the lower surface 1112, and the aileron 1102 of the wing 1100. When so positioned, the bullnose 1132 is effectively folded onto the flap 1106 such that the first surface 1134 of the bullnose 1132 and the first surface 1124 of the flap 1106 face and/or are generally oriented away from one another, and such that the second surface 1136 of the bullnose 1132 and the second surface 1126 of the flap 1106 face and/or are generally oriented toward one another.

When the flap 1106 is in the deployed position 1602 of FIG. 16, the bullnose 1132 is located below the lower surface 1118 and/or the trailing edge 1122 of the aileron 1102. When so positioned, the bullnose 1132 is unfolded from and/or relative to the flap 1106 such that the first surface 1134 of the bullnose 1132 and the first surface 1124 of the flap 1106 face and/or are generally oriented in a same or similar direction (e.g., upwards), and such that the second surface 1136 of the bullnose 1132 and the second surface 1126 of the flap 1106 face and/or are generally oriented in another same or similar direction (e.g., downwards). As shown in FIGS. 11-16, regardless of whether the flap 1106 is in the stowed position 1108 of FIG. 11 or the deployed position 1602 of FIG. 16, the first surface 1134 of the bullnose 1132 faces and/or is generally oriented upward, the second surface 1136 of the bullnose 1132 faces and/or is generally oriented downward, the first end 1138 of the bullnose 1132 faces and/or is generally oriented rearward, and the second end 1140 of the bullnose 1132 faces and/or is generally oriented forward. Thus, unlike the flap 1106, which inverts and/or reverses its orientation as the flap 1106 moves from the stowed position 1108 of FIG. 11 into the deployed position 1602 of FIG. 16, the bullnose 1132, which pivots relative to the flap 1106, generally maintains its orientation as the flap 1106 moves from the stowed position 1108 of FIG. 11 into the deployed position 1602 of FIG. 16.

As shown in FIG. 16, the first surface 1134 of the bullnose 1132 of the wing 1100 is separated from the lower surface 1118 of the aileron 1102 and/or from the trailing edge 1122 of the aileron 1102 by an example gap 1604 when the flap 1106 is in the deployed position 1602 of FIG. 16. The presence of the gap 1604 advantageously facilitates the aerodynamic passage of an airflow between the bullnose 1132 of the wing 1100 and the lower surface 1118 and/or the trailing edge 1122 of the aileron 1102 of the wing 1100. In this regard, the bullnose 1132 of the wing 1100, the lower surface 1118 of the aileron 1102 of the wing 1100, and/or the trailing edge 1122 of the aileron 1102 of the wing 1100 are respectively configured such that an airflow passes upward and/or rearward over the contoured second end 1140 of the bullnose 1132 of the wing 1100, and then subsequently rearward through the gap 1604 formed between the contoured first surface 1134 of the bullnose 1132 of the wing 1100 on the one hand and the lower surface 1118 and/or the trailing edge 1122 of the aileron 1102 of the wing 1100 on the other hand. The contoured surface(s) of the bullnose 1132 advantageously provide for an aerodynamically-tuned passage of the airflow through the gap 1604 when the flap 1106 is in the deployed position 1602 of FIG. 16.

In the illustrated example of FIGS. 11-16, the bullnose 1132 has a length extending from the first end 1138 to the second end 1140 of the bullnose 1132, and the flap 1106 has a length extending from the first edge 1128 to the second edge 1130 of the flap 1106. In some examples, the length of the bullnose 1132 is significantly less than the length of the flap 1106. For example, as shown in FIGS. 11-16, the length of the bullnose 1132 is approximately one-fourth (e.g., twenty-five percent) of the length of the flap 1106. In other examples, the extent to which the length of the bullnose 1132 is less than the length of the flap 1106 can differ (e.g., five percent less, ten percent less, fifty percent less, seventy-five percent less, ninety percent less, etc.). In still other examples, the length of the bullnose 1132 can instead be greater than or approximately equal to the length of the flap 1106.

The wing 1100 of FIGS. 11-16 further includes an example structural rib 1144, an example actuator 1146, and an example linkage assembly 1148. The structural rib 1144 is positioned at a fixed location within the internal compartment 1142 of the wing 1100, with the structural rib 1144 being spatially and/or physically bounded by the upper surface 1110, the lower surface 1112, and the aileron 1102 of the wing 1100. In the illustrated example of FIGS. 11-16, a portion (e.g., a fixed portion) of the actuator 1146 is coupled to the structural rib 1144. In other examples, the portion (e.g., the fixed portion) of the actuator 1146 is instead coupled to another structural component of the wing 1100. In the illustrated example of FIGS. 11-16, the actuator 1146 is implemented as a rotary actuator configured to move (e.g., rotate or pivot) one or more component(s) of the linkage assembly 1148 to effect movement of the flap 1106 of FIGS. 11-16 between the stowed position 1108 of FIG. 11 and the deployed position 1602 of FIG. 16. In other examples, the actuator 1146 is instead implemented as a translational actuator configured to move (e.g., slide or extend) one or more component(s) of the linkage assembly 1148 to effect movement of the flap 1106 of FIGS. 11-16 between the stowed position 1108 of FIG. 11 and the deployed position 1602 of FIG. 16.

The actuator 1146 of FIGS. 11-16 is actuated, controlled, and/or operated by one or more control system(s) of the wing 1100 and/or, more generally, of the aircraft that implements the wing 1100. Such control system(s) can include an electrical control system operatively coupled to the actuator 1146, a mechanical control system operatively coupled to the actuator 1146, a hydraulic control system operatively coupled to the actuator 1146, a pneumatic control system operatively coupled to the actuator 1146, and/or any combination thereof.

In the illustrated example of FIGS. 11-16 the linkage assembly 1148 is coupled to one or more portion(s) of the structural rib 1144, to the actuator 1146, to the flap 1106, and to the bullnose 1132 of the wing 1100. The linkage assembly 1148 is configured to move the flap 1106 between the stowed position 1108 of FIG. 11 and the deployed position 1602 of FIG. 16 in response to actuation of the actuator 1146. As best shown in FIGS. 14-16, the linkage assembly 1148 of FIGS. 11-16 includes an example drive arm 1406, an example drive coupler 1408, an example rocker 1410, an example panel coupler 1412, and an example bullnose coupler 1414. In other examples, the linkage assembly 1148 of the wing 1100 can include a different number and/or a different arrangement of components relative to the components of the linkage assembly 1148 of FIGS. 11-16 referenced above and further described herein.

In the illustrated example of FIGS. 11-16, a first end of the drive arm 1406 is operatively coupled to the actuator 1146, and a second end of the drive arm 1406 is pivotally coupled to the drive coupler 1408. A first end of the drive coupler 1408 is pivotally coupled to the drive arm 1406, and a second end of the drive coupler 1408 is pivotally coupled to the flap 1106. A first end of the rocker 1410 is pivotally coupled to the structural rib 1144, and a second end of the rocker 1410 is pivotally coupled to the panel coupler 1412. The rocker 1410 is also pivotally coupled to the drive coupler 1408 at a location between the first and second ends of the rocker 1410. A first end of the panel coupler 1412 is pivotally coupled to the rocker 1410, and a second end of the panel coupler 1412 is pivotally coupled to the flap 1106. A first end of the bullnose coupler 1414 is pivotally coupled to the drive coupler 1408, and a second end of the bullnose coupler 1414 is pivotally coupled to the bullnose 1132.

The flap 1106 of the wing 1100 is pivotally coupled to the drive coupler 1408 and to the panel coupler 1412 of the linkage assembly 1148 of the wing 1100 at separate locations along the second surface 1126 of the flap 1106. The first end 1138 of the bullnose 1132 of the wing 1100 is pivotally coupled to the flap 1106 of the wing 1100 at and/or along the first edge 1128 of the flap 1106. The bullnose 1132 of the wing 1100 is also pivotally coupled to the bullnose coupler 1414 of the linkage assembly 1148 of the wing 1100 at a location between the first end 1138 and the second end 1140 of the bullnose 1132 at and/or along the second surface 1136 of the bullnose 1132. In the illustrated example of FIGS. 11-16, the bullnose coupler 1414 of the linkage assembly 1148 is configured to cause the bullnose 1132 to pivot relative to the flap 1106 as the flap 1106 moves between the stowed position 1108 of FIG. 11 and the deployed position 1602 of FIG. 16.

When the flap 1106 of FIGS. 11-16 is in the stowed position 1108 of FIG. 11, the drive arm 1406, the drive coupler 1408, the rocker 1410, the panel coupler 1412, and the bullnose coupler 1414 of the linkage assembly 1148 are respectively located within the internal compartment 1142 of the wing 1100, with each of the drive arm 1406, the drive coupler 1408, the rocker 1410, the panel coupler 1412, and the bullnose coupler 1414 being spatially and/or physically bounded by the upper surface 1110, the lower surface 1112, and the aileron 1102 of the wing 1100. As the flap 1106 of FIGS. 11-16 moves from the stowed position 1108 of FIG. 11 into the deployed position 1602 of FIG. 16, one or more portion(s) of the drive coupler 1408, the rocker 1410, the panel coupler 1412, and the bullnose coupler 1414 of the linkage assembly 1148 exit and/or deploy from the internal compartment 1142 of the wing 1100 via the opening 1404 formed in the lower surface 1112 of the wing 1100, thereby positioning at least a portion (e.g., the majority) of the flap 1106 rearward of the fixed trailing edge 1114 of the wing 1100 and/or rearward of the trailing edge 1122 of the aileron 1102 of the wing 1100, and positioning the bullnose 1132 below the lower surface 1118 and/or below the trailing edge 1122 of the aileron 1102 of the wing 1100.

In some examples, the flap 1106, the bullnose 1132, the structural rib 1144, the actuator 1146, and/or one or more component(s) of the linkage assembly 1148 of the wing 1100 of FIGS. 11-16, and/or their connection points or relative positions, etc., can be specifically configured to facilitate movement of the flap 1106 of the wing 1100 of FIGS. 11-16 to a plurality of stationary deployment positions at which the flap 1106 can be fixed, held and/or otherwise maintained (e.g., during a flight of an aircraft) when the flap 1106 is not in the stowed position 1108 of FIG. 11. In some such examples, the flap 1106 is deployable to a first stationary deployment position associated with a takeoff operation of an aircraft implementing the wing 1100, and to a second stationary deployment position (e.g., different from the first stationary deployment position) associated with a landing operation of an aircraft implementing the wing 1100.

Figure 17:
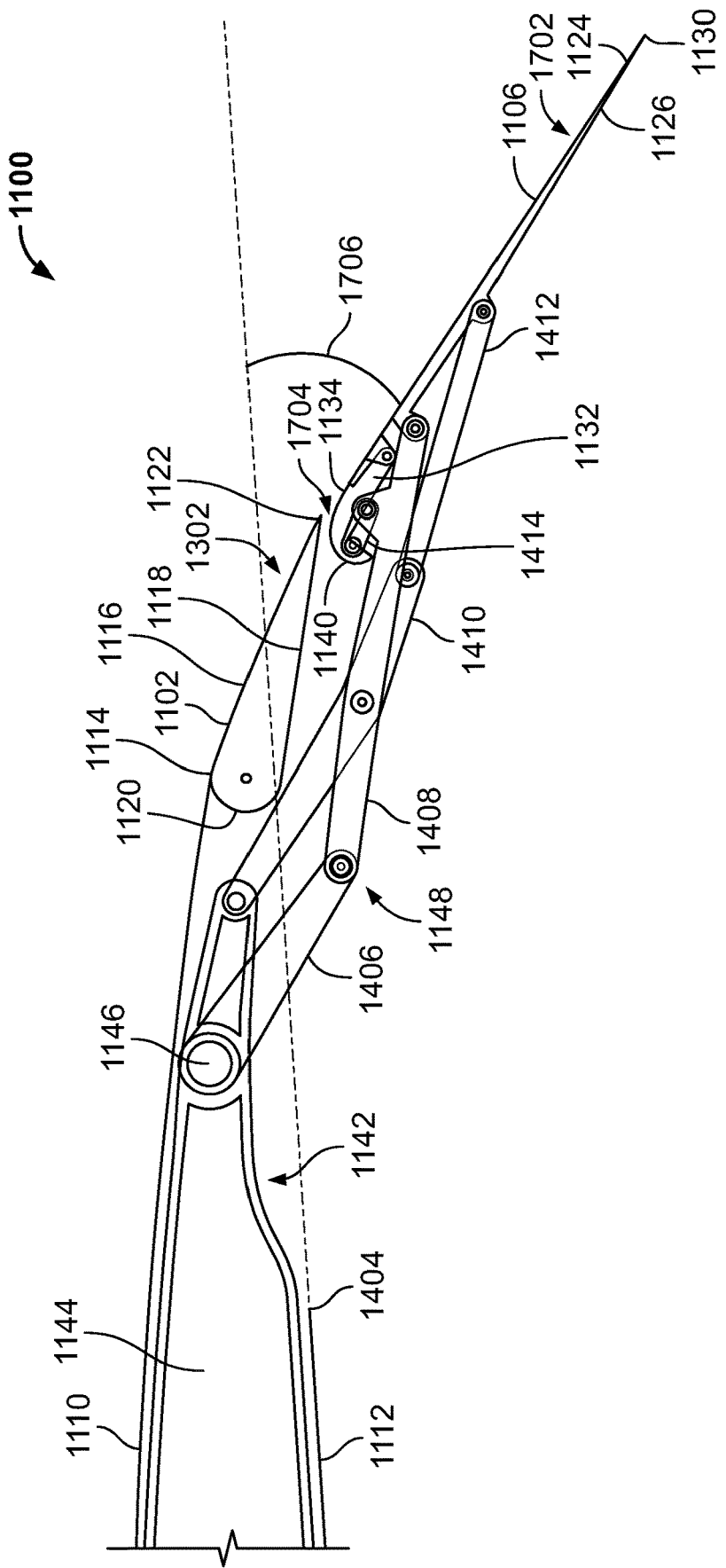
FIG. 17 is a cross-sectional view of the wing of FIGS. 11-16, illustrating the flap of FIG. 11-16 in a first example stationary deployment position associated with a takeoff operation of an aircraft implementing the wing.
Figure 18:
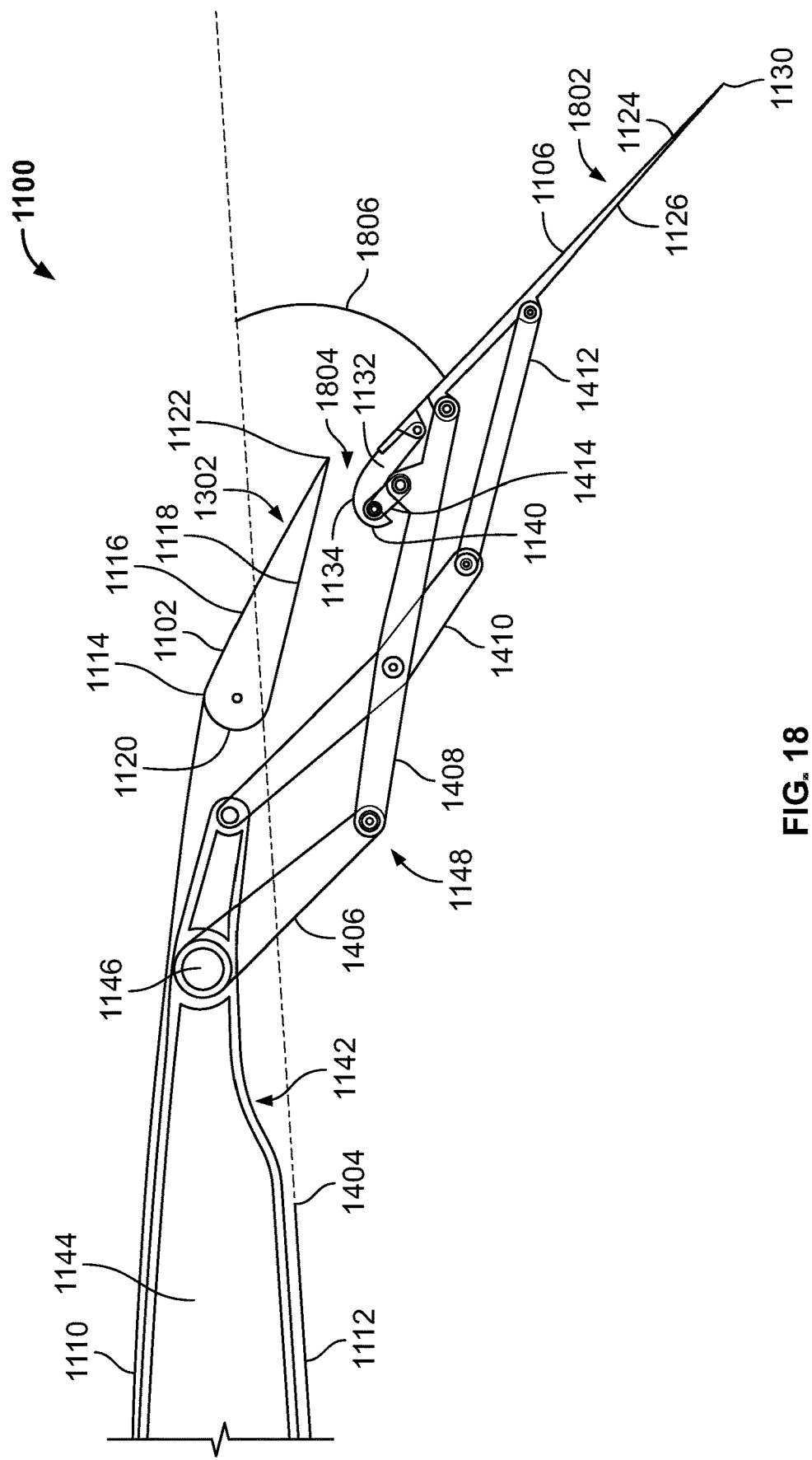
FIG. 18 is a cross-sectional view of the wing of FIGS. 11-17, illustrating the flap of FIGS. 11-17 in a second example stationary deployment position associated with a landing operation of an aircraft implementing the wing.

FIG. 17 is a cross-sectional view of the wing 1100 of FIGS. 11-16, illustrating the flap 1106 of FIG. 11-16 in a first example stationary deployment position 1702 associated with a takeoff operation of an aircraft implementing the wing 1100. FIG. 18 is a cross-sectional view of the wing 1100 of FIGS. 11-17, illustrating the flap 1106 of FIGS. 11-17 in a second example stationary deployment position 1802 associated with a landing operation of an aircraft implementing the wing 1100. In the illustrated example of FIGS. 17 and 18, the flap 1106, the bullnose 1132, the structural rib 1144, the actuator 1146, and/or one or more component(s) of the linkage assembly 1148 of the wing 1100 are specifically configured (e.g., modified relative to the flap 1106, the bullnose 1132, the structural rib 1144, the actuator 1146, and/or the components of the linkage assembly 1148 shown in FIGS. 11-16) to facilitate movement of the flap 1106 of the wing 1100 into the first stationary deployment position 1702 and the second stationary deployment position 1802.

As shown in FIG. 17, the bullnose 1132 of the wing 1100 is separated from the trailing edge 1122 of the aileron 1102 of the wing 1100 by a first example gap 1704 when the flap 1106 of the wing 1100 is in the first stationary deployment position 1702. As shown in FIG. 18, the bullnose 1132 of the wing 1100 is separated from the trailing edge 1122 of the aileron 1102 of the wing 1100 by a second example gap 1804 when the flap 1106 of the wing 1100 is in the second stationary deployment position 1802. In the illustrated example of FIGS. 17 and 18, the second gap 1804 associated with the second stationary deployment position 1802 of the flap 1106 is greater than the first gap 1704 associated with the first stationary deployment position 1702 of the flap 1106. In other examples, the second gap 1804 associated with the second stationary deployment position 1802 of the flap 1106 can instead be less than or equal to the first gap 1704 associated with the first stationary deployment position 1702 of the flap 1106.

As shown in FIG. 17, the wing 1100 has a first camber defined in part by a first example deployment angle 1706 of the flap 1106 of the wing 1100 when the flap 1106 is in the first stationary deployment position 1702. As shown in FIG. 18, the wing 1100 has a second camber defined in part by a second example deployment angle 1806 of the flap 1106 of the wing 1100 when the flap 1106 is in the second stationary deployment position 1802. In the illustrated example of FIGS. 17 and 18, the second deployment angle 1806 associated with the second stationary deployment position 1802 of the flap 1106 is greater than the first deployment angle 1706 associated with the first stationary deployment position 1702 of the flap 1106, and the second camber associated with the second stationary deployment position 1802 of the flap 1106 is accordingly greater than the first camber associated with the first stationary deployment position 1702 of the flap 1106. In other examples, the second deployment angle 1806 associated with the second stationary deployment position 1802 of the flap 1106 can instead be less than or equal to the first deployment angle 1706 associated with the first stationary deployment position 1702 of the flap 1106, and the second camber associated with the second stationary deployment position 1802 of the flap 1106 can instead accordingly be less than or equal to the first camber associated with the first stationary deployment position 1702 of the flap 1106.

Figure 19:
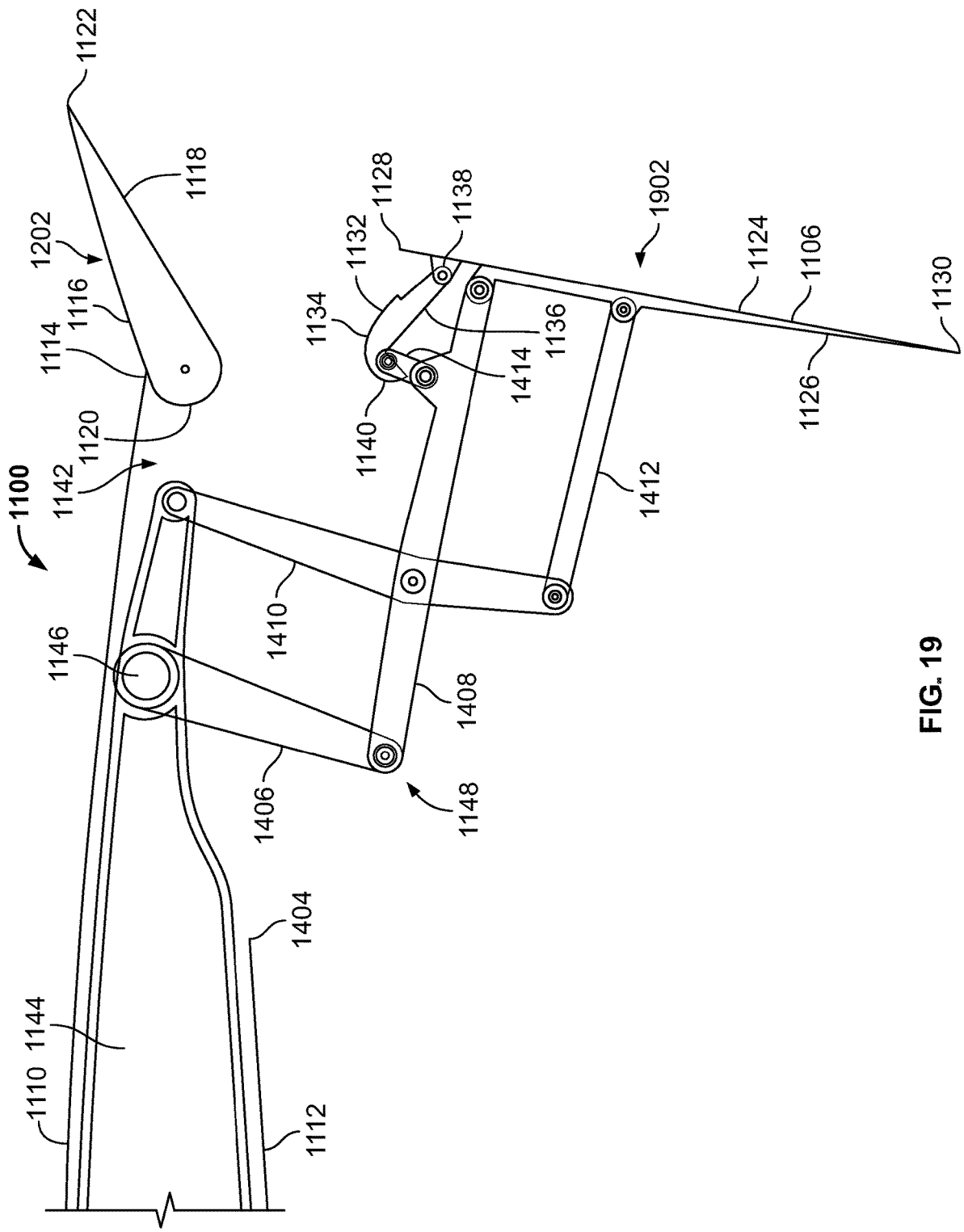
FIG. 19 is a cross-sectional view of the wing of FIGS. 11-18, illustrating the flap of FIGS. 11-18 in a third example stationary deployment position associated with a braking operation of an aircraft implementing the wing.

In some examples, the flap 1106 is additionally or alternatively deployable to a third stationary deployment position associated with a braking operation of an aircraft implementing the wing 1100, wherein the third stationary deployment position is an intermediate stationary deployment position located between the stowed position 1108 of FIG. 11 and the deployed position 1602 of FIG. 16. In this regard, the third stationary deployment position differs significantly from the first stationary deployment position 1702 of FIG. 17 and the second stationary deployment position 1802 of FIG. 18 described above. FIG. 19 is a cross-sectional view of the wing 1100 of FIGS. 11-18, illustrating the flap 1106 of FIGS. 11-18 in a third example stationary deployment position 1902 associated with a braking operation of an aircraft implementing the wing 1100. The third stationary deployment position 1902 of FIG. 19 is an intermediate stationary deployment position in which the flap 1106 is fixed, held, and/or otherwise maintained (e.g., during a flight of an aircraft) at a location between the stowed position 1108 of FIG. 11 and the deployed position 1602 of FIG. 16. In the illustrated example of FIG. 19, the flap 1106, the bullnose 1132, the structural rib 1144, the actuator 1146, and/or one or more component(s) of the linkage assembly 1148 of the wing 1100 are specifically configured (e.g., modified relative to the flap 1106, the bullnose 1132, the structural rib 1144, the actuator 1146, and/or the components of the linkage assembly 1148 shown in FIGS. 11-16) to facilitate movement of the flap 1106 of the wing 1100 into the third stationary deployment position 1902.

When the flap 1106 of the wing 1100 is in the third stationary deployment position 1902 of FIG. 19, the orientation of the flap 1106 (e.g., as defined by the orientation of the first surface 1124 of the flap 1106) is generally perpendicular relative to the upper surface 1110 and/or relative to the lower surface 1112 of the wing 1100. As further shown in FIG. 19, the aileron 1102 of the wing 1100 is in the raised position 1202 when the flap 1106 of the wing 1100 is in the third stationary deployment position 1902. The foregoing arrangement between the flap 1106 of the wing 1100 and the aileron 1102 of the wing 1100 advantageously facilitates execution of a braking operation of an aircraft implementing the wing 1100, as may occur immediately subsequent to execution of a landing operation by the aircraft.

Figure 20:
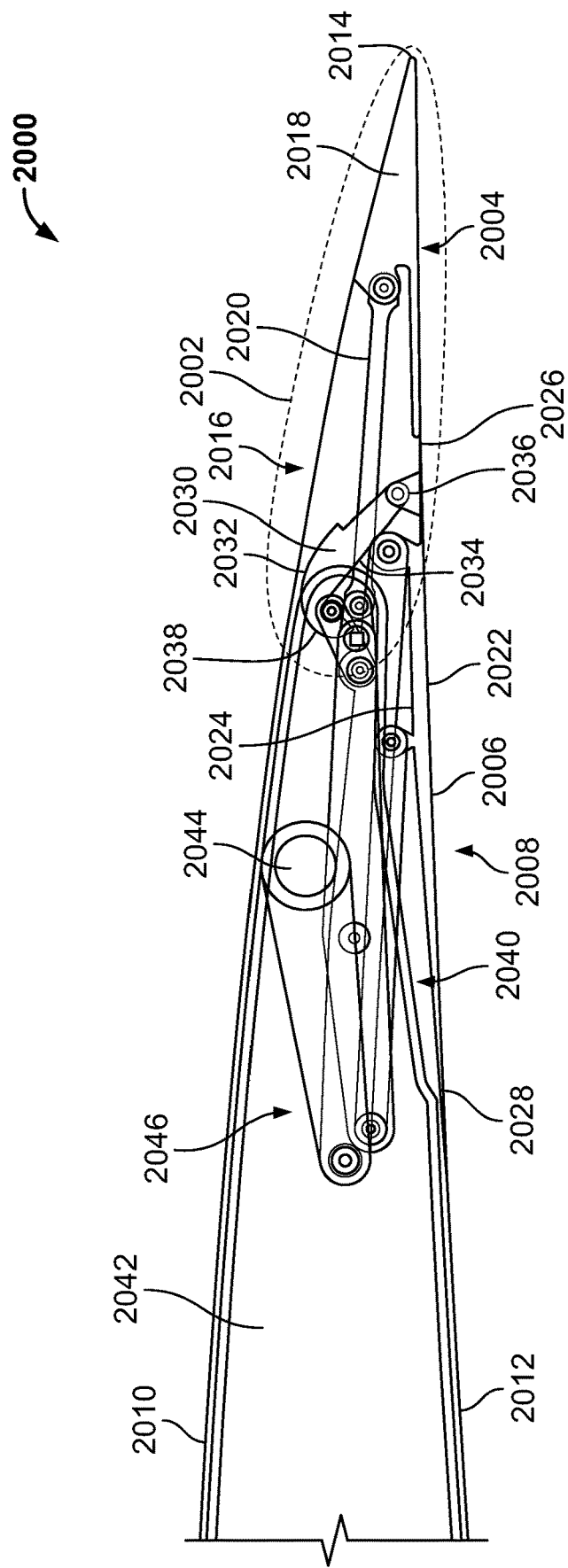
FIG. 20 is a cross-sectional view of an example aircraft wing including an example variable camber portion illustrated in an example neutral position, and an example flap illustrated in an example stowed position.
Figure 21:
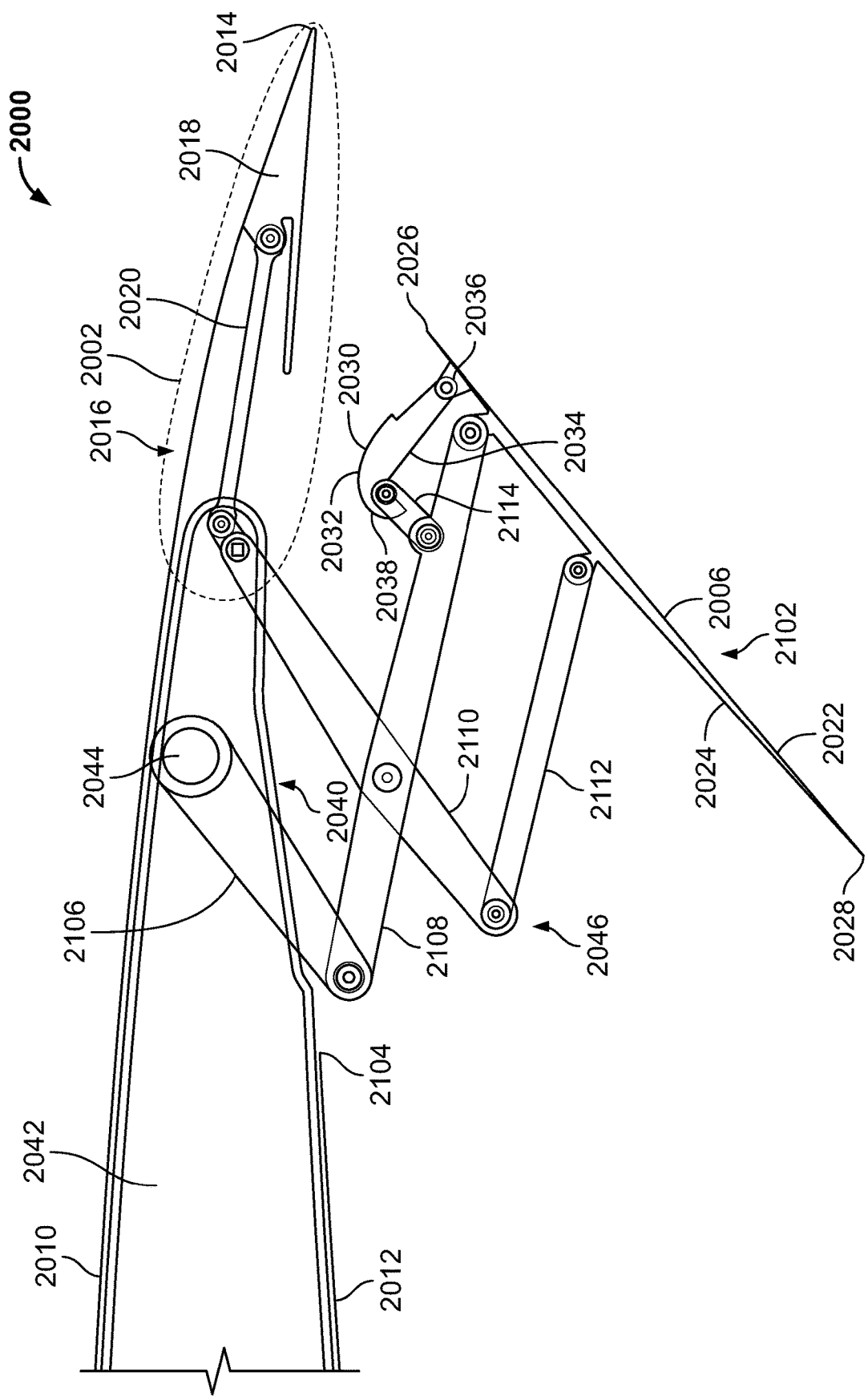
FIG. 21 is a cross-sectional view of the wing of FIG. 20, illustrating the flap of FIG. 20 in a first example intermediary position.
Figure 22:
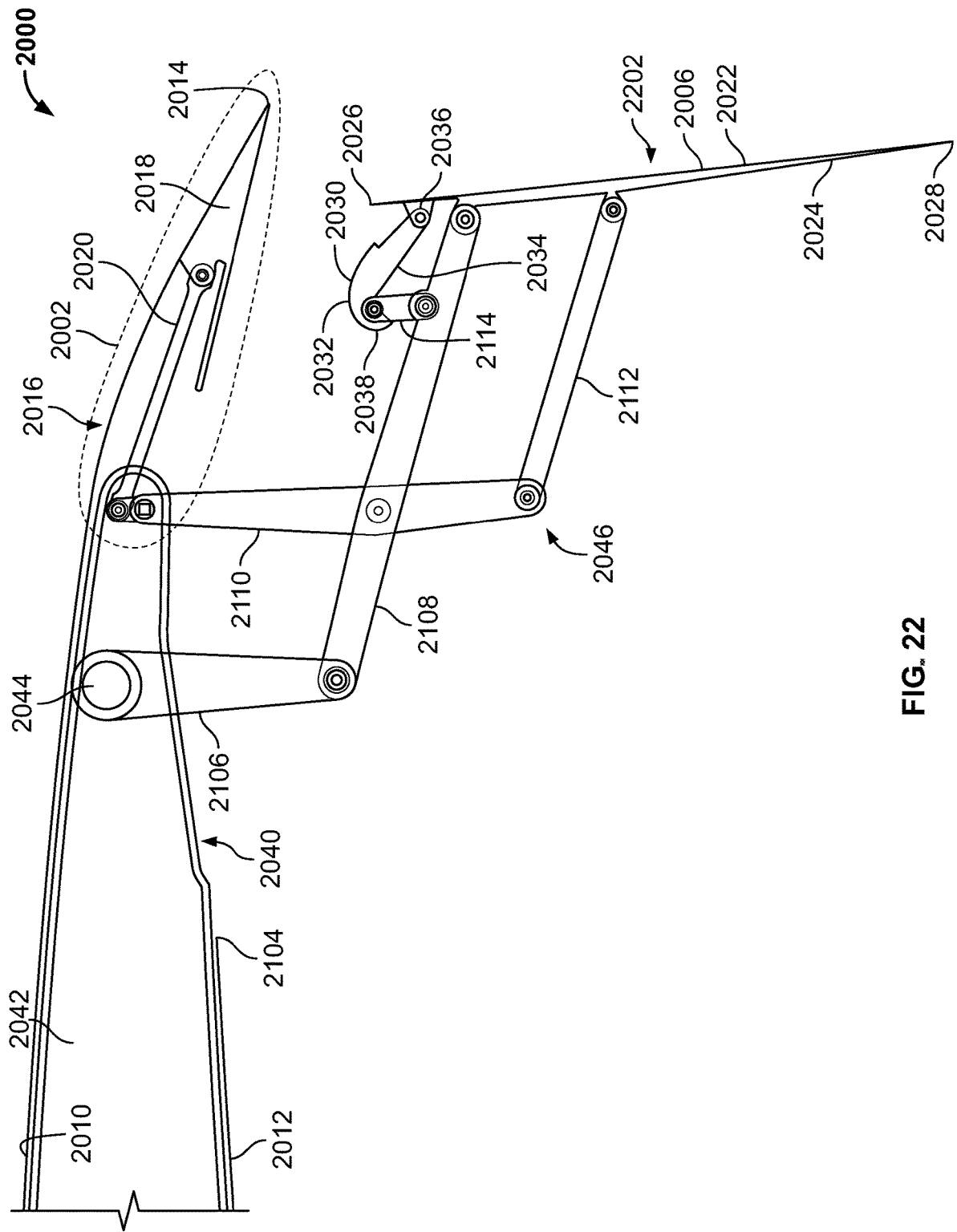
FIG. 22 is a cross-sectional view of the wing of FIGS. 20 and 21, illustrating the flap of FIGS. 20 and 21 in a second example intermediary position.
Figure 23:
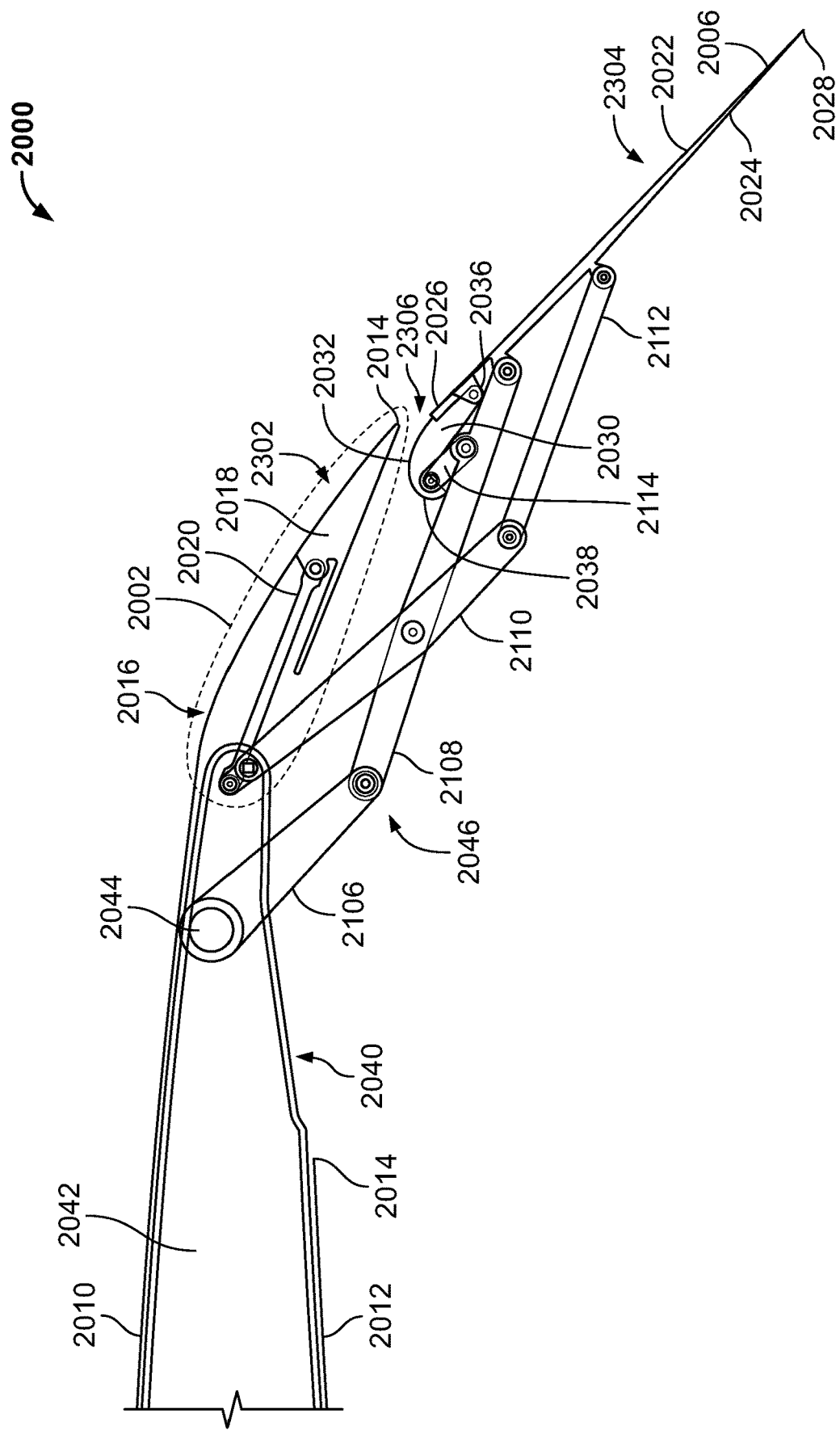
FIG. 23 is a cross-sectional view of the wing of FIGS. 20-22, illustrating the variable camber portion of FIGS. 20-22 in an example drooped position, and illustrating the flap of FIGS. 20-22 in an example deployed position.

FIG. 20 is a cross-sectional view of an example aircraft wing 2000 including an example variable camber portion 2002 illustrated in an example neutral position 2004, and an example flap 2006 illustrated in an example stowed position 2008. FIG. 21 is a cross-sectional view of the wing 2000 of FIG. 20, illustrating the flap 2006 of FIG. 20 in a first example intermediary position 2102. FIG. 22 is a cross-sectional view of the wing 2000 of FIGS. 20 and 21, illustrating the flap 2006 of FIGS. 20 and 21 in a second example intermediary position 2202. FIG. 23 is a cross-sectional view of the wing 2000 of FIGS. 20-22, illustrating the variable camber portion 2002 of FIGS. 20-22 in an example drooped position 2302, and illustrating the flap 2006 of FIGS. 20-22 in an example deployed position 2304.

The wing 2000 and the flap 2006 of FIGS. 20-23 are example implementations of the wing 100 and the flap 102 of FIG. 1 described above, wherein the wing 100 is modified to include one or more variable camber portion(s) (e.g., the variable camber portion 2002 of FIGS. 20-23) that define(s) the trailing edge 108 of the wing 100. The wing 2000 can include multiple and/or separate instances of the variable camber portion 2002, and can also include multiple and/or separate instances of the flap 2006, much in the same way that the above-described wing 1000 of FIG. 10 includes multiple and/or separate instances of the aileron 1002 and multiple and/or separate instances of the flap 1004. The number of instances of the variable camber portion 2002 and the number of instances of the flap 2006 included by the wing 2000 can vary independently of one another. For example, the number of instances of the variable camber portion 2002 can be less than the number of instances of the flap 2006. As another example, the number of instances of the variable camber portion 2002 can be equal to the number of instances of the flap 2006. As yet another example, the number of instances of the variable camber portion 2002 can be greater than the number of instances of the flap 2006.

The wing 2000 of FIGS. 20-23 includes an example upper surface 2010, an example lower surface 2012, and an example trailing edge 2014. The lower surface 2012 of the wing 2000 is located opposite the upper surface 2010 of the wing 2000. The trailing edge 2014 of the wing 2000 is located between (e.g., extends between) the upper surface 2010 and the lower surface 2012 of the wing 2000, opposite a leading edge of the wing 2000.

The variable camber portion 2002 of FIGS. 20-23 is movable (e.g., pivotable) from the neutral position 2004 shown in FIG. 20 into the drooped position 2302 shown in FIG. 23 via an actuation mechanism and/or or a linkage assembly disposed along and/or mounted to the wing 2000. In the illustrated example of FIGS. 20-23, the variable camber portion 2002 automatically moves from the neutral position 2004 of FIG. 24 into the drooped position 2302 of FIG. 23 in response to movement of the flap 2006 from the stowed position 2008 of FIG. 20 into the deployed position 2304 of FIG. 23. The variable camber portion 2002 forms and/or defines the trailing edge 2014 of the wing 2000. Movement of the variable camber portion 2002 of FIGS. 20-23 from the neutral position 2004 of FIG. 20 into the drooped position 2302 of FIG. 23 causes the trailing edge 2014 of the wing 2000 to deflect and/or droop downward.

In the illustrated example of FIGS. 20-23, the variable camber portion 2002 includes an example deformable skin section 2016, an example trailing edge wedge 2018, and an example variable camber coupler 2020. The deformable skin section 2016 of the variable camber portion 2002 is located along the upper surface 2010 of the wing 2000. The trailing edge wedge 2018 of the variable camber portion 2002 is located between the upper surface 2010 and the lower surface 2012 of the wing 2000, at and/or along the trailing edge 2014 of the wing 2000. A first end of the variable camber coupler 2020 is coupled (e.g., pivotally coupled) to an actuator and/or to one or more components of a linkage assembly of the wing 2000. A second end of the variable camber coupler 2020 is coupled (e.g., pivotally coupled) to the trailing edge wedge 2018.

The deformable skin section 2016 of the variable camber portion 2002 of FIGS. 20-23 can be formed from any type(s) and/or combination(s) of elastomeric materials, fiber-reinforced polymer materials, and/or carbon-reinforced polymer materials capable of being expanded, stretched, and/or otherwise deformed under the application of a mechanical force (e.g., as applied via the variable camber coupler 2020), with the deformable skin section 2016 returning and/or retracting to its initial contracted, unstretched, and/or undeformed shape upon removal of the application of the mechanical force. In the illustrated example of FIGS. 20-23, the deformable skin section 2016 expands as the trailing edge 2014 of the variable camber portion 2002 of the wing 2000 moves (e.g., via an applied mechanical force) from the neutral position 2004 of FIG. 20 into the drooped position 2302 of FIG. 23. Conversely, the deformable skin section 2016 retracts as the trailing edge 2014 of the variable camber portion 2002 of the wing 2000 leading edge of the wing moves from the drooped position 2302 of FIG. 23 into the neutral position 2004 of FIG. 24.

The flap 2006 of FIGS. 20-23 is pivotally coupled to the wing 2000. In this regard, the flap 2006 is movable (e.g., pivotable) relative to the trailing edge 2014 of the wing 2000 between the stowed position 2008 shown in FIG. 20 and the deployed position 2304 shown in FIG. 23. The flap 2006 passes through one or more intermediary positions (e.g., the first intermediary position 2102 shown in FIG. 21, the second intermediary position 2202 shown in FIG. 22, etc.) as the flap 2006 moves from the stowed position 2008 of FIG. 20 into the deployed position 2304 of FIG. 23. In some examples, one or more of such intermediary positions constitute stationary deployment positions at which the flap 2006 can be fixed, held, and/or otherwise maintained (e.g., during a flight of an aircraft) when the flap 2006 is not in the stowed position 2008 of FIG. 20. In other examples, the flap 2006 can instead be configured such that the deployed position 2304 of FIG. 23 constitutes the only stationary deployment position at which the flap 2006 can be fixed, held, and/or otherwise maintained (e.g., during a flight of an aircraft) when the flap 2006 is not in the stowed position 2008 of FIG. 20.

The flap 2006 of FIGS. 20-23 is located along the lower surface 2012 of the wing 2000 when the flap 2006 is in the stowed position 2008 shown in FIG. 20. In the illustrated example of FIGS. 20-23, the wing 2000 further includes an example opening 2104 formed in the lower surface 2012 of the wing 2000. In some examples, the flap 2006 and the opening 2104 of the wing 2000 are respectively configured such that at least a portion of the flap 2006 is located within, bounded by, and/or positioned adjacent to the opening 2104 when the flap 2006 is in the stowed position 2008 of FIG. 20. The flap 2006 of the wing 2000 of FIGS. 20-23 is deployable from and/or through the opening 2104 in connection with the flap 2006 moving away from the stowed position 2008 of FIG. 20 toward the deployed position 2304 of FIG. 23. At least a portion of the flap 2006 (e.g., the majority of the flap 2006) is located rearward of the trailing edge 2014 of the wing 2000 when the flap 2006 is in the deployed position 2304 of FIG. 23.

In the illustrated example of FIGS. 20-23, the flap 2006 includes an example first surface 2022, an example second surface 2024, an example first edge 2026, and an example second edge 2028. The second surface 2024 of the flap 2006 is located opposite the first surface 2022 of the flap 2006. The first edge 2026 of the flap 2006 is located between (e.g., extends between) the first surface 2022 and the second surface 2024 of the flap 2006. The second edge 2028 of the flap 2006 is located between (e.g., extends between) the first surface 2022 and the second surface 2024 of the flap 2006, opposite the first edge 2026 of the flap 2006. As shown in FIGS. 20-23, the first surface 2022 of the flap 2006 extends between the first edge 2026 and the second edge 2028 of the flap 2006. The second surface 2024 of the flap 2006 similarly extends between the first edge 2026 and the second edge 2028 of the flap 2006. In the illustrated example of FIGS. 20-23, the first surface 2022 and the second surface 2024 of the flap 2006 respectively have a generally planar profile (e.g., a generally flat profile). In other examples, the first surface 2022 and/or the second surface 2024 of the flap 2006 can instead have a non-planar profile (e.g., a curved or contoured profile).

As shown by the sequence of movements of the flap 2006 illustrated in FIGS. 20-23, the flap 2006 inverts and/or reverses its orientation as the flap 2006 moves from the stowed position 2008 of FIG. 20 into the deployed position 2304 of FIG. 23. When the flap 2006 of FIGS. 20-23 is in the stowed position 2008 of FIG. 20, the first surface 2022 of the flap 2006 faces and/or is generally oriented downward, the second surface 2024 of the flap 2006 faces and/or is generally oriented upward, the first edge 2026 of the flap 2006 faces and/or is generally oriented rearward, and the second edge 2028 of the flap 2006 faces and/or is generally oriented forward. Conversely, when the flap 2006 of FIGS. 20-23 is in the deployed position 2304 of FIG. 23, the first surface 2022 of the flap 2006 faces and/or is generally oriented upward, the second surface 2024 of the flap 2006 faces and/or is generally oriented downward, the first edge 2026 of the flap 2006 faces and/or is generally oriented forward, and the second edge 2028 of the flap 2006 faces and/or is generally oriented rearward. The first edge 2026 of the flap 2006 is located rearward of the second edge 2028 of the flap 2006 when the flap 2006 is in the stowed position 2008 of FIG. 20. Conversely, the first edge 2026 of the flap 2006 is located forward of the second edge 2028 of the flap 2006 when the flap 2006 is in the deployed position 2304 of FIG. 23.

In some examples, the first surface 2022 of the flap 2006 is flush with the lower surface 2012 of the wing 2000 adjacent the opening 2104 when the flap 2006 is fully retracted into the stowed position 2008 of FIG. 20. Positioning the first surface 2022 of the flap 2006 of the wing 2000 in this manner relative to the lower surface 2012 of the wing 2000 adjacent the opening 2104 advantageously reduces (e.g., minimizes) the possibility of aerodynamic drag that may be attributed to the presence of the flap 2006 when the flap 2006 is in the stowed position 2008. Such a reduction in aerodynamic drag is beneficial to the operation of the aircraft during flight, particularly when the aircraft is performing a cruise operation while the flap 2006 is in the stowed position 2008 of FIG. 20.

In the illustrated example of FIGS. 20-23, the variable camber portion 2002 of the wing 2000 is in the neutral position 2004 of FIG. 20 when the flap 2006 of the wing 2000 is in the stowed position 2008 of FIG. 20. Conversely, the variable camber portion 2002 of the wing 2000 is in the drooped position 2302 of FIG. 23 when the flap 2006 of the wing 2000 is in the deployed position 2304 of FIG. 23. In the illustrated example of FIGS. 20-23, movement and/or actuation of the variable camber portion 2002 of the wing 2000 between the neutral position 2004 of FIG. 20 and the drooped position 2302 of FIG. 23 occurs via the same actuator and/or the same linkage assembly that is operated to move and/or actuate the flap 2006 of the wing 2000 between the stowed position 2008 of FIG. 20 and the deployed position 2304 of FIG. 23, with the movement of the variable camber portion 2002 depending entirely upon the movement of the flap 2006. In other examples, movement and/or actuation of the variable camber portion 2002 of the wing 2000 between the neutral position 2004 of FIG. 20 and the drooped position 2302 of FIG. 23 can instead occur via a first actuator and/or a first linkage assembly that is operated independently from the operation of a second actuator and/or a second linkage assembly that moves and/or actuates the flap 2006 of the wing 2000 between the stowed position 2008 of FIG. 20 and the deployed position 2304 of FIG. 23.

In the illustrated example of FIGS. 20-23, the wing 2000 further includes an example bullnose 2030 pivotally coupled to the flap 2006. The bullnose 2030 of FIGS. 20-23 includes an example first surface 2032, an example second surface 2034, an example first end 2036, and an example second end 2038. The second surface 2034 of the bullnose 2030 is located opposite the first surface 2032 of the bullnose 2030. The first end 2036 of the bullnose 2030 is located between (e.g., extends between) the first surface 2032 and the second surface 2034 of the bullnose 2030. The second end 2038 of the bullnose 2030 is located between (extends between) the first surface 2032 and the second surface 2034 of the bullnose 2030, opposite the first end 2036 of the bullnose 2030. As shown in FIGS. 20-23, the first surface 2032 of the bullnose 2030 extends between the first end 2036 and the second end 2038 of the bullnose 2030. The second surface 2034 of the bullnose 2030 similarly extends between the first end 2036 and the second end 2038 of the bullnose 2030. The first surface 2032 and the second end 2038 of the bullnose 2030 respectively have a curved or contoured profile.

In the illustrated example of FIGS. 20-23, the first end 2036 of the bullnose 2030 is pivotally coupled to the flap 2006 along the first edge 2026 of the flap 2006. By contrast, the second end 2038 of the bullnose 2030 is a free end that is generally not connected to any structural component of the flap 2006 and/or, more generally, is not connected to any structural component of the wing 2000. In other examples, the second end 2038 of the bullnose 2030 can be connected to a structural component of the wing 2000, such as to a component of a linkage assembly of the wing 2000 that facilitates movement of the flap 2006 between the stowed position 2008 of FIG. 20 and the deployed position 2304 of FIG. 23.

The bullnose 2030 of FIGS. 20-23 is configured to pivot relative to the flap 2006 as the flap 2006 moves between the stowed position 2008 of FIG. 20 and the deployed position 2304 of FIG. 23. When the flap 2006 is in the stowed position 2008 of FIG. 20, the bullnose 2030 is located within an example internal compartment 2040 of the wing 2000 spatially and/or physically bounded by the upper surface 2010, the lower surface 2012, and the variable camber portion 2002 of the wing 2000. When so positioned, the bullnose 2030 is effectively folded onto the flap 2006 such that the first surface 2032 of the bullnose 2030 and the first surface 2022 of the flap 2006 face and/or are generally oriented away from one another, and such that the second surface 2034 of the bullnose 2030 and the second surface 2024 of the flap 2006 face and/or are generally oriented toward one another.

When the flap 2006 is in the deployed position 2304 of FIG. 23, the bullnose 2030 is located below the trailing edge 2014 of the variable camber portion 2002 of the wing 2000. When so positioned, the bullnose 2030 is unfolded from and/or relative to the flap 2006 such that the first surface 2032 of the bullnose 2030 and the first surface 2022 of the flap 2006 face and/or are generally oriented in a same or similar direction (e.g., upwards), and such that the second surface 2034 of the bullnose 2030 and the second surface 2024 of the flap 2006 face and/or are generally oriented in another same or similar direction (e.g., downwards). As shown in FIGS. 20-23, regardless of whether the flap 2006 is in the stowed position 2008 of FIG. 20 or the deployed position 2304 of FIG. 24, the first surface 2032 of the bullnose 2030 faces and/or is generally oriented upward, the second surface 2034 of the bullnose 2030 faces and/or is generally oriented downward, the first end 2036 of the bullnose 2030 faces and/or is generally oriented rearward, and the second end 2038 of the bullnose 2030 faces and/or is generally oriented forward. Thus, unlike the flap 2006, which inverts and/or reverses its orientation as the flap 2006 moves from the stowed position 2008 of FIG. 20 into the deployed position 2304 of FIG. 23, the bullnose 2030, which pivots relative to the flap 2006, generally maintains its orientation as the flap 2006 moves from the stowed position 2008 of FIG. 20 into the deployed position 2304 of FIG. 23.

As shown in FIG. 23, the first surface 2032 of the bullnose 2030 of the wing 2000 is separated from the trailing edge 2014 of the variable camber portion 2002 of the wing 2000 by an example gap 2306 when the flap 2006 is in the deployed position 2304 of FIG. 23. The presence of the gap 2306 advantageously facilitates the aerodynamic passage of an airflow between the bullnose 2030 of the wing 2000 and the lower surface 2012 and/or the trailing edge 2014 of the wing 2000. In this regard, the bullnose 2030 of the wing 2000, the lower surface 2012 of the wing 2000, and/or the trailing edge 2014 of the wing 2000 are respectively configured such that an airflow passes upward and/or rearward over the second end 2038 of the bullnose 2030 of the wing 2000, and then subsequently rearward through the gap 2306 formed between the first surface 2032 of the bullnose 2030 of the wing 2000 on the one hand and the lower surface 2012 and/or the trailing edge 2014 of the wing 2000 on the other hand. The contoured surface(s) of the bullnose 2030 advantageously provide for an aerodynamically-tuned passage of the airflow through the gap 2306 when the flap 2006 is in the deployed position 2304 of FIG. 23.

In the illustrated example of FIGS. 20-23, the bullnose 2030 has a length extending from the first end 2036 to the second end 2038 of the bullnose 2030, and the flap 2006 has a length extending from the first edge 2026 to the second edge 2028 of the flap 2006. In some examples, the length of the bullnose 2030 is significantly less than the length of the flap 2006. For example, as shown in FIGS. 20-23, the length of the bullnose 2030 is approximately one-fifth (e.g., twenty percent) of the length of the flap 2006. In other examples, the extent to which the length of the bullnose 2030 is less than the length of the flap 2006 can differ (e.g., five percent less, ten percent less, fifty percent less, seventy-five percent less, ninety percent less, etc.). In still other examples, the length of the bullnose 2030 can instead be greater than or approximately equal to the length of the flap 2006.

The wing 2000 of FIGS. 20-23 further includes an example structural rib 2042, an example actuator 2044, and an example linkage assembly 2046. The structural rib 2042 is positioned at a fixed location within the internal compartment 2040 of the wing 2000, with the structural rib 2042 being spatially and/or physically bounded by the upper surface 2010, the lower surface 2012, and the trailing edge 2014 of the wing 2000. In the illustrated example of FIGS. 20-23, a portion (e.g., a fixed portion) of the actuator 2044 is coupled to the structural rib 2042. In other examples, the portion (e.g., the fixed portion) of the actuator 2044 is instead coupled to another structural component of the wing 2000. In the illustrated example of FIGS. 20-23, the actuator 2044 is implemented as a rotary actuator configured to move (e.g., rotate or pivot) one or more component(s) of the linkage assembly 2046 to effect movement of the flap 2006 of FIGS. 20-23 between the stowed position 2008 of FIG. 20 and the deployed position 2304 of FIG. 23, and also to effect movement of the variable camber portion 2002 of FIGS. 20-23 between the neutral position 2004 of FIG. 20 and the drooped position 2302 of FIG. 23. In other examples, the actuator 2044 is instead implemented as a translational actuator configured to move (e.g., slide or extend) one or more component(s) of the linkage assembly 2046 to effect movement of the flap 2006 of FIGS. 20-23 between the stowed position 2008 of FIG. 20 and the deployed position 2304 of FIG. 23, and also to effect movement of the variable camber portion 2002 of FIGS. 20-23 between the neutral position 2004 of FIG. 20 and the drooped position 2302 of FIG. 23.

The actuator 2044 of FIGS. 20-23 is actuated, controlled, and/or operated by one or more control system(s) of the wing 2000 and/or, more generally, of the aircraft that implements the wing 2000. Such control system(s) can include an electrical control system operatively coupled to the actuator 2044, a mechanical control system operatively coupled to the actuator 2044, a hydraulic control system operatively coupled to the actuator 2044, a pneumatic control system operatively coupled to the actuator 2044, and/or any combination thereof.

In the illustrated example of FIGS. 20-23 the linkage assembly 2046 is coupled to one or more portion(s) of the structural rib 2042, to the actuator 2044, to the variable camber portion 2002, to the flap 2006, and to the bullnose 2030 of the wing 2000. The linkage assembly 2046 is configured to move the flap 2006 between the stowed position 2008 of FIG. 20 and the deployed position 2304 of FIG. 23, and to move the variable camber portion 2002 of FIGS. 20-23 between the neutral position 2004 of FIG. 20 and the drooped position 2302 of FIG. 23, both in response to actuation of the actuator 2044. As best shown in FIGS. 21-23, the linkage assembly 2046 of FIGS. 20-23 includes an example drive arm 2106, an example drive coupler 2108, an example rocker 2110, an example panel coupler 2112, an example bullnose coupler 2114, and the variable camber coupler 2020. In other examples, the linkage assembly 2046 of the wing 2000 can include a different number and/or a different arrangement of components relative to the components of the linkage assembly 2046 of FIGS. 20-23 referenced above and further described herein.

In the illustrated example of FIGS. 20-23, a first end of the drive arm 2106 is operatively coupled to the actuator 2044, and a second end of the drive arm 2106 is pivotally coupled to the drive coupler 2108. A first end of the drive coupler 2108 is pivotally coupled to the drive arm 2106, and a second end of the drive coupler 2108 is pivotally coupled to the flap 2006. A first end of the rocker 2110 is pivotally coupled to the structural rib 2042 and/or to the variable camber coupler 2020, and a second end of the rocker 2110 is pivotally coupled to the panel coupler 2112. The rocker 2110 is also pivotally coupled to the drive coupler 2108 at a location between the first and second ends of the rocker 2110. A first end of the panel coupler 2112 is pivotally coupled to the rocker 2110, and a second end of the panel coupler 2112 is pivotally coupled to the flap 2006. A first end of the bullnose coupler 2114 is pivotally coupled to the drive coupler 2108, and a second end of the bullnose coupler 2114 is pivotally coupled to the bullnose 2030. A first end of the variable camber coupler 2020 is pivotally coupled to the structural rib 2042 and/or to the 2110, and a second end of the variable camber coupler 2020 is pivotally coupled to the trailing edge wedge 2018.

The flap 2006 of the wing 2000 is pivotally coupled to the drive coupler 2108 and to the panel coupler 2112 of the linkage assembly 2046 of the wing 2000 at separate locations along the second surface 2024 of the flap 2006. The first end 2036 of the bullnose 2030 of the wing 2000 is pivotally coupled to the flap 2006 of the wing 2000 at and/or along the first edge 2026 of the flap 2006. The bullnose 2030 of the wing 2000 is also pivotally coupled to the bullnose coupler 2114 of the linkage assembly 2046 of the wing 2000 at a location between the first end 2036 and the second end 2038 of the bullnose 2030 at and/or along the second surface 2034 of the bullnose 2030. In the illustrated example of FIGS. 20-23, the bullnose coupler 2114 of the linkage assembly 2046 is configured to cause the bullnose 2030 to pivot relative to the flap 2006 as the flap 2006 moves between the stowed position 2008 of FIG. 20 and the deployed position 2304 of FIG. 23. The variable camber coupler 2020 of the linkage assembly 2046 is configured to cause the variable camber portion 2002 to move between the neutral position 2004 of FIG. 20 and the drooped position 2302 of FIG. 23 as the flap 2006 moves between the stowed position 2008 of FIG. 20 and the deployed position 2304 of FIG. 23.

When the flap 2006 of FIGS. 20-23 is in the stowed position 2008 of FIG. 20, the drive arm 2106, the drive coupler 2108, the rocker 2110, the panel coupler 2112, the bullnose coupler 2114, and the variable camber coupler 2020 of the linkage assembly 2046 are respectively located within the internal compartment 2040 of the wing 2000, with each of the drive arm 2106, the drive coupler 2108, the rocker 2110, the panel coupler 2112, the bullnose coupler 2114, and the variable camber coupler 2020 being spatially and/or physically bounded by the upper surface 2010, the lower surface 2012, and the trailing edge 2014 of the wing 2000. As the flap 2006 of FIGS. 20-23 moves from the stowed position 2008 of FIG. 20 into the deployed position 2304 of FIG. 23, one or more portion(s) of the drive coupler 2108, the rocker 2110, the panel coupler 2112, and the bullnose coupler 2114 of the linkage assembly 2046 exit and/or deploy from the internal compartment 2040 of the wing 2000 via the opening 2104 formed in the lower surface 2012 of the wing 2000, thereby positioning at least a portion (e.g., the majority) of the flap 2006 rearward of the trailing edge 2014 of the wing 2000, and positioning the bullnose 2030 below the trailing edge 2014 of the wing 2000.

In some examples, the variable camber portion 2002, the flap 2006, the bullnose 2030, the structural rib 2042, the actuator 2044, and/or one or more component(s) of the linkage assembly 2046 of the wing 2000 of FIGS. 20-23, and/or their connection points or relative positions, etc., can be specifically configured to facilitate movement of the flap 2006 of the wing 2000 of FIGS. 20-23 to a plurality of stationary deployment positions at which the flap 2006 can be fixed, held and/or otherwise maintained (e.g., during a flight of an aircraft) when the flap 2006 is not in the stowed position 2008 of FIG. 20. In some such examples, the flap 2006 is deployable to a first stationary deployment position associated with a takeoff operation of an aircraft implementing the wing 2000, and to a second stationary deployment position (e.g., different from the first stationary deployment position) associated with a landing operation of an aircraft implementing the wing 2000.

Figure 24:
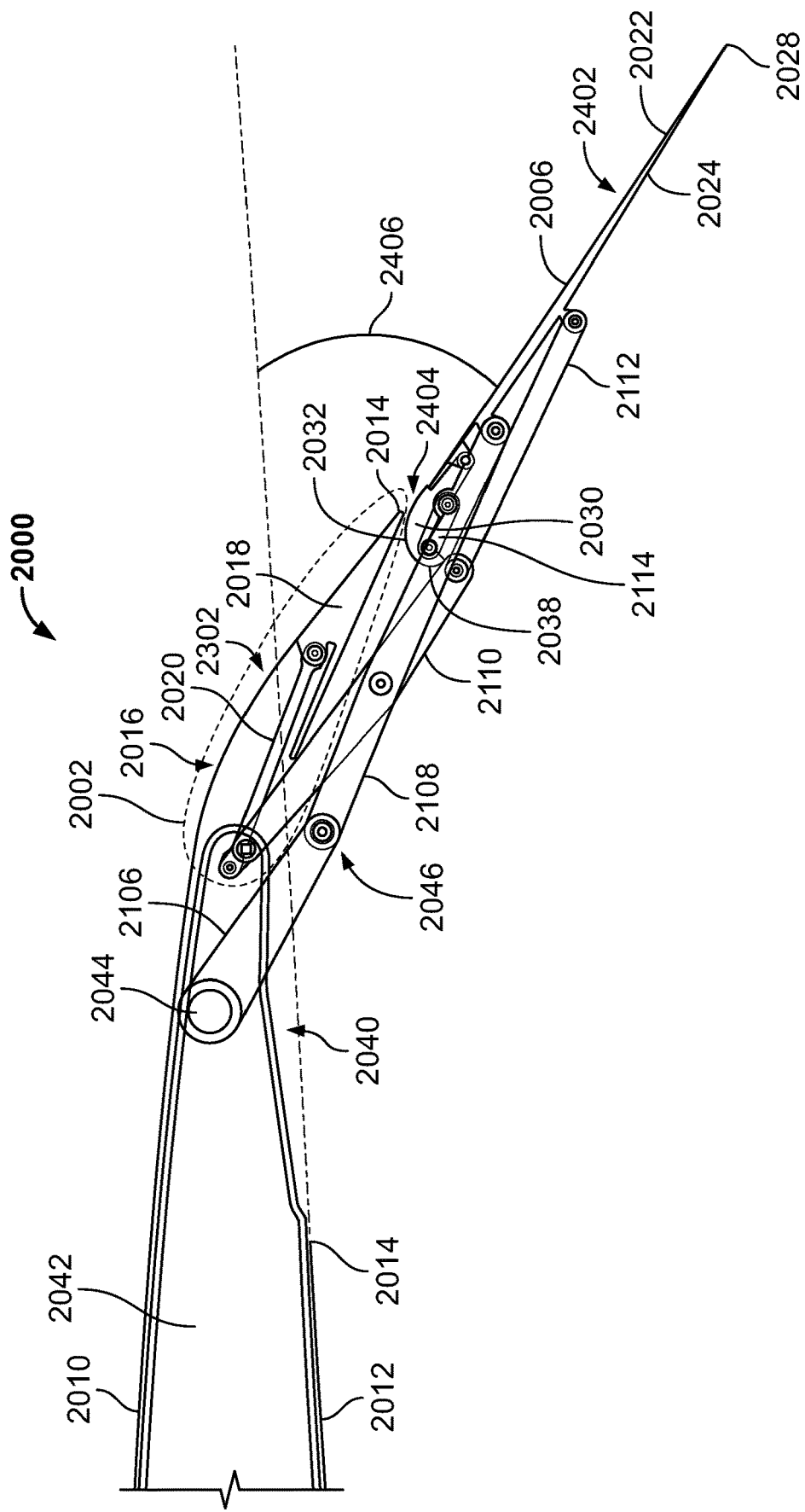
FIG. 24 is a cross-sectional view of the wing of FIGS. 20-23, illustrating the flap of FIGS. 20-23 in a first example stationary deployed position associated with a takeoff operation of an aircraft implementing the wing.
Figure 25:
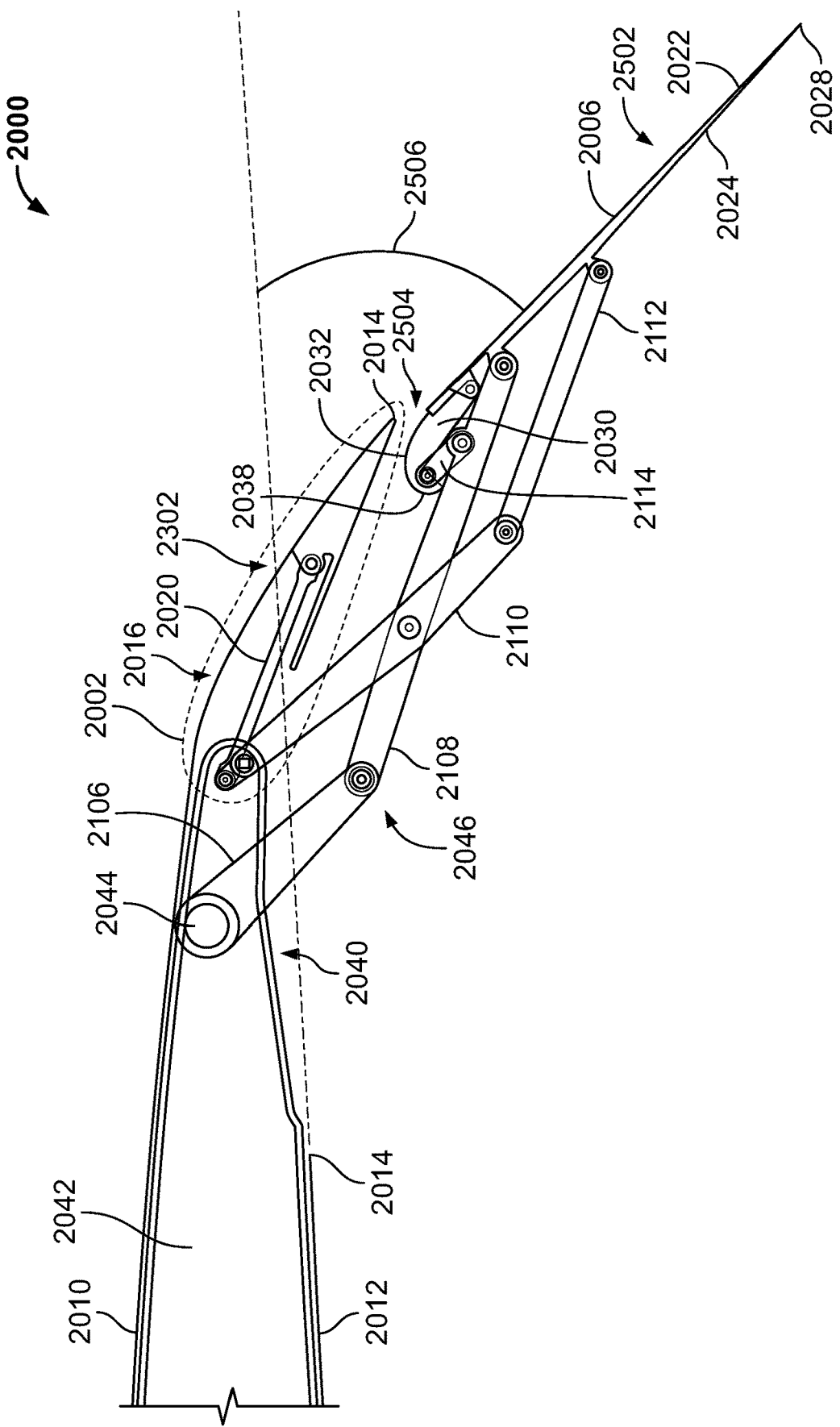
FIG. 25 is a cross-sectional view of the wing of FIGS. 20-24, illustrating the flap of FIGS. 20-24 in a second example stationary deployment position associated with a landing operation of an aircraft implementing the wing.

FIG. 24 is a cross-sectional view of the wing 2000 of FIGS. 20-23, illustrating the flap 2006 of FIGS. 20-23 in a first example stationary deployed position 2402 associated with a takeoff operation of an aircraft implementing the wing 2000. FIG. 25 is a cross-sectional view of the wing 2000 of FIGS. 20-24, illustrating the flap 2006 of FIGS. 20-24 in a second example stationary deployed position 2502 associated with a landing operation of an aircraft implementing the wing 2000. In the illustrated example of FIGS. 24 and 25, the flap 2006, the bullnose 2030, the structural rib 2042, the actuator 2044, and/or one or more component(s) of the linkage assembly 2046 of the wing 2000 are specifically configured (e.g., modified relative to the flap 2006, the bullnose 2030, the structural rib 2042, the actuator 2044, and/or the components of the linkage assembly 2046 shown in FIGS. 20-23) to facilitate movement of the flap 2006 of the wing 2000 into the first stationary deployment position 2402 and the second stationary deployment position 2502.

As shown in FIG. 24, the bullnose 2030 of the wing 2000 is separated from the trailing edge 2014 of the variable camber portion 2002 of the wing 2000 by a first example gap 2404 when the flap 2006 of the wing 2000 is in the first stationary deployment position 2402. As shown in FIG. 25, the bullnose 2030 of the wing 2000 is separated from the trailing edge 2014 of the variable camber portion 2002 of the wing 2000 by a second example gap 2504 when the flap 2006 of the wing 2000 is in the second stationary deployment position 2502. In the illustrated example of FIGS. 24 and 25, the second gap 2504 associated with the second stationary deployment position 2502 of the flap 2006 is greater than the first gap 2404 associated with the first stationary deployment position 2402 of the flap 2006. In other examples, the second gap 2504 associated with the second stationary deployment position 2502 of the flap 2006 can instead be less than or equal to the first gap 2404 associated with the first stationary deployment position 2402 of the flap 2006.

As shown in FIG. 24, the wing 2000 has a first camber defined in part by a first example deployment angle 2406 of the flap 2006 of the wing 2000 when the flap 2006 is in the first stationary deployment position 2402. As shown in FIG. 25, the wing 2000 has a second camber defined in part by a second example deployment angle 2506 of the flap 2006 of the wing 2000 when the flap 2006 is in the second stationary deployment position 2502. In the illustrated example of FIGS. 24 and 25, the second deployment angle 2506 associated with the second stationary deployment position 2502 of the flap 2006 is greater than the first deployment angle 2406 associated with the first stationary deployment position 2402 of the flap 2006, and the second camber associated with the second stationary deployment position 2502 of the flap 2006 is accordingly greater than the first camber associated with the first stationary deployment position 2402 of the flap 2006. In other examples, the second deployment angle 2506 associated with the second stationary deployment position 2502 of the flap 2006 can instead be less than or equal to the first deployment angle 2406 associated with the first stationary deployment position 2402 of the flap 2006, and the second camber associated with the second stationary deployment position 2502 of the flap 2006 can instead accordingly be less than or equal to the first camber associated with the first stationary deployment position 2402 of the flap 2006.

Figure 26:
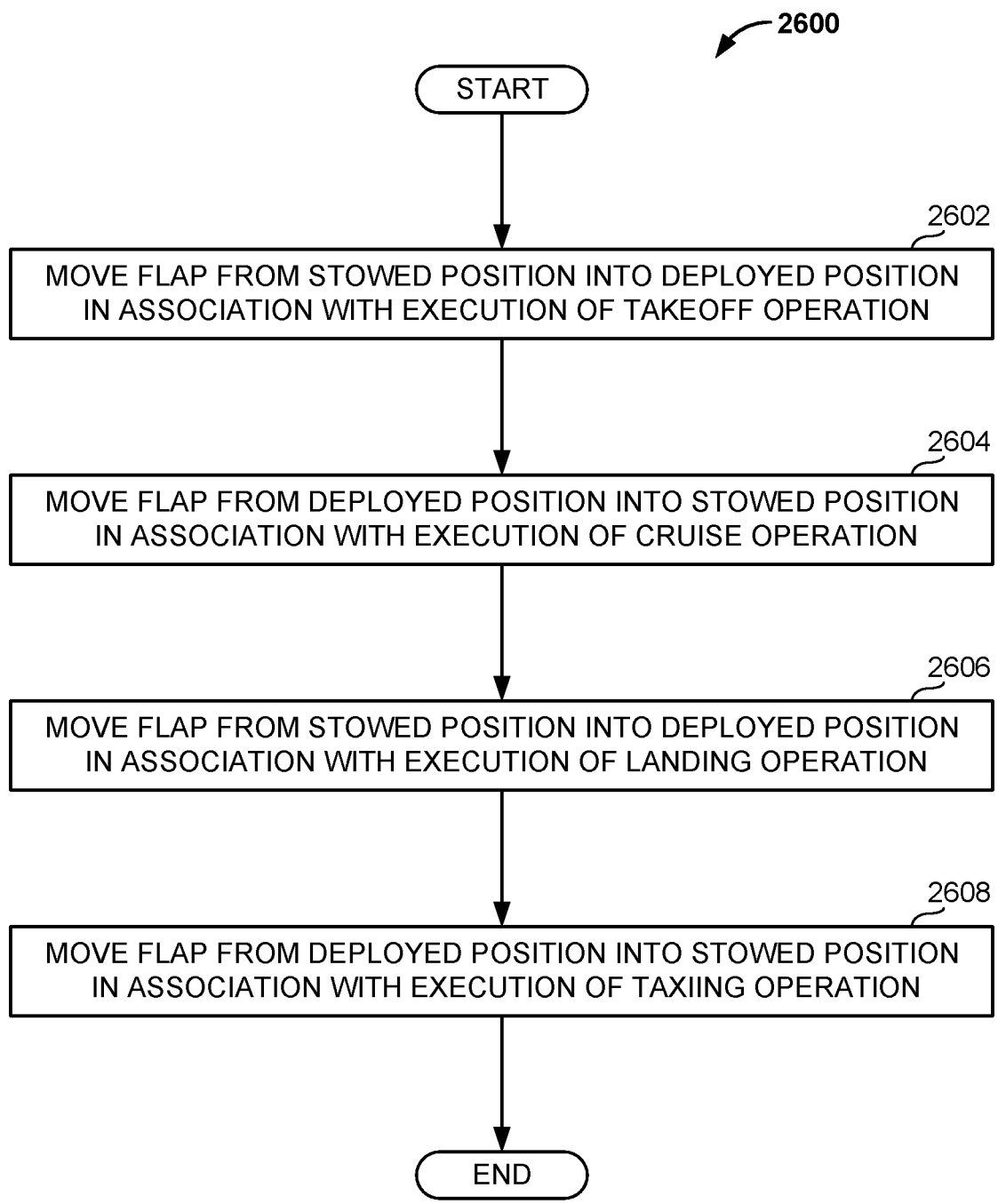
FIG. 26 is a flowchart representing an example method for operating the wing of FIGS. 2-9 during a flight of an aircraft implementing the wing.

FIG. 26 is a flowchart representing an example method 2600 for operating the wing 200 of FIGS. 2-9 during a flight of an aircraft implementing the wing 200. The operations of the method 2600 shown in FIG. 26 can be performed via one or more actuators (e.g., the actuator 234 of FIGS. 2-9), one or more linkage assemblies (e.g., the linkage assembly 236 of FIGS. 2-9), and/or one or more control systems (e.g., an electrical control system, a mechanical control system, a hydraulic control system, a pneumatic control system, etc.) of the aircraft.

The method 2600 of FIG. 26 begins with Block 2602. At Block 2602, the flap 202 of the wing 200 of FIGS. 2-9 moves from a stowed position (e.g., the stowed position 204 of FIG. 2) to a deployed position (e.g., the deployed position 502 of FIG. 5, or the first stationary deployment position 702 of FIG. 7) in association with the execution of a takeoff operation of the aircraft. Moving the flap 202 from the stowed position to the deployed position in connection with Block 2602 increases the camber of the wing 200. In some examples, moving the flap 202 from the stowed position to the deployed position in connection with Block 2602 causes the bullnose 220 of the wing 200 to pivot relative to the flap 202 of the wing 200, and further causes the bullnose 220 to become located below the trailing edge 210 of the wing 200. In some examples, moving the flap 202 from the stowed position to the deployed position in connection with Block 2602 provides a high-lift, low-drag configuration for the wing 200 that is highly beneficial for execution of the takeoff operation.

Block 2604 of the method 2600 of FIG. 26 follows Block 2602 of the method 2600. At Block 2604, the flap 202 of the wing 200 of FIGS. 2-9 moves from a deployed position (e.g., the deployed position 502 of FIG. 5, or the first stationary deployment position 702 of FIG. 7) to a stowed position (e.g., the stowed position 204 of FIG. 2) in association with the execution of a cruise operation of the aircraft. Moving the flap 202 from the deployed position to the stowed position in connection with Block 2604 decreases the camber of the wing 200. In some examples, moving the flap 202 from the deployed position to the stowed position in connection with Block 2604 causes the bullnose 220 of the wing 200 to pivot relative to the flap 202 of the wing 200, and further causes the bullnose 220 to become located entirely within an internal compartment (e.g., the internal compartment 230) of the wing 200. In some examples, moving the flap 202 from the deployed position to the stowed position in connection with Block 2604 provides a reduced-drag configuration (e.g., a minimized-drag configuration) for the wing 200 that is highly beneficial for execution of the cruise operation.

Block 2606 of the method 2600 of FIG. 26 follows Block 2604 of the method 2600. At Block 2606, the flap 202 of the wing 200 of FIGS. 2-9 moves from a stowed position (e.g., the stowed position 204 of FIG. 2) to a deployed position (e.g., the deployed position 502 of FIG. 5, or the second stationary deployment position 802 of FIG. 8) in association with the execution of a landing operation of the aircraft. Moving the flap 202 from the stowed position to the deployed position in connection with Block 2606 increases the camber of the wing 200. In some examples, moving the flap 202 from the stowed position to the deployed position in connection with Block 2606 causes the bullnose 220 of the wing 200 to pivot relative to the flap 202 of the wing 200, and further causes the bullnose 220 to become located below the trailing edge 210 of the wing 200. In some examples, moving the flap 202 from the stowed position to the deployed position in connection with Block 2606 provides a high-lift, high-drag configuration for the wing 200 that is highly beneficial for execution of the landing operation.

Block 2608 of the method 2600 of FIG. 26 follows Block 2606 of the method 2600. At Block 2608, the flap 202 of the wing 200 of FIGS. 2-9 moves from a deployed position (e.g., the deployed position 502 of FIG. 5, or the second stationary deployment position 802 of FIG. 8) to a stowed position (e.g., the stowed position 204 of FIG. 2) in association with the execution of a taxiing operation of the aircraft. Moving the flap 202 from the deployed position to the stowed position in connection with Block 2608 decreases the camber of the wing 200. In some examples, moving the flap 202 from the deployed position to the stowed position in connection with Block 2608 causes the bullnose 220 of the wing 200 to pivot relative to the flap 202 of the wing 200, and further causes the bullnose 220 to become located entirely within an internal compartment (e.g., the internal compartment 230) of the wing 200. Following Block 2608, the method 2600 of FIG. 26 ends.

The method 2600 of FIG. 26 includes example operations associated with the flap 202 of the wing 200 of FIGS. 2-9 during a flight of an aircraft implementing the wing 200. In some examples, the example operations (e.g., Block 2602, Block 2604, Block 2606, and Block 2608) included in the method 2600 of FIG. 26 are performed according to the specific sequence shown in FIG. 26. In other examples, one or more of the example operations (e.g., Block 2602, Block 2604, Block 2606, and Block 2608) included in the method 2600 of FIG. 26 can be repeated, reordered, or omitted relative to one or more of the other example operations (e.g., Block 2602, Block 2604, Block 2606, and Block 2608) included in the method 2600 of FIG. 26, and/or can be preceded or followed by one or more other operations associated with the flap 202 of the wing 200 but not expressly shown in FIG. 26.

Figure 27:
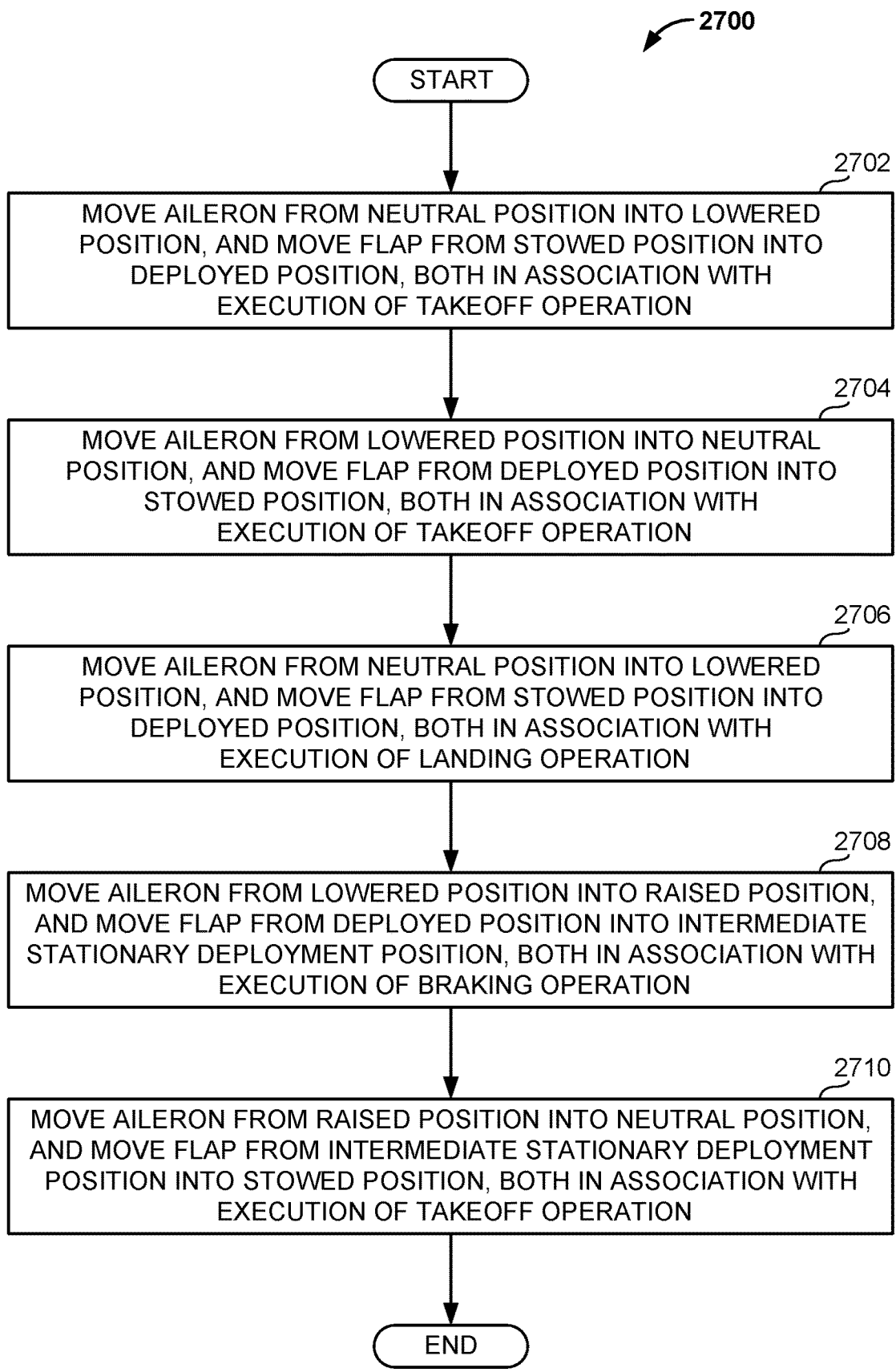
FIG. 27 is a flowchart representing an example method for operating the wing of FIGS. 11-19 during a flight of an aircraft implementing the wing.

FIG. 27 is a flowchart representing an example method 2700 for operating the wing 1100 of FIGS. 11-19 during a flight of an aircraft implementing the wing 1100. The operations of the method 2700 shown in FIG. 27 can be performed via one or more actuators (e.g., the actuator 1146 of FIGS. 11-19), one or more linkage assemblies (e.g., the linkage assembly 1148 of FIGS. 11-19), and/or one or more control systems (e.g., an electrical control system, a mechanical control system, a hydraulic control system, a pneumatic control system, etc.) of the aircraft.

The method 2700 of FIG. 27 begins with Block 2702. At Block 2702, the aileron 1102 of the wing 1100 of FIGS. 11-19 moves from a neutral position (e.g., the neutral position 1104 of FIG. 11) to a lowered position (e.g., the lowered position 1302 of FIG. 13), and the flap 1106 of the wing 1100 of FIGS. 11-19 moves from a stowed position (e.g., the stowed position 1108 of FIG. 11) to a deployed position (e.g., the deployed position 1602 of FIG. 16, or the first stationary deployment position 1702 of FIG. 17) in association with the execution of a takeoff operation of the aircraft. Moving the flap 1106 from the stowed position to the deployed position in connection with Block 2702 increases the camber of the wing 1100. In some examples, moving the flap 1106 from the stowed position to the deployed position in connection with Block 2702 causes the bullnose 1132 of the wing 1100 to pivot relative to the flap 1106 of the wing 1100, and further causes the bullnose 1132 to become located below the trailing edge 1122 of the aileron 1102 of the wing 1100. In some examples, moving the flap 1106 from the stowed position to the deployed position in connection with Block 2702 provides a high-lift, low-drag configuration for the wing 1100 that is highly beneficial for execution of the takeoff operation.

Block 2704 of the method 2700 of FIG. 27 follows Block 2702 of the method 2700. At Block 2704, the aileron 1102 of the wing 1100 of FIGS. 11-19 moves from a lowered position (e.g., the lowered position 1302 of FIG. 13) to a neutral position (e.g., the neutral position 1104 of FIG. 11), and the flap 1106 of the wing 1100 of FIGS. 11-19 moves from a deployed position (e.g., the deployed position 1602 of FIG. 16, or the first stationary deployment position 1702 of FIG. 17) to a stowed position (e.g., the stowed position 1108 of FIG. 11) in association with the execution of a cruise operation of the aircraft. Moving the flap 1106 from the deployed position to the stowed position in connection with Block 2704 decreases the camber of the wing 1100. In some examples, moving the flap 1106 from the deployed position to the stowed position in connection with Block 2704 causes the bullnose 1132 of the wing 1100 to pivot relative to the flap 1106 of the wing 1100, and further causes the bullnose 1132 to become located entirely within an internal compartment (e.g., the internal compartment 1142) of the wing 1100. In some examples, moving the flap 1106 from the deployed position to the stowed position in connection with Block 2704 provides a reduced-drag configuration (e.g., a minimized-drag configuration) for the wing 1100 that is highly beneficial for execution of the cruise operation.

Block 2706 of the method 2700 of FIG. 27 follows Block 2704 of the method 2700. At Block 2706, the aileron 1102 of the wing 1100 of FIGS. 11-19 moves from a neutral position (e.g., the neutral position 1104 of FIG. 11) to a lowered position (e.g., the lowered position 1302 of FIG. 13), and the flap 1106 of the wing 1100 of FIGS. 11-19 moves from a stowed position (e.g., the stowed position 1108 of FIG. 11) to a deployed position (e.g., the deployed position 1602 of FIG. 16, or the second stationary deployment position 1802 of FIG. 18) in association with the execution of a landing operation of the aircraft. Moving the flap 1106 from the stowed position to the deployed position in connection with Block 2706 increases the camber of the wing 1100. In some examples, moving the flap 1106 from the stowed position to the deployed position in connection with Block 2706 causes the bullnose 1132 of the wing 1100 to pivot relative to the flap 1106 of the wing 1100, and further causes the bullnose 1132 to become located below the trailing edge 1122 of the aileron 1102 of the wing 1100. In some examples, moving the flap 1106 from the stowed position to the deployed position in connection with Block 2706 provides a high-lift, high-drag configuration for the wing 1100 that is highly beneficial for execution of the landing operation.

Block 2708 of the method 2700 of FIG. 27 follows Block 2706 of the method 2700. At Block 2708, the aileron 1102 of the wing 1100 of FIGS. 11-19 moves from a lowered position (e.g., the lowered position 1302 of FIG. 13) to a raised position (e.g., the raised position 1202 of FIG. 12), and the flap 1106 of the wing 1100 of FIGS. 11-19 moves from a deployed position (e.g., the deployed position 1602 of FIG. 16, or the second stationary deployment position 1802 of FIG. 18) to an intermediate stationary deployment position (e.g., the third stationary deployment position 1902 of FIG. 19) in association with the execution of a braking operation of the aircraft. In some examples, moving the flap 1106 from the deployed position to the intermediate stationary deployment position in connection with Block 2708 provides an increased-drag configuration (e.g., a maximized-drag configuration) for the wing 1100 that is highly beneficial for execution of the braking operation.

Block 2710 of the method 2700 of FIG. 27 follows Block 2708 of the method 2700. At Block 2710, the aileron 1102 of the wing 1100 of FIGS. 11-19 moves from a raised position (e.g., the raised position 1202 of FIG. 12) to a neutral position (e.g., the neutral position 1104 of FIG. 11), and the flap 1106 of the wing 1100 of FIGS. 11-19 moves from an intermediate stationary deployment position (e.g., the third stationary deployment position 1902 of FIG. 19) to a stowed position (e.g., the stowed position 1108 of FIG. 11) in association with the execution of a taxiing operation of the aircraft. Moving the flap 1106 from the intermediate stationary deployment position to the stowed position in connection with Block 2710 decreases the camber of the wing 1100. In some examples, moving the flap 1106 from the intermediate stationary deployment position to the stowed position in connection with Block 2710 causes the bullnose 1132 of the wing 1100 to pivot relative to the flap 1106 of the wing 1100, and further causes the bullnose 1132 to become located entirely within an internal compartment (e.g., the internal compartment 1142) of the wing 1100. Following Block 2710, the method 2700 of FIG. 27 ends.

The method 2700 of FIG. 27 includes example operations associated with the aileron 1102 and the flap 1106 of the wing 1100 of FIGS. 11-19 during a flight of an aircraft implementing the wing 1100. In some examples, the example operations (e.g., Block 2702, Block 2704, Block 2706, Block 2708, and Block 2710) included in the method 2700 of FIG. 27 are performed according to the specific sequence shown in FIG. 27. In other examples, one or more of the example operations (e.g., Block 2702, Block 2704, Block 2706, Block 2708, and Block 2710) included in the method 2700 of FIG. 27 can be repeated, reordered, or omitted relative to one or more of the other example operations (e.g., Block 2702, Block 2704, Block 2706, Block 2708, and Block 2710) included in the method 2700 of FIG. 27, and/or can be preceded or followed by one or more other operations associated with the aileron 1102 and/or the flap 1106 of the wing 1100 but not expressly shown in FIG. 27.

Figure 28:
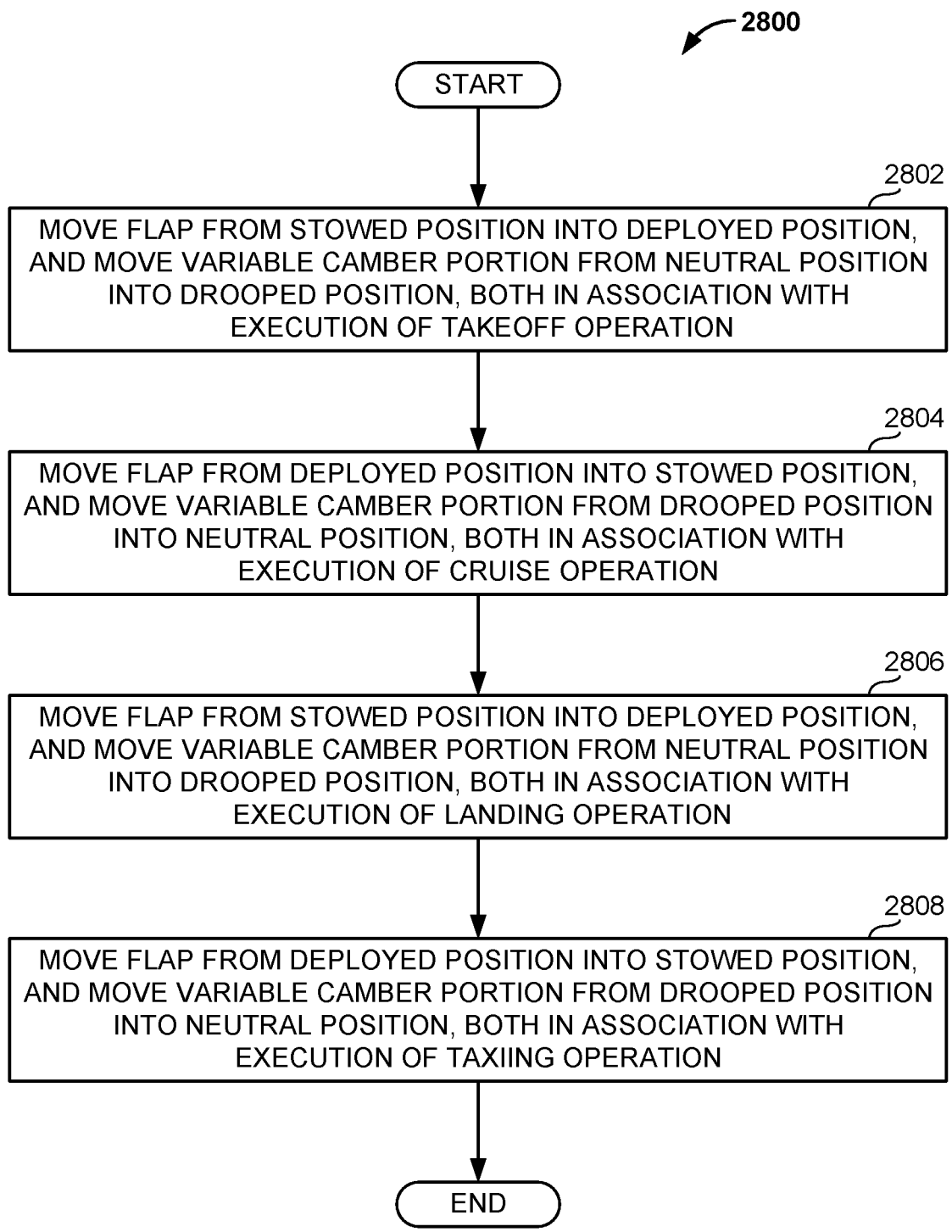
FIG. 28 is a flowchart representing an example method for operating the wing of FIGS. 20-25 during a flight of an aircraft implementing the wing.

FIG. 28 is a flowchart representing an example method 2800 for operating the wing 2000 of FIGS. 20-25 during a flight of an aircraft implementing the wing 2000. The operations of the method 2800 shown in FIG. 28 can be performed via one or more actuators (e.g., the actuator 2044 of FIGS. 20-25), one or more linkage assemblies (e.g., the linkage assembly 2046 of FIGS. 20-25), and/or one or more control systems (e.g., an electrical control system, a mechanical control system, a hydraulic control system, a pneumatic control system, etc.) of the aircraft.

The method 2800 of FIG. 28 begins with Block 2802. At Block 2802, the flap 2006 of the wing 2000 of FIGS. 20-25 moves from a stowed position (e.g., the stowed position 2008 of FIG. 20) to a deployed position (e.g., the deployed position 2304 of FIG. 23, or the first stationary deployment position 2402 of FIG. 24), and the variable camber portion 2002 of the wing 2000 extend from a neutral position (e.g., the neutral position 2004 of FIG. 20) to a drooped position (e.g., the drooped position 2302 of FIG. 23), both in association with the execution of a takeoff operation of the aircraft. Moving the flap 2006 from the stowed position to the deployed position in connection with Block 2802 increases the camber of the wing 2000. In some examples, moving the flap 2006 from the stowed position to the deployed position in connection with Block 2802 causes the bullnose 2030 of the wing 2000 to pivot relative to the flap 2006 of the wing 2000, and further causes the bullnose 2030 to become located below the trailing edge 2014 of the variable camber portion 2002 of the wing 2000. In some examples, moving the flap 2006 from the stowed position to the deployed position in connection with Block 2802 provides a high-lift, low-drag configuration for the wing 2000 that is highly beneficial for execution of the takeoff operation.

Block 2804 of the method 2800 of FIG. 28 follows Block 2802 of the method 2800. At Block 2804, the flap 2006 of the wing 2000 of FIGS. 20-25 moves from a deployed position (e.g., the deployed position 2304 of FIG. 23, or the first stationary deployment position 2402 of FIG. 24) to a stowed position (e.g., the stowed position 2008 of FIG. 20), and the variable camber portion 2002 of the wing 2000 retracts from a drooped position (e.g., the drooped position 2302 of FIG. 23) to a neutral position (e.g., the neutral position 2004 of FIG. 20), both in association with the execution of a cruise operation of the aircraft. Moving the flap 2006 from the deployed position to the stowed position in connection with Block 2804 decreases the camber of the wing 2000. In some examples, moving the flap 2006 from the deployed position to the stowed position in connection with Block 2804 causes the bullnose 2030 of the wing 2000 to pivot relative to the flap 2006 of the wing 2000, and further causes the bullnose 2030 to become located entirely within an internal compartment (e.g., the internal compartment 2040) of the wing 2000. In some examples, moving the flap 2006 from the deployed position to the stowed position in connection with Block 2804 provides a reduced-drag configuration (e.g., a minimized-drag configuration) for the wing 2000 that is highly beneficial for execution of the cruise operation.

Block 2806 of the method 2800 of FIG. 28 follows Block 2804 of the method 2800. At Block 2806, the flap 2006 of the wing 2000 of FIGS. 20-25 moves from a stowed position (e.g., the stowed position 2008 of FIG. 20) to a deployed position (e.g., the deployed position 2304 of FIG. 23, or the second stationary deployment position 2502 of FIG. 25), and the variable camber portion 2002 of the wing 2000 extend from a neutral position (e.g., the neutral position 2004 of FIG. 20) to a drooped position (e.g., the drooped position 2302 of FIG. 23), both in association with the execution of a landing operation of the aircraft. Moving the flap 2006 from the stowed position to the deployed position in connection with Block 2806 increases the camber of the wing 2000. In some examples, moving the flap 2006 from the stowed position to the deployed position in connection with Block 2806 causes the bullnose 2030 of the wing 2000 to pivot relative to the flap 2006 of the wing 2000, and further causes the bullnose 2030 to become located below the trailing edge 2014 of the variable camber portion 2002 of the wing 2000. In some examples, moving the flap 2006 from the stowed position to the deployed position in connection with Block 2806 provides a high-lift, high-drag configuration for the wing 2000 that is highly beneficial for execution of the landing operation.

Block 2808 of the method 2800 of FIG. 28 follows Block 2806 of the method 2800. At Block 2808, the flap 2006 of the wing 2000 of FIGS. 20-25 moves from a deployed position (e.g., the deployed position 2304 of FIG. 23, or the second stationary deployment position 2502 of FIG. 25) to a stowed position (e.g., the stowed position 2008 of FIG. 20), and the variable camber portion 2002 of the wing 2000 retracts from a drooped position (e.g., the drooped position 2302 of FIG. 23) to a neutral position (e.g., the neutral position 2004 of FIG. 20), both in association with the execution of a taxiing operation of the aircraft. Moving the flap 2006 from the deployed position to the stowed position in connection with Block 2808 decreases the camber of the wing 2000. In some examples, moving the flap 2006 from the deployed position to the stowed position in connection with Block 2808 causes the bullnose 2030 of the wing 2000 to pivot relative to the flap 2006 of the wing 2000, and further causes the bullnose 2030 to become located entirely within an internal compartment (e.g., the internal compartment 2040) of the wing 2000. Following Block 2808, the method 2800 of FIG. 28 ends.

The method 2800 of FIG. 28 includes example operations associated with the flap 2006 and the variable camber portion 2002 of the wing 2000 of FIGS. 20-25 during a flight of an aircraft implementing the wing 2000. In some examples, the example operations (e.g., Block 2802, Block 2804, Block 2806, and Block 2808) included in the method 2800 of FIG. 28 are performed according to the specific sequence shown in FIG. 28. In other examples, one or more of the example operations (e.g., Block 2802, Block 2804, Block 2806, and Block 2808) included in the method 2800 of FIG. 28 can be repeated, reordered, or omitted relative to one or more of the other example operations (e.g., Block 2802, Block 2804, Block 2806, and Block 2808) included in the method 2800 of FIG. 28, and/or can be preceded or followed by one or more other operations associated with the flap 2006 and/or the variable camber portion 2002 of the wing 2000 but not expressly shown in FIG. 28.

From the foregoing, it will be appreciated that underwing-mounted trailing edge flaps for wings of aircraft disclosed herein are movable between a stowed position located along a lower surface of the wing and a deployed position located rearward of the trailing edge of the wing. Movement of the flap is facilitated via a linkage assembly, the entirety of which can be stowed within an internal compartment of the wing when the flap is in the stowed position. The aforementioned configuration of the linkage assembly advantageously eliminates the need for any fairing located along the underside of the wing (e.g., as may occur with track or linkage-deployed Fowler flaps), thereby reducing the significant parasitic drag that is attributable to such fairings. The reduction in drag provides for a corresponding increase in fuel efficiency associated with operating the aircraft. Movement of the flap from the stowed position into the deployed position also advantageously increases both the effective area and the camber of the wing. Lower approach speeds are attainable due to the increased wing area and the increased camber, thereby providing for a safer aircraft that is capable of landing at airfields having relatively short runways or landing strips.

In some disclosed examples, the wing advantageously includes a bullnose pivotally coupled to the flap. The bullnose is located along an edge of the flap, and is configured to pivot relative to the flap as the flap moves between the stowed position and the deployed position. The flap, the bullnose, and the linkage assembly are configured such that the bullnose is located entirely within an internal compartment of the wing when the flap is in the stowed position, and such that the bullnose is located below the trailing edge of the wing when the flap is in the deployed position. The bullnose includes a contoured surface that advantageously provides for an aerodynamically-tuned passage of an airflow through a gap located between the contoured surface of the bullnose and the trailing edge of the wing when the flap is in the deployed position.

In some disclosed examples, the flap is advantageously movable to a first stationary deployment position associated with a takeoff operation of the aircraft, and separately to a second stationary deployment position associated with a landing operation of the aircraft. When the flap is in the first stationary deployment position, the wing has a first camber, the flap is located at a first deployment angle, and the bullnose is separated from the trailing edge by a first gap. The first camber of the wing, the first deployment angle of the flap, and the first gap associated with the bullnose when the flap is in the first stationary deployment position collectively provide a high-lift, low-drag configuration for the wing that is ideal for executing a takeoff operation of the aircraft. Significant improvements in takeoff field length, climb, and noise reduction are attributable to the high-lift, low-drag configuration associated with the first stationary deployment position. When the flap is in the second stationary deployment position, the wing has a second camber (e.g., greater than the first camber), the flap is located at a second deployment angle (e.g., greater than the first deployment angle), and the bullnose is separated from the trailing edge by a second gap (e.g., greater than the first gap). The second camber of the wing, the second deployment angle of the flap, and the second gap associated with the bullnose when the flap is in the second stationary deployment position collectively provide a high-lift, high-drag configuration for the wing that is ideal for executing a landing operation of the aircraft. Significant improvements in approach speed are attributable to the high-lift, high-drag configuration associated with the second stationary deployment position.

The underwing-mounted trailing edge flaps disclosed herein can advantageously be implemented on different types of aircraft having wings with different types of trailing edge structures. In some examples, an underwing-mounted trailing edge flap disclosed herein is implemented on an aircraft including a wing having a fixed trailing edge, wherein the flap is movable between a stowed position and a deployed position relative to the fixed trailing edge. In other examples, an underwing-mounted trailing edge flap disclosed herein is implemented on an aircraft including a wing having an aileron that is movable relative to a fixed portion of the wing, wherein the aileron forms and/or defines the trailing edge of the wing, and wherein the flap is movable between a stowed position and a deployed position relative to the trailing edge defined by the aileron. In still other examples, an underwing-mounted trailing edge flap disclosed herein is implemented on an aircraft including a wing having a variable camber portion that is movable relative to a fixed portion of the wing, wherein the variable camber portion forms and/or defines the trailing edge of the wing, and wherein the flap is movable between a stowed position and a deployed position relative to the trailing edge defined by the variable camber portion.

The following paragraphs provide various examples in relation to the underwing-mounted trailing edge flaps for wings of aircraft disclosed herein.

Example 1 includes a wing of an aircraft. In Example 1, the wing comprises an upper surface, a lower surface located opposite the upper surface, and a trailing edge located between the upper surface and the lower surface. In Example 1, the wing further comprises a flap pivotally coupled to the wing. In Example 1, the flap is movable between a stowed position located along the lower surface and a deployed position located rearward of the trailing edge. In Example 1, the flap includes a first edge, a second edge located opposite the first edge, a first surface extending between the first edge and the second edge, and a second surface located opposite the first surface and extending between the first edge and the second edge. In Example 1, the first edge is located rearward of the second edge when the flap is in the stowed position, and forward of the second edge when the flap is in the deployed position. In Example 1, the wing further comprises a bullnose pivotally coupled to the flap. In Example 1, the bullnose is located along the first edge and is configured to pivot relative to the flap as the flap moves between the stowed position and the deployed position.

Example 2 includes the wing of Example 1, wherein the bullnose is pivotally coupled to a bullnose coupler of a linkage assembly of the wing. In Example 2, the bullnose coupler is configured to cause the bullnose to pivot relative to the flap as the flap moves between the stowed position and the deployed position.

Example 3 includes the wing of Example 1, wherein the trailing edge is a fixed trailing edge. In Example 3, the bullnose is located below the fixed trailing edge when the flap is in the deployed position.

Example 4 includes the wing of Example 3, wherein the bullnose is separated from the fixed trailing edge by a gap when the flap is in the deployed position.

Example 5 includes the wing of Example 3, wherein the deployed position includes a first stationary deployment position associated with a takeoff operation of the aircraft and a second stationary deployment position associated with a landing operation of the aircraft.

Example 6 includes the wing of Example 5, wherein the bullnose is separated from the fixed trailing edge by a first gap when the flap is in the first stationary deployment position, and the bullnose is separated from the fixed trailing edge by a second gap when the flap is in the second stationary deployment position. In Example 6, the second gap differs from the first gap.

Example 7 includes the wing of Example 5, wherein the wing has a first camber when the flap is in the first stationary deployment position and a second camber when the flap is in the second stationary deployment position. In Example 7, the second camber is greater than the first camber.

Example 8 includes the wing of Example 3. In Example 8, the wing further comprises an actuator and a linkage assembly coupled to the actuator, to the flap, and to the bullnose. In Example 8, the linkage assembly is configured to move the flap between the stowed position and the deployed position in response to actuation of the actuator.

Example 9 includes the wing of Example 8, wherein the linkage assembly includes a drive arm, a drive coupler, a crank, a rocker, a crank coupler, a panel coupler, and a bullnose coupler. In Example 9, the drive arm is coupled to the actuator, the drive coupler is pivotally coupled to the drive arm, the crank is pivotally coupled to the drive coupler, the crank coupler is pivotally coupled to the crank, the bullnose coupler is pivotally coupled to the crank coupler, the rocker is pivotally coupled to the crank coupler, the panel coupler is pivotally coupled to the rocker, the flap is pivotally coupled to the crank coupler and pivotally coupled to the panel coupler along the second surface of the flap, and the bullnose is pivotally coupled to the bullnose coupler and pivotally coupled to the flap.

Example 10 includes the wing of Example 1. In Example 10, the wing further comprises an aileron pivotally coupled to the wing. In Example 10, the aileron is movable between a raised position and a lowered position. In Example 10, the aileron defines the trailing edge of the wing when the flap is in the stowed position. In Example 10, the aileron is in the lowered position when the flap is in the deployed position. In Example 10, the bullnose is located below the aileron when the flap is in the deployed position.

Example 11 includes the wing of Example 10, wherein the bullnose is separated from the aileron by a gap when the flap is in the deployed position.

Example 12 includes the wing of Example 10, wherein the deployed position includes a first stationary deployment position associated with a takeoff operation of the aircraft and a second stationary deployment position associated with a landing operation of the aircraft.

Example 13 includes the wing of Example 12, wherein the bullnose is separated from the aileron by a first gap when the flap is in the first stationary deployment position, and the bullnose is separated from the aileron by a second gap when the flap is in the second stationary deployment position. In Example 13, the second gap differs from the first gap.

Example 14 includes the wing of Example 12, wherein the wing has a first camber when the flap is in the first stationary deployment position and a second camber when the flap is in the second stationary deployment position. In Example 14, the second camber is greater than the first camber.

Example 15 includes the wing of Example 10, wherein the flap is movable to an intermediate stationary deployment position located between the stowed position and the deployed position. In Example 15, the flap is in the intermediate stationary deployment position and the aileron is in the raised position when the aircraft is executing a braking operation.

Example 16 includes the wing of Example 10. In Example 16, the wing further comprises an actuator and a linkage assembly coupled to the actuator, to the flap, and to the bullnose. In Example 16, the linkage assembly is configured to move the flap between the stowed position and the deployed position in response to actuation of the actuator.

Example 17 includes the wing of Example 16, wherein the linkage assembly includes a drive arm, a drive coupler, a rocker, a panel coupler, and a bullnose coupler. In Example 17, the drive arm is coupled to the actuator, the drive coupler is pivotally coupled to the drive arm, the bullnose coupler is pivotally coupled to the drive coupler, the rocker is pivotally coupled to the drive coupler, the panel coupler is pivotally coupled to the rocker, the flap is pivotally coupled to the drive coupler and pivotally coupled to the panel coupler along the second surface of the flap, and the bullnose is pivotally coupled to the bullnose coupler and pivotally coupled to the flap.

Example 18 includes the wing of Example 1. In Example 18, the wing further comprises a variable camber portion movable between a neutral position and a drooped position. In Example 18, the variable camber portion defines the trailing edge of the wing when the flap is in the stowed position. In Example 18, the variable camber portion automatically moves from the neutral position to the drooped position in response to movement of the flap from the stowed position to the deployed position. In Example 18, the bullnose is located below the variable camber portion when the flap is in the deployed position.

Example 19 includes the wing of Example 18, wherein the bullnose is separated from the variable camber portion by a gap when the flap is in the deployed position.

Example 20 includes the wing of Example 18, wherein the deployed position includes a first stationary deployment position associated with a takeoff operation of the aircraft and a second stationary deployment position associated with a landing operation of the aircraft.

Example 21 includes the wing of Example 20, wherein the bullnose is separated from the variable camber portion by a first gap when the flap is in the first stationary deployment position, and the bullnose is separated from the variable camber portion by a second gap when the flap is in the second stationary deployment position. In Example 21, the second gap differs from the first gap.

Example 22 includes the wing of Example 20, wherein the wing has a first camber when the flap is in the first stationary deployment position and a second camber when the flap is in the second stationary deployment position. In Example 22, the second camber is greater than the first camber.

Example 23 includes the wing of Example 18. In Example 23, the wing further comprises an actuator and a linkage assembly coupled to the actuator, to the flap, and to the bullnose. In Example 23, the linkage assembly is configured to move the flap between the stowed position and the deployed position in response to actuation of the actuator.

Example 24 includes the wing of Example 23, wherein the linkage assembly includes a drive arm, a drive coupler, a rocker, a panel coupler, a bullnose coupler, and a variable camber coupler. In Example 24, the drive arm is coupled to the actuator, the drive coupler is pivotally coupled to the drive arm, the bullnose coupler is pivotally coupled to the drive coupler, the rocker is pivotally coupled to the drive coupler, the panel coupler is pivotally coupled to the rocker, the variable camber coupler is pivotally coupled to the rocker, the flap is pivotally coupled to the drive coupler and pivotally coupled to the panel coupler along the second surface of the flap, the bullnose is pivotally coupled to the bullnose coupler and pivotally coupled to the flap, and the variable camber portion is pivotally coupled to the variable camber coupler.

Example 25 includes a method. In Example 25, the method comprises moving a flap pivotally coupled to a wing of an aircraft. In Example 25, the wing includes an upper surface, a lower surface located opposite the upper surface, a trailing edge located between the upper surface and the lower surface, and a bullnose. In Example 25, the bullnose is pivotally coupled to the flap. In Example 25, the flap is movable between a stowed position located along the lower surface and a deployed position located rearward of the trailing edge. In Example 25, the flap includes a first edge, a second edge located opposite the first edge, a first surface extending between the first edge and the second edge, and a second surface located opposite the first surface and extending between the first edge and the second edge. In Example 25, the first edge is located rearward of the second edge when the flap is in the stowed position, and forward of the second edge when the flap is in the deployed position. In Example 25, the bullnose is located along the first edge. In Example 25, the bullnose pivots relative to the flap as the flap moves between the stowed position and the deployed position.

Example 26 includes the method of Example 25, wherein the bullnose is pivotally coupled to a bullnose coupler of a linkage assembly of the wing. In Example 26, the bullnose coupler pivots the bullnose relative to the flap as the flap moves between the stowed position and the deployed position.

Example 27 includes the method of Example 25, wherein moving the flap between the stowed position and the deployed position includes actuating an actuator of the wing. In Example 27, the actuator is coupled to a linkage assembly of the wing. In Example 27, the linkage assembly is coupled to the flap and to the bullnose. In Example 27, the linkage assembly moves the flap between the stowed position and the deployed position in response to actuation of the actuator.

Example 28 includes the method of Example 25, wherein the trailing edge is a fixed trailing edge. In Example 28, the bullnose is located below the fixed trailing edge when the flap is in the deployed position.

Example 29 includes the method of Example 28, wherein the deployed position includes a first stationary deployment position associated with a takeoff operation of the aircraft and a second stationary deployment position associated with a landing operation of the aircraft. In Example 29, the method further comprises moving the flap to the first stationary deployment position when the aircraft is executing the takeoff operation, and moving the flap to the second stationary deployment position when the aircraft is executing the landing operation.

Example 30 includes the method of Example 29, wherein the wing has a first camber when the flap is in the first stationary deployment position and a second camber when the flap is in the second stationary deployment position. In Example 30, the second camber is greater than the first camber. In Example 30, the method further comprises increasing a camber of the wing when the flap moves from the first stationary deployment position to the second stationary deployment position.

Example 31 includes the method of Example 25. In Example 31, the method further comprises moving an aileron pivotally coupled to the wing. In Example 31, the aileron is movable between a raised position and a lowered position. In Example 31, the aileron defines the trailing edge of the wing when the flap is in the stowed position. In Example 31, the aileron is in the lowered position when the flap is in the deployed position. In Example 31, the bullnose is located below the aileron when the flap is in the deployed position.

Example 32 includes the method of Example 31, wherein the deployed position includes a first stationary deployment position associated with a takeoff operation of the aircraft and a second stationary deployment position associated with a landing operation of the aircraft. In Example 32, the method further comprises moving the flap to the first stationary deployment position when the aircraft is executing the takeoff operation, and moving the flap to the second stationary deployment position when the aircraft is executing the landing operation.

Example 33 includes the method of Example 32, wherein the wing has a first camber when the flap is in the first stationary deployment position and a second camber when the flap is in the second stationary deployment position. In Example 33, the second camber is greater than the first camber. In Example 33, the method further comprises increasing a camber of the wing when the flap moves from the first stationary deployment position to the second stationary deployment position.

Example 34 includes the method of Example 31. In Example 34, the method further comprises moving the flap to an intermediate stationary deployment position when the aircraft is executing a braking operation. In Example 34, the intermediate stationary deployment position is located between the stowed position and the deployed position. In Example 34, the aileron is in the raised position when the aircraft is executing the braking operation.

Example 35 includes the method of Example 25. In Example 35, the method further comprises moving a variable camber portion of the wing. In Example 35, the variable camber portion is movable between a neutral position and a drooped position. In Example 35, the variable camber portion defines the trailing edge of the wing when the flap is in the stowed position. In Example 35, the variable camber portion automatically moves from the neutral position into the drooped position in response to movement of the flap from the stowed position into the deployed position. In Example 35, the bullnose is located below the variable camber portion when the flap is in the deployed position.

Example 36 includes the method of Example 35, wherein the deployed position includes a first stationary deployment position associated with a takeoff operation of the aircraft and a second stationary deployment position associated with a landing operation of the aircraft. In Example 36, the method further comprises moving the flap to the first stationary deployment position when the aircraft is executing the takeoff operation, and moving the flap to the second stationary deployment position when the aircraft is executing the landing operation.

Example 37 includes the method of Example 36, wherein the wing has a first camber when the flap is in the first stationary deployment position and a second camber when the flap is in the second stationary deployment position. In Example 37, the second camber is greater than the first camber. In Example 37, the method further comprises increasing a camber of the wing when the flap moves from the first stationary deployment position to the second stationary deployment position.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A wing of an aircraft, the wing comprising:
   an upper surface;
   a lower surface located opposite the upper surface;
   a trailing edge located between the upper surface and the lower surface;
   a flap pivotally coupled to the wing, the flap movable between a stowed position located along the lower surface and a deployed position located rearward of the trailing edge, the flap including a first edge, a second edge located opposite the first edge, a first surface extending between the first edge and the second edge, and a second surface located opposite the first surface and extending between the first edge and the second edge, the first edge located rearward of the second edge when the flap is in the stowed position, the first edge located forward of the second edge when the flap is in the deployed position; and
   a bullnose pivotally coupled to the flap, the bullnose located along the first edge, the bullnose configured to pivot relative to the flap as the flap moves between the stowed position and the deployed position.

2. The wing of claim 1, wherein the bullnose is pivotally coupled to a bullnose coupler of a linkage assembly of the wing, the bullnose coupler configured to cause the bullnose to pivot relative to the flap as the flap moves between the stowed position and the deployed position.

3. The wing of claim 1, wherein the trailing edge is a fixed trailing edge, and wherein the bullnose is located below the fixed trailing edge when the flap is in the deployed position.

4. The wing of claim 3, wherein the bullnose is separated from the fixed trailing edge by a gap when the flap is in the deployed position.

5. The wing of claim 3, wherein the deployed position includes a first stationary deployment position associated with a takeoff operation of the aircraft and a second stationary deployment position associated with a landing operation of the aircraft.

6. The wing of claim 5, wherein the bullnose is separated from the fixed trailing edge by a first gap when the flap is in the first stationary deployment position, and the bullnose is separated from the fixed trailing edge by a second gap when the flap is in the second stationary deployment position, the second gap differing from the first gap.

7. The wing of claim 5, wherein the wing has a first camber when the flap is in the first stationary deployment position and a second camber when the flap is in the second stationary deployment position, the second camber greater than the first camber.

8. The wing of claim 3, further comprising:
   an actuator; and
   a linkage assembly coupled to the actuator, to the flap, and to the bullnose, the linkage assembly configured to move the flap between the stowed position and the deployed position in response to actuation of the actuator.

9. The wing of claim 8, wherein the linkage assembly includes a drive arm, a drive coupler, a crank, a rocker, a crank coupler, a panel coupler, and a bullnose coupler, and wherein the drive arm is coupled to the actuator, the drive coupler is pivotally coupled to the drive arm, the crank is pivotally coupled to the drive coupler, the crank coupler is pivotally coupled to the crank, the bullnose coupler is pivotally coupled to the crank coupler, the rocker is pivotally coupled to the crank coupler, the panel coupler is pivotally coupled to the rocker, the flap is pivotally coupled to the crank coupler and pivotally coupled to the panel coupler along the second surface of the flap, and the bullnose is pivotally coupled to the bullnose coupler and pivotally coupled to the flap.

10. The wing of claim 1, further comprising an aileron pivotally coupled to the wing, the aileron movable between a raised position and a lowered position, the aileron defining the trailing edge of the wing when the flap is in the stowed position, the aileron being in the lowered position when the flap is in the deployed position, wherein the bullnose is located below the aileron when the flap is in the deployed position.

11. The wing of claim 10, wherein the bullnose is separated from the aileron by a gap when the flap is in the deployed position.

12. The wing of claim 10, wherein the deployed position includes a first stationary deployment position associated with a takeoff operation of the aircraft and a second stationary deployment position associated with a landing operation of the aircraft.

13. The wing of claim 12, wherein the bullnose is separated from the aileron by a first gap when the flap is in the first stationary deployment position, and the bullnose is separated from the aileron by a second gap when the flap is in the second stationary deployment position, the second gap differing from the first gap.

14. The wing of claim 12, wherein the wing has a first camber when the flap is in the first stationary deployment position and a second camber when the flap is in the second stationary deployment position, the second camber greater than the first camber.

15. The wing of claim 10, wherein the flap is movable to an intermediate stationary deployment position located between the stowed position and the deployed position, the flap being in the intermediate stationary deployment position and the aileron being in the raised position when the aircraft is executing a braking operation.

16. The wing of claim 10, further comprising:
an actuator; and
a linkage assembly coupled to the actuator, to the flap, and to the bullnose, the linkage assembly configured to move the flap between the stowed position and the deployed position in response to actuation of the actuator.

17. The wing of claim 16, wherein the linkage assembly includes a drive arm, a drive coupler, a rocker, a panel coupler, and a bullnose coupler, and wherein the drive arm is coupled to the actuator, the drive coupler is pivotally coupled to the drive arm, the bullnose coupler is pivotally coupled to the drive coupler, the rocker is pivotally coupled to the drive coupler, the panel coupler is pivotally coupled to the rocker, the flap is pivotally coupled to the drive coupler and pivotally coupled to the panel coupler along the second surface of the flap, and the bullnose is pivotally coupled to the bullnose coupler and pivotally coupled to the flap.

18. The wing of claim 1, further comprising a variable camber portion movable between a neutral position and a drooped position, the variable camber portion defining the trailing edge of the wing when the flap is in the stowed position, the variable camber portion automatically moving from the neutral position to the drooped position in response to movement of the flap from the stowed position to the deployed position, wherein the bullnose is located below the variable camber portion when the flap is in the deployed position.

19. The wing of claim 18, wherein the bullnose is separated from the variable camber portion by a gap when the flap is in the deployed position.

20. The wing of claim 18, wherein the deployed position includes a first stationary deployment position associated with a takeoff operation of the aircraft and a second stationary deployment position associated with a landing operation of the aircraft.

21. The wing of claim 20, wherein the bullnose is separated from the variable camber portion by a first gap when the flap is in the first stationary deployment position, and the bullnose is separated from the variable camber portion by a second gap when the flap is in the second stationary deployment position, the second gap differing from the first gap.

22. The wing of claim 20, wherein the wing has a first camber when the flap is in the first stationary deployment position and a second camber when the flap is in the second stationary deployment position, the second camber greater than the first camber.

23. The wing of claim 18, further comprising:
an actuator; and
a linkage assembly coupled to the actuator, to the flap, and to the bullnose, the linkage assembly configured to move the flap between the stowed position and the deployed position in response to actuation of the actuator.

24. The wing of claim 23, wherein the linkage assembly includes a drive arm, a drive coupler, a rocker, a panel coupler, a bullnose coupler, and a variable camber coupler, and wherein the drive arm is coupled to the actuator, the drive coupler is pivotally coupled to the drive arm, the bullnose coupler is pivotally coupled to the drive coupler, the rocker is pivotally coupled to the drive coupler, the panel coupler is pivotally coupled to the rocker, the variable camber coupler is pivotally coupled to the rocker, the flap is pivotally coupled to the drive coupler and pivotally coupled to the panel coupler along the second surface of the flap, the bullnose is pivotally coupled to the bullnose coupler and pivotally coupled to the flap, and the variable camber portion is pivotally coupled to the variable camber coupler.

25. A method, comprising:
moving a flap pivotally coupled to a wing of an aircraft, the wing including an upper surface, a lower surface located opposite the upper surface, a trailing edge located between the upper surface and the lower surface, and a bullnose, the bullnose pivotally coupled to the flap, the flap movable between a stowed position located along the lower surface and a deployed position located rearward of the trailing edge, the flap including a first edge, a second edge located opposite the first edge, a first surface extending between the first edge and the second edge, and a second surface located opposite the first surface and extending between the first edge and the second edge, the first edge located rearward of the second edge when the flap is in the stowed position, the first edge located forward of the second edge when the flap is in the deployed position, the bullnose located along the first edge, the bullnose pivoting relative to the flap as the flap moves between the stowed position and the deployed position.

* * * * *